United States Patent
Rudolf et al.

(10) Patent No.: US 12,381,617 B2
(45) Date of Patent: Aug. 5, 2025

(54) TRANSMISSION TIMING FOR REPEATERS

(71) Applicant: Samsung Electronics Co., Ltd., Suwon-si (KR)

(72) Inventors: Marian Rudolf, Longueuil (CA); Ebrahim MolavianJazi, San Jose, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/169,827

(22) Filed: Feb. 15, 2023

(65) Prior Publication Data

US 2023/0283358 A1    Sep. 7, 2023

Related U.S. Application Data

(60) Provisional application No. 63/317,787, filed on Mar. 8, 2022, provisional application No. 63/316,303, filed on Mar. 3, 2022.

(51) Int. Cl.
*H04B 7/15* (2006.01)
*H04B 7/155* (2006.01)

(52) U.S. Cl.
CPC ................ *H04B 7/15528* (2013.01)

(58) Field of Classification Search
CPC ............. H04B 7/15528; H04W 24/08; H04W 56/001; H04W 56/004; H04W 56/0045; H04W 72/23; H04W 84/047
See application file for complete search history.

(56) References Cited

U.S. PATENT DOCUMENTS

2013/0142106 A1    6/2013 Zhang et al.
2023/0189253 A1*   6/2023 Kim ................ H04L 5/0007
                                                    370/329

FOREIGN PATENT DOCUMENTS

WO    2020081803 A1    4/2020
WO    2020141998 A1    7/2020

OTHER PUBLICATIONS

International Search Report and Written Opinion issued Jun. 13, 2023 regarding International Application No. PCT/KR2023/002965, 8 pages.
QUALCOMM, "NR Repeaters", 3GPP TSG RAN Meeting #90e, RP-202750, Dec. 2020, 13 pages.
ZTE, "Moderator's summary for discussion [94e-10-R18-SmartRepeater]", 3GPP TSG RAN Meeting #94e, RP-213490, Dec. 2021, 41 pages.

(Continued)

*Primary Examiner* — Hashim S Bhatti

(57) ABSTRACT

Apparatuses and methods for transmission timing for repeaters. A method for operating a network-controlled repeater (NCR) includes receiving, by an NCR mobile termination (NCR-MT) entity on an NCR control link, information for a timing value for an NCR forwarding (NCR-Fwd) entity. The method further includes determining, by the NCR, a timing adjustment for an NCR access link based on the timing value and a reference signal (RS). The method further includes receiving, by the NCR-Fwd entity on the NCR access link, a radio frequency (RF) signal based on the timing adjustment.

20 Claims, 27 Drawing Sheets

(56) References Cited

OTHER PUBLICATIONS

ZTE Corporation, "New SI: Study on NR Network-controlled Repeaters", 3GPP TSG RAN Meeting #94e, RP-213700, Dec. 2021, 4 pages.
"3rd Generation Partnership Project; Technical Specification Group Radio Access Network; NR; Physical channels and modulation (Release 17)", 3GPP TS 38.211 V17.0.0, Dec. 2021, 134 pages.
"3rd Generation Partnership Project; Technical Specification Group Radio Access Network; NR; Multiplexing and channel coding (Release 17)", 3GPP TS 38.212 V17.0.0, Dec. 2021, 190 pages.
"3rd Generation Partnership Project; Technical Specification Group Radio Access Network; NR; Physical layer procedures for control (Release 17)", 3GPP TS 38.213 V17.0.0, Dec. 2021, 225 pages.
"3rd Generation Partnership Project; Technical Specification Group Radio Access Network; NR; Physical layer for procedures for data (Release 17)", 3GPP TS 38.214 V17.0.0, Dec. 2021, 217 pages.
"3rd Generation Partnership Project; Technical Specification Group Radio Access Network; NR; Medium Access Control (MAC) protocol specification (Release 16)", 3GPP TS 38.321 V16.5.0, Jun. 2021, 157 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.
"5G; NR; Requirements for support of radio resource management (3GPP TS 38.133 version 16.8.0 Release 16)", ETSI TS 138 133 V16.8.0, Sep. 2021, 2886 pages.

\* cited by examiner

| SRS ID | Receive Timing Adjustment 1 | | Octet 1 |
|---|---|---|---|
| Receive Timing Adjustment 2 | | R | Octet 2 |

TRANSMISSION TIMING FOR REPEATERS

CROSS-REFERENCE TO RELATED APPLICATION AND CLAIM OF PRIORITY

This application claims priority under 35 U.S.C. § 119(e) to U.S. Provisional Patent Application No. 63/316,303 filed on Mar. 3, 2022, and U.S. Provisional Patent Application No. 63/317,787 filed on Mar. 8, 2022. The above-identified provisional patent applications are hereby incorporated by reference in their entirety.

TECHNICAL FIELD

The present disclosure relates generally to wireless communication systems and, more specifically, to transmission timing for repeaters.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for transmission timing for repeaters.

In one embodiment, a method for operating a network-controlled repeater (NCR) is provided. The method includes receiving, by an NCR mobile termination (NCR-MT) entity on an NCR control link, information for a timing value for an NCR forwarding (NCR-Fwd) entity. The method further includes determining, by the NCR, a timing adjustment for an NCR access link based on the timing value and a reference signal (RS). The method further includes receiving, by the NCR-Fwd entity on the NCR access link, a radio frequency (RF) signal based on the timing adjustment.

In another embodiment, an NCR is provided. The NCR includes a transceiver of a NCR-MT entity configured to receive, on an NCR control link, information for a timing value for a NCR-Fwd entity. The NCR further includes a processor of the NCR operably coupled to the transceiver of the NCR-MT entity. The processor of the NCR is configured to determine a timing adjustment for an NCR access link based on the timing value and a RS. The NCR further includes a transceiver of the NCR-Fwd entity operably coupled to the processor of the NCR. The transceiver of the NCR-Fwd entity is configured to receive, on the NCR access link, a RF signal based on the timing adjustment.

In yet another embodiment, a base station (BS) is provided. The BS includes a processor configured to determine a timing value for a user equipment (UE) based on a timing adjustment for the UE in a cell. The BS further includes a transceiver operably coupled to the processor. The transceiver is configured to transmit, to a NCR-MT entity on a NCR control link, information indicating the timing value for the UE.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
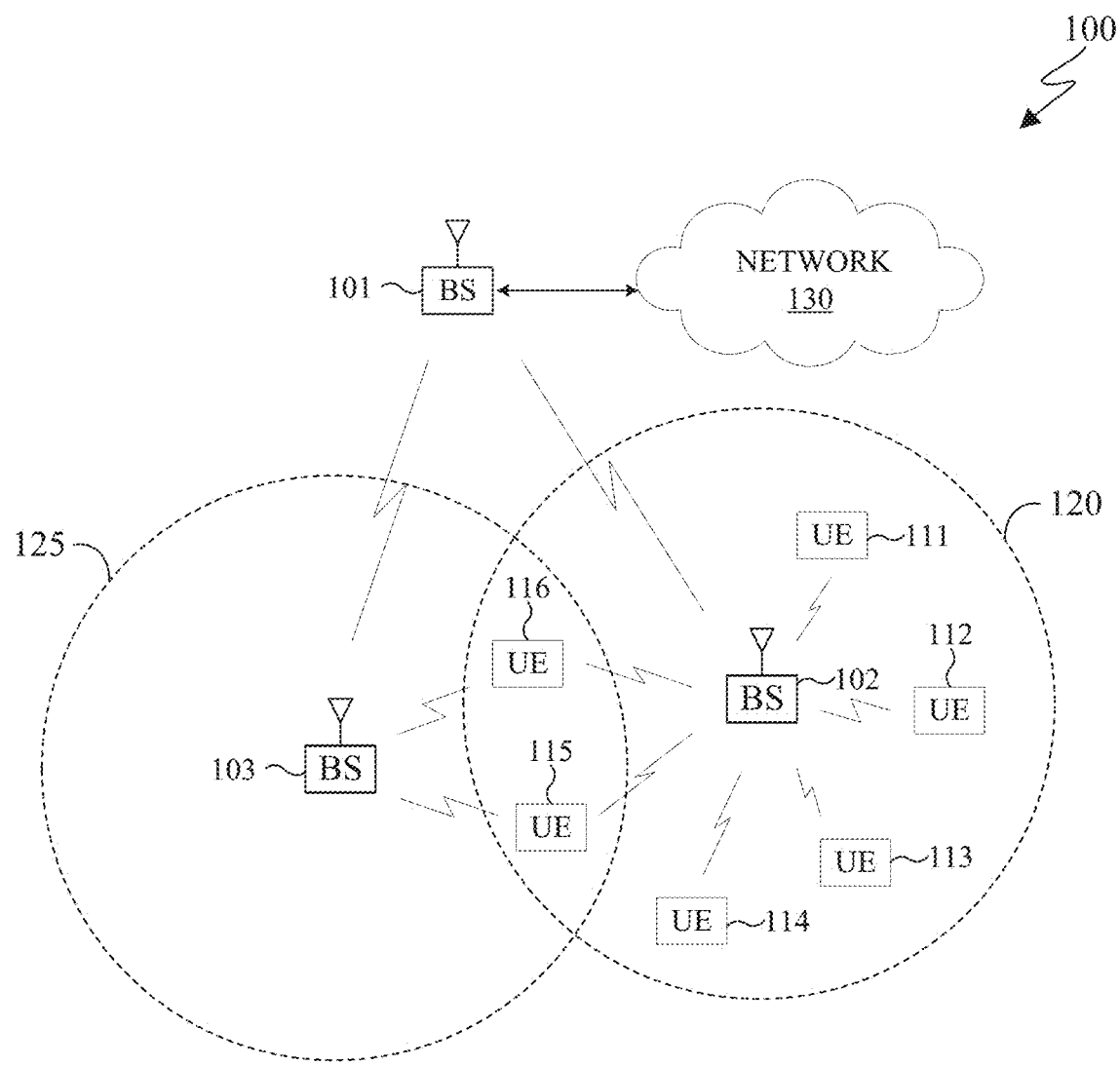
FIG. 1 illustrates an example wireless network according to embodiments of the present disclosure.

FIGS. 1 through 31, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents and standards descriptions are hereby incorporated by reference into the present disclosure as if fully set forth herein: 3GPP TS 38.211 v17.0.0, "NR, Physical channels and modulation" (herein "REF 1"); 3GPP TS 38.212 v17.0.0, "NR, Multiplexing and Channel coding" (herein "REF 2"); 3GPP TS 38.213 v17.0.0, "NR, Physical Layer Procedures for Control" (herein "REF 3"); 3GPP TS 38.214 v17.0.0, "NR, Physical Layer Procedures for Data" (herein "REF 4); 3GPP TS 38.321 v16.5.0, "NR, Medium Access Control (MAC) protocol specification" (herein "REF 5"); 3GPP TS 38.331 v16.5.0, "NR, Radio Resource Control (RRC) Protocol Specification (herein "REF 6"), and 3GPP TS 38.133 v16.8.0, "NR; Requirements for support of radio resource management" (herein "REF 7").

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage is of paramount importance.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
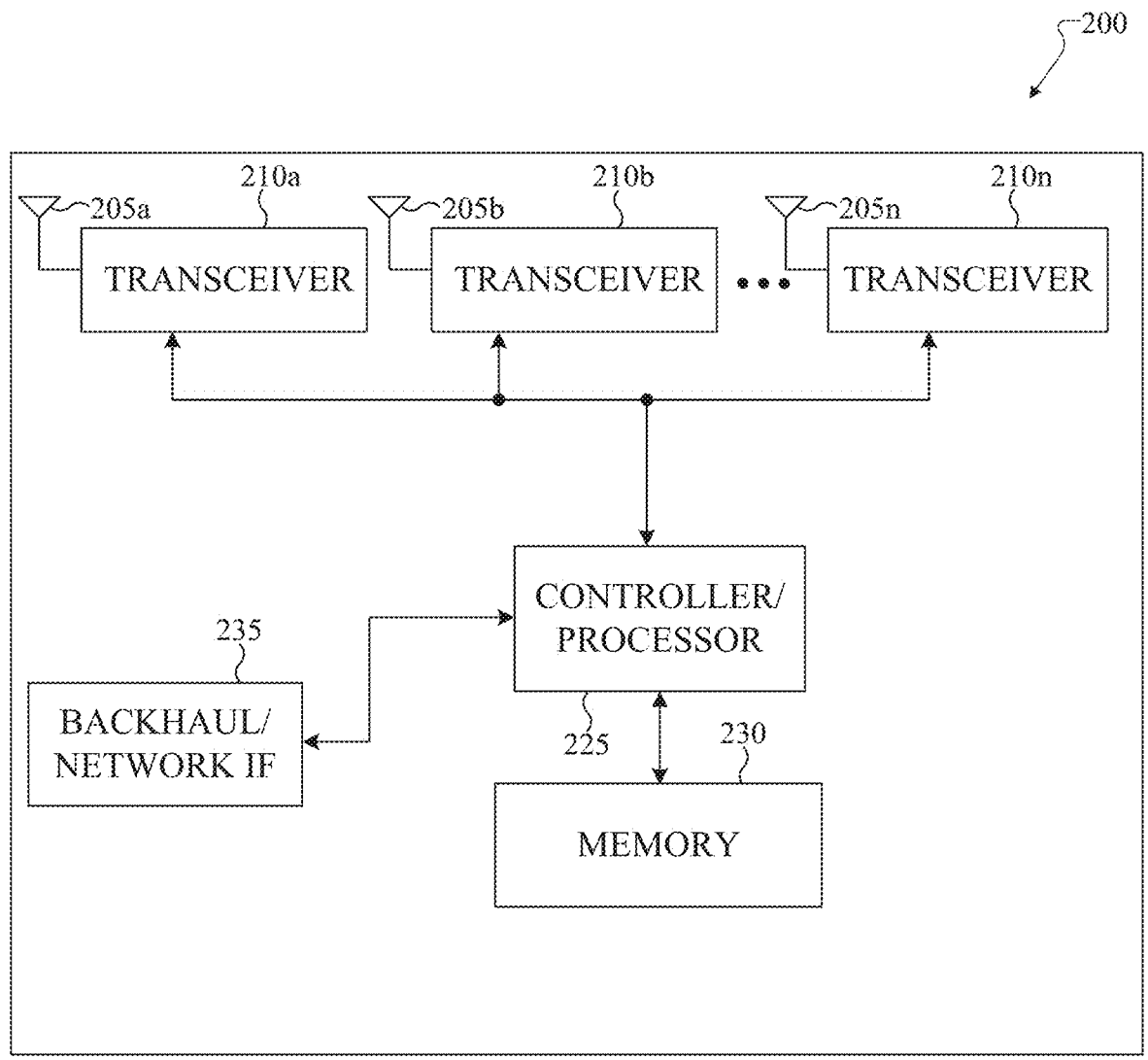
FIG. 2 illustrates an example transmit-receive point (TRP) according to embodiments of the present disclosure.
Figure 3:
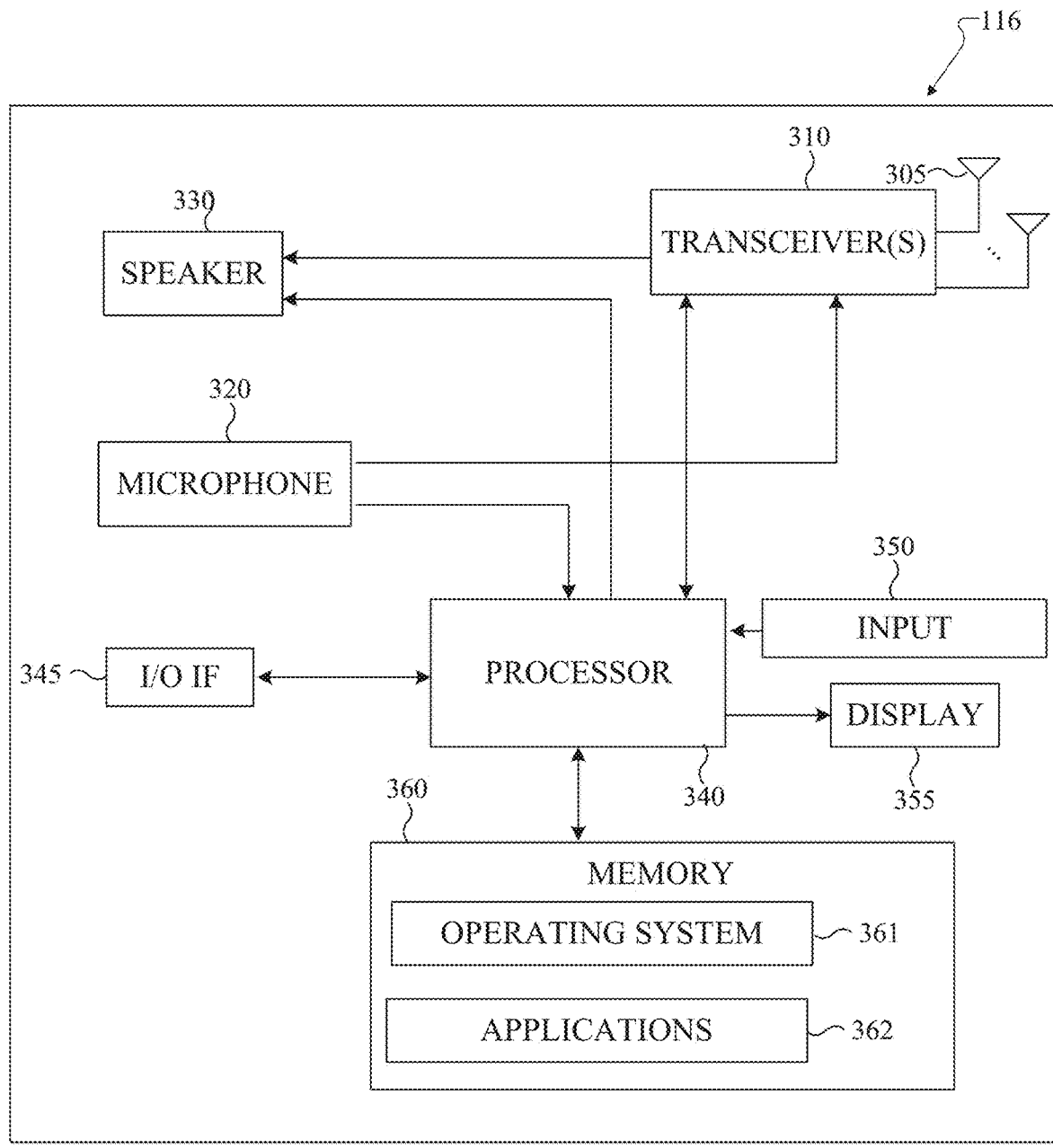
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), a TRP, an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for supporting transmission timing for communication with repeaters. In certain embodiments, one or more of the BSs 101-103 include circuitry, programing, or a combination thereof for supporting transmission timing for communication with repeaters.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example TRP 200 according to embodiments of the present disclosure. The embodiment of the TRP 200 illustrated in FIG. 2 is for illustration only. In various embodiments, the TRP 200 is a base station such as gNBs 101-103 of FIG. 1. In other embodiments, the TRP 200 may be a repeater, such as a network controlled repeater (NCR). TRPs come in a wide variety of configurations, and FIG. 2 does not limit the scope of this disclosure to any particular implementation of a TRP.

As shown in FIG. 2, the TRP 200 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs or gNBs in the network 100. In various embodiments, certain of the transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals. For example, in embodiments where the TRP 200 is a repeater, one or more of the transceivers 210 may be used for an NCR radio unit (NCR-RU) entity or NCR forwarding (NCR-Fwd) entity as a DL connection for signaling over an NCR access link with a UE and/or over a backhaul link with a gNB. In these examples, the associated one(s) of the transceivers 210 for the NCR-RU entity or NCR-Fwd entity may not covert the incoming RF signal to IF or a baseband signal but rather amplify the incoming RF signal and forward or relay the amplified signal, without any down conversion to IF or baseband. In another example, in embodiments where the TRP is a repeater, one or more of the transceivers 210 may be used for an NCR mobile termination (NCR-MT) entity as a DL or UL connection for control signaling over an NCR control link (C-link) with a gNB.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the TRP 200. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for facilitating beam management for repeaters. Any of a wide variety of other functions could be supported in the TRP 200 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the TRP 200 to communicate with other devices or systems over a backhaul connection or over a network. The interface 235 could support communications over any suitable wired or wireless connection(s). For example, when the TRP 200 is implemented as part of a cellular communication system (such as one supporting 5G/NR, LTE, or LTE-A), the interface 235 could allow the TRP 200 to communicate with other gNBs over a wired or wireless backhaul connection, for example, using a transceiver, such as described above with regard to transceivers 210. For example, in embodiments where the TRP 200 is a repeater, the interface 235 may be used for an NCR-RU or NCR-Fwd entity as a backhaul connection with a gNB over a backhaul link (or NCR forward link) for control signaling and/or data to be transmitted to and/or received from a UE. When the TRP 200 is implemented as an access point, the interface 235 could allow the TRP 200 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of TRP 200, various changes may be made to FIG. 2. For example, the TRP 200 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of subcarriers (SCs). For example, a slot can have duration of 1 millisecond or 0.5 millisecond, include 14 symbols and an RB can include 12 SCs with inter-SC spacing of 15 kHz or 30 kHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a PUSCH transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
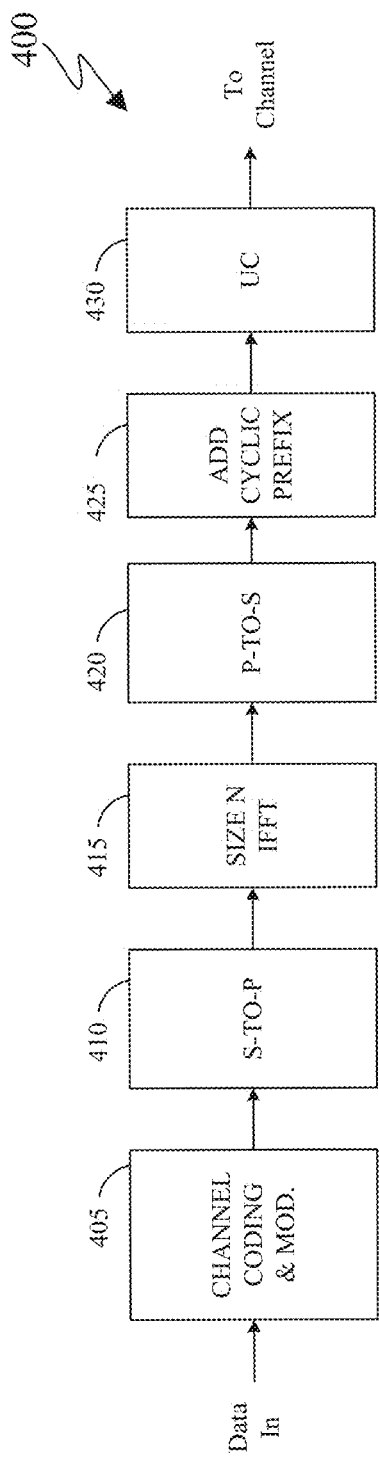
FIGS. 4 and 5 illustrate example wireless transmit and receive paths according to embodiments of the present disclosure.
Figure 5:
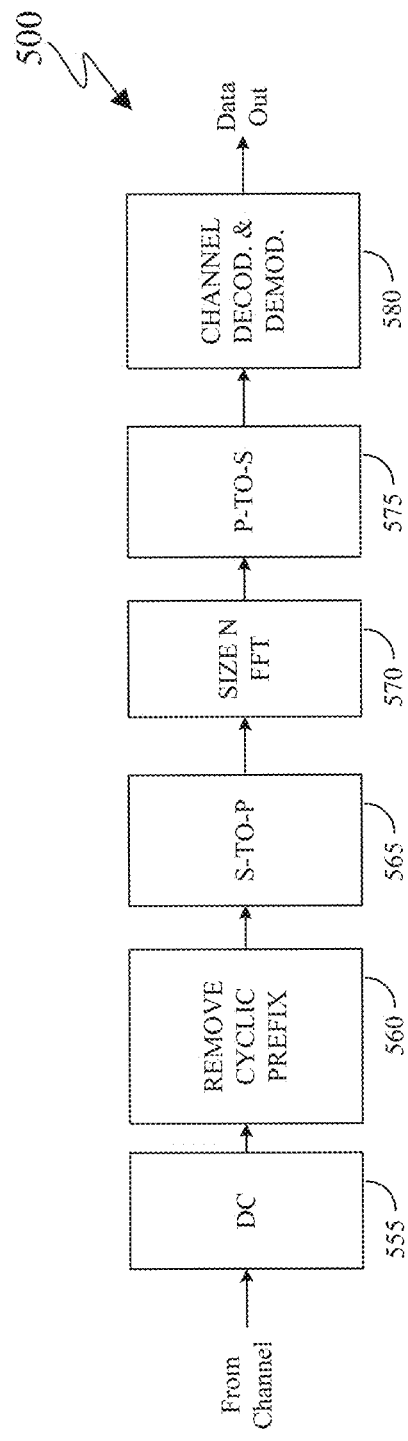

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support transmission timing for repeaters as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access (see also NR specification). A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an active UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in a buffer, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER (see NR specification), of a precoding matrix indicator (PMI) informing a gNB how to combine signals from multiple transmitter antennas in accordance with a multiple input multiple output (MIMO) transmission principle, and of a rank indicator (RI) indicating a transmission rank for a PDSCH.

UL RS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random access channel (PRACH as shown in NR specifications).

An antenna port is defined such that the channel over which a symbol on the antenna port is conveyed can be inferred from the channel over which another symbol on the same antenna port is conveyed.

For DM-RS associated with a PDSCH, the channel over which a PDSCH symbol on one antenna port is conveyed can be inferred from the channel over which a DM-RS symbol on the same antenna port is conveyed only if the two symbols are within the same resource as the scheduled PDSCH, in the same slot, and in the same PRG.

For DM-RS associated with a PDCCH, the channel over which a PDCCH symbol on one antenna port is conveyed can be inferred from the channel over which a DM-RS symbol on the same antenna port is conveyed only if the two symbols are within resources for which the UE may assume the same precoding being used.

For DM-RS associated with a PBCH, the channel over which a PBCH symbol on one antenna port is conveyed can be inferred from the channel over which a DM-RS symbol on the same antenna port is conveyed only if the two symbols are within a SS/PBCH block transmitted within the same slot, and with the same block index.

Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

The UE may assume that SSBs transmitted with the same block index on the same center frequency location are quasi co-located with respect to Doppler spread, Doppler shift, average gain, average delay, delay spread, and, when applicable, spatial Rx parameters. The UE may not assume quasi co-location for any other SS/PBCH block transmissions.

In absence of CSI-RS configuration, and unless otherwise configured, the UE may assume PDSCH DM-RS and SSB to be quasi co-located with respect to Doppler shift, Doppler spread, average delay, delay spread, and, when applicable, spatial Rx parameters. The UE may assume that the PDSCH DM-RS within the same CDM group are quasi co-located with respect to Doppler shift, Doppler spread, average delay, delay spread, and spatial Rx. The UE may also assume that DMRS ports associated with a PDSCH are QCL with QCL type A, type D (when applicable) and average gain. The UE may further assume that no DM-RS collides with the SS/PBCH block.

The UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTCIstatesPerCC. Each TCI-State contains parameters for configuring a quasi-colocation (QCL) relationship between one or two downlink reference signals and the DMRS ports of the PDSCH, the DMRS port of PDCCH or the CSI-RS port(s) of a CSI-RS resource.

The quasi co-location relationship is configured by the higher layer parameter gcl-Type1 for the first DL RS, and qcl-Type2 for the second DL RS (if configured). For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values: QCL-TypeA: {Doppler shift, Doppler spread, average delay, delay spread}; QCL-TypeB: {Doppler shift, Doppler spread; QCL-TypeC: {Doppler shift, average delay}; and QCL-TypeD: {Spatial Rx parameter}.

The UE receives a MAC-CE activation command to map up to [N] (e.g., N=8) TCI states to the codepoints of the DCI field "Transmission Configuration Indication." When the HARQ-ACK corresponding to the PDSCH carrying the activation command is transmitted in slot n, the indicated mapping between TCI states and codepoints of the DCI field "Transmission Configuration Indication" may be applied after a MAC-CE application time, e.g., starting from the first slot that is after slot e.g., $n+3N_{slot}^{subframe,\mu}$.

The NR UL allows for operation with intra-cell orthogonality. UL transmissions received from the UEs within a cell do not create interference to each other. This implies that UL slot boundaries for a given SCS must be received approximately time aligned at the gNB. Ideally, the Rx timing misalignment between the UL signals from UEs should fall within the CP. Like LTE and other cellular communications systems, NR includes a UE UL transmit timing procedure. Timing advance is a negative transmission time offset at the UE between the start of a DL slot as observed by the UE and the start of a slot in the UL. When the transmission time offset is controlled for each UE, the gNB can control the timing of the signals received at the gNB from the UEs. UEs far from the gNB have a larger propagation delay and need to start their UL transmissions more in advance compared to UEs located closer to the gNB. The value of the timing advance for each UE can be determined by the gNB through different means. For example, measurements on the respective UL transmissions like SRS, PUCCH or PUSCH from the UEs can be used. When UEs carry out UL transmissions, the receiving gNB can estimate the UL receive timing and thus issue the corresponding timing advance (TA) commands in the DL. TA commands are UE specific and transmitted as a MAC CE on the DL-SCH. TA commands for a UE are transmitted relatively infrequently, e.g., one or a few times per second. When a UE moves fast, TA commands can be transmitted more frequently. Because the target of the TA procedure is to keep the Rx timing misalignment between UL signals transmitted from UEs at the gNB within the size of the CP, the step size of the TA is chosen as a fraction of the CP. Different from LTE, NR supports multiple numerologies. The CP becomes shorter the higher the SCS, so the NR TA step size is scaled in proportion to the CP length and obtained by the SCS of the active UL BWP. When a UE has not received a TA command during a configurable time period, the UE assumes it has lost UL synchronization. In this case, the UE must reestablish UL timing using the Random Access procedure first before any subsequent PUSCH or PUCCH transmission in the UL.

In the cases of carrier aggregation or dual connectivity, there may be two or more component carriers transmitted from a UE. When the different UL component carriers from the UE are all received at the same geographical location, a same TA value can be employed for all UL component carriers. When different UL component carriers are received at different geographical locations, the different UL carriers need different TA values to align the UL Rx timings at the distinct reception sites. This is the case for gNB deployments using remote radio heads or with dual connectivity where different UL component carriers are terminated at different sites. In these cases, LTE and NR group the UL component carriers in Timing Advance Groups (TAGs) and different TA commands apply to different TAGs. All component carriers in the same group are subject to the same TA command. The TA step size is determined by the highest SCS among the carriers in a TAG.

The NR DL and UL transmissions are organized into frames with $T_f=(\Delta f_{max}N_f/100)\cdot T_c=10$ ms duration, each consisting of ten subframes of $T_{sf}=(\Delta f_{max}N_f/1000)\cdot T_c=1$ ms duration. The time units $T_c=1/(\Delta f_{max}\cdot N_f)$ where $\Delta f_{max}=480\cdot 10^3$ Hz and $N_f=4096$ are defined by REF1. The constant $\kappa=T_s/T_c=64$ where $T_s=1/(\Delta f_{max}\cdot N_{f,ref})$, $\Delta f_{ref}=15\cdot 10^3$ Hz and $N_{f,ref}=2048$. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 consisting of subframes 0-4 and half-frame 1 consisting of subframes 5-9. There is one set of frames in the UL and one set of frames in the DL on a carrier.

Figure 6:
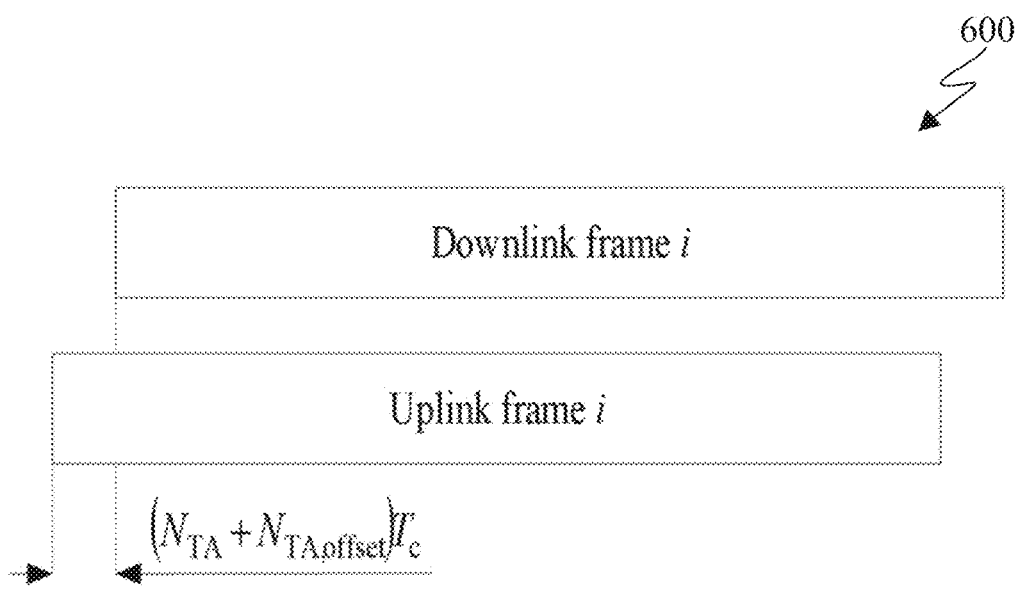
FIG. 6 illustrates an example UL-DL timing relation in NR according to embodiments of the present disclosure.

FIG. 6 illustrates an example UL-DL timing relation in NR 600 according to embodiments of the present disclosure. The embodiment of the UL-DL timing relation in NR 600 illustrated in FIG. 6 is for illustration only. FIG. 6 does not limit the scope of this disclosure to any particular implementation of the UL-DL timing relation in NR 600.

As shown in FIG. 6, UL frame number i for transmission from the UE starts $T_{TA}=(N_{TA}+N_{TA,offset})T_c$ before the start of the corresponding DL frame at the UE where $N_{TA,offset}$ is given by REF3, except for MsgA transmission on PUSCH where $N_{TA}=0$ is used.

A UE can be provided a value $N_{TA,offset}$ of a timing advance offset for a serving cell by parameter n-TimingAdvanceOffset for the serving cell. If the UE is not provided n-TimingAdvanceOffset for a serving cell, the UE determines a default value $N_{TA,offset}$ of the timing advance offset for the serving cell as described in REF7. If a UE is configured with two UL carriers for a serving cell, a same timing advance offset value $N_{TA,offset}$ applies to both carriers.

A UE can be configured with one or more Timing Advance Group (TAG). A TAG is a group of Serving Cells that is configured by RRC for cells with an UL using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs.

Upon reception of a timing advance command for a TAG, the UE adjusts UL timing for PUSCH, SRS, or PUCCH transmission on all the serving cells in the TAG based on a value $N_{TA,offset}$ that the UE expects to be same for all the serving cells in the TAG and based on the received timing advance command where the UL timing for PUSCH, SRS or PUCCH transmissions is the same for all the serving cells in the TAG.

For a band with synchronous contiguous intra-band EN-DC in a band combination with non-applicable maximum transmit timing difference requirements as described in REF7, if the UE indicates ul-TimingAlignmentEUTRA-NR as 'required' and UL transmission timing based on timing adjustment indication for a TAG from MCG and a TAG from SCG are determined to be different by the UE, the UE adjusts the transmission timing for PUSCH/SRS/PUCCH transmission on all serving cells part of the band with the synchronous contiguous intra-band EN-DC based on timing adjustment indication for a TAG from a serving cell in MCG in the band. The UE is not expected to transmit a PUSCH/SRS/PUCCH in one CG when the PUSCH/SRS/PUCCH is overlapping in time, even partially, with random access preamble transmitted in another CG.

For a SCS of $2^{\mu} \cdot 15$ kHz, the timing advance command for a TAG indicates the change of the UL timing relative to the current UL timing for the TAG in multiples of $16 \cdot 64 \cdot T_c/2^{\mu}$. The start timing of the random access preamble is handled differently by the UE and described in REF1.

A timing advance command received by random access response or by an absolute timing advance command MAC CE (REF5), $T_A$, for a TAG indicates $N_{TA}$ values by index values of $T_A=0, 1, 2, \ldots, 3846$, where an amount of the time alignment for the TAG with SCS of $2^{\mu} \cdot 15$ kHz is $N_{TA}=T_A \cdot 16 \cdot 64/2^{\mu}$. $N_{TA}$ is defined in REF1 and is relative to the SCS of the first UL transmission from the UE after the reception of the random access response or absolute timing advance command MAC CE. In other cases, a timing advance command received by timing advance command MAC CE (REF5), $T_A$, for a TAG indicates adjustment of a current $N_{TA}$ value, $N_{TA\_old}$, to the new $N_{TA}$ value, $N_{TA\_new}$, by index values of $T_A=0, 1, 2, \ldots, 63$, where for a SCS of $2^{\mu} \cdot 15$ kHz, $N_{TA\_new}=N_{TA\_old}+(T_A-31) \cdot 16 \cdot 64/2^{\mu}$.

If a UE has multiple active UL BWPs in a same TAG, including UL BWPs in two UL carriers of a serving cell, the timing advance command value is relative to the largest SCS of the multiple active UL BWPs. The applicable $N_{TA\_new}$ value for an UL BWP with lower SCS may be rounded to align with the timing advance granularity for the UL BWP with the lower SCS while satisfying the timing advance accuracy requirements in REF7.

Adjustment of an $N_{TA}$ value by a positive or a negative amount indicates advancing or delaying the UL transmission timing for the TAG by a corresponding amount, respectively.

For a timing advance command received on UL slot n and for a transmission other than a PUSCH scheduled by a RAR UL grant or a fallbackRAR UL grant, or a PUCCH with HARQ-ACK information in response to a successRAR, the corresponding adjustment of the UL transmission timing applies from the beginning of UL slot n+k+1 where $k=\lceil N_{slot}^{subframe,\mu} \cdot (N_{T,1}+N_{T,2}+N_{TA,max}+0.5)/T_{sf} \rceil$, $N_{T,1}$ is a time duration in msec of $N_1$ symbols corresponding to a PDSCH processing time for UE processing capability 1 (REF4) when additional PDSCH DM-RS is configured, $N_{T,2}$ is a time duration in msec of $N_2$ symbols corresponding to a PUSCH preparation time for UE processing capability 1 (REF4), $N_{TA,max}$ is the maximum timing advance value in msec that can be provided by a $T_A$ command field of 12 bits, $N_{slot}^{subframe,\mu}$ is the number of slots per subframe, and $T_{sf}$ is the subframe duration of 1 msec. $N_1$ and $N_2$ are determined with respect to the minimum SCS among the SCSs of all configured UL BWPs for all UL carriers in the TAG and of all configured DL BWPs for the corresponding downlink carriers. For $\mu=0$, the UE assumes $N_{1,0}=14$ (REF4). Slot n and $N_{slot}^{subframe,\mu}$ are determined with respect to the minimum SCS among the SCSs of all configured UL BWPs for all UL carriers in the TAG. $N_{TA,max}$ is determined with respect to the minimum SCS among the SCSs of all configured UL BWPs for all UL carriers in the TAG and for all configured initial UL BWPs provided by initialUplinkBWP. The UL slot n is the last slot among UL slot(s) overlapping with the slot(s) of PDSCH reception assuming $T_{TA}=0$, where the PDSCH provides the timing advance command and $T_{TA}$ is defined in REF1.

If a UE changes an active UL BWP between a time of a timing advance command reception and a time of applying a corresponding adjustment for the UL transmission timing, the UE determines the timing advance command value based on the SCS of the new active UL BWP. If the UE changes an active UL BWP after applying an adjustment for the UL transmission timing, the UE assumes a same absolute timing advance command value before and after the active UL BWP change.

If the received DL timing changes and is not compensated or is only partly compensated by the UL timing adjustment without timing advance command as described in REF7, the UE changes $N_{TA}$ accordingly. If two adjacent slots overlap due to a TA command, the latter slot is reduced in duration relative to the former slot.

RRC configures the following parameters for the maintenance of UL time alignment: timeAlignmentTimer (per TAG) which controls how long the MAC entity considers the Serving Cells belonging to the associated TAG to be UL time aligned.

When a Timing Advance Command MAC CE is received, and if an $N_{TA}$ as defined in REF1 has been maintained with the indicated TAG, the MAC applies the Timing Advance Command for the indicated TAG and starts or restarts the timeAlignmentTimer associated with the indicated TAG.

When a Timing Advance Command is received in a Random Access Response message for a Serving Cell belonging to a TAG or in a MsgB for an SpCell, the MAC applies the Timing Advance Command for this TAG, starts or restarts the timeAlignmentTimer associated with this TAG if the Random Access Preamble was not selected by the MAC entity among the contention-based Random Access Preamble, else if the timeAlignmentTimer associated with this TAG is not running, it applies the Timing Advance Command for this TAG and starts the the timeAlignmentTimer associated with this TAG. When Contention Resolution is considered not successful; the MAC entity stops the timeAlignmentTimer associated with this TAG.

When a timeAlignmentTimer associated with the Primary TAG expires, the MAC entity flushes all HARQ buffers for all Serving Cells, notifies RRC to release PUCCH and/or SRS for all Serving Cells, and if configured, clears any configured DL assignments and configured UL grants, clears any PUSCH resource for semi-persistent CSI reporting, considers all running timeAlignmentTimers as expired, but maintains $N_{TA}$ (REF1) of all TAGs. A separate set of rules applies to the case when the timeAlignmentTimer associated with a Secondary TAG expires.

When the MAC entity stops UL transmissions for an SCell due to the fact that the maximum UL transmission timing difference between TAGs of the MAC entity or the maximum UL transmission timing difference between TAGs of any MAC entity of the UE is exceeded, the MAC entity considers the timeAlignmentTimer associated with the SCell as expired.

The MAC entity does not perform any UL transmission on a Serving Cell except the Random Access Preamble and MsgA transmission when the timeAlignmentTimer associated with the TAG to which this Serving Cell belongs is not running. Furthermore, when the timeAlignmentTimer associated with the Primary TAG is not running, the MAC entity does not perform any UL transmission on any Serving Cell except the Random Access Preamble and MsgA transmission on the SpCell.

Figure 7:
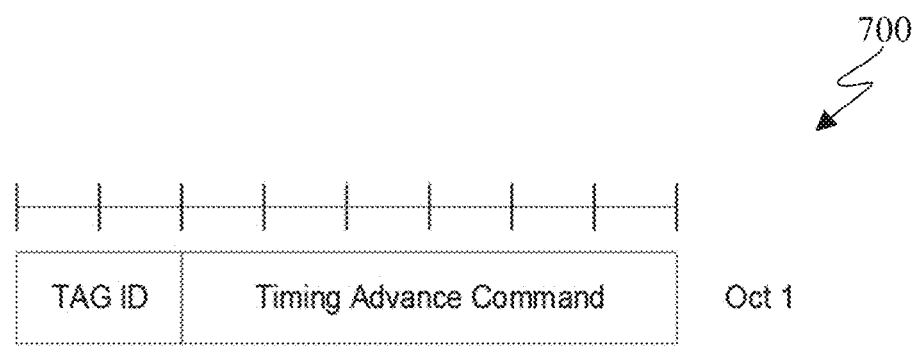
FIG. 7 illustrates an example timing advance command MAC CE according to embodiments of the present disclosure.

FIG. 7 illustrates an example Timing Advance Command MAC CE 700 according to embodiments of the present disclosure. The embodiment of the Timing Advance Command MAC CE 700 illustrated in FIG. 7 is for illustration only. FIG. 7 does not limit the scope of this disclosure to any particular implementation of the Timing Advance Command MAC CE 700.

The Timing Advance Command MAC CE is identified by MAC subheader with LCID=61 as defined in REF5. It has a fixed size and consists of a single octet shown in FIG. 7. It contains the TAG Identity (TAG ID) indicating the TAG Identity of the addressed TAG. The TAG containing the SpCell has the TAG Identity 0. The length of the field is 2 bits. This MAC CE then contains the Timing Advance Command. This field indicates the index value $T_A$ (0, 1, 2 ... 63) used to control the amount of timing adjustment that MAC entity must apply as defined in REF3. The length of the field is 6 bits.

Figure 8:
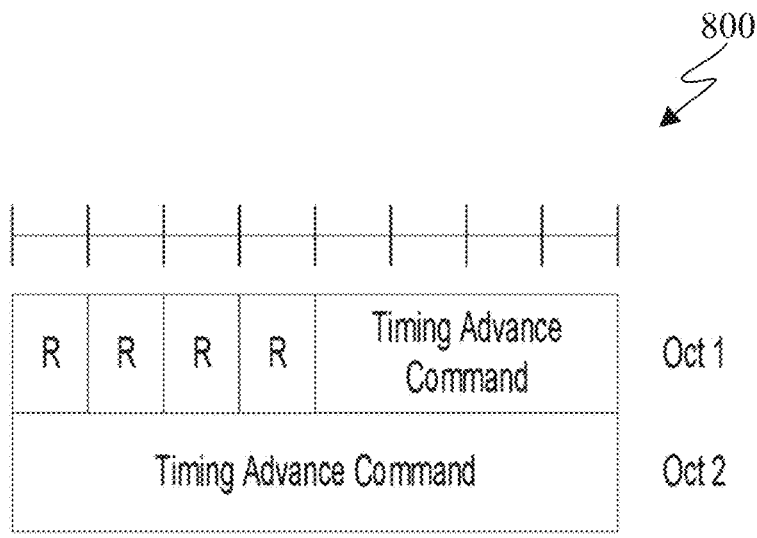
FIG. 8 illustrates an example Absolute Timing Advance Command MAC CE according to embodiments of the present disclosure.

FIG. 8 illustrates an example Absolute Timing Advance Command MAC CE 800 according to embodiments of the present disclosure. The embodiment of the Absolute Timing Advance Command MAC CE 800 illustrated in FIG. 8 is for illustration only. FIG. 8 does not limit the scope of this disclosure to any particular implementation of the Absolute Timing Advance Command MAC CE 800.

The Absolute Timing Advance Command MAC CE is identified by MAC subheader with eLCID codepoint 252 as defined in REF5. It has a fixed size and consists of two octets shown in FIG. 8. It contains the Timing Advance Command. This field indicates the index value TA used to control the amount of timing adjustment that the MAC entity must apply as defined in REF3. The size of the field is 12 bits. The 4 reserved bits R are set to 0.

NR UEs must have the capability to follow the frame timing changes of the reference cell in RRC_CONNECTED state. The UL frame transmission takes place $(N_{TA}+N_{TA\ offset}) \times T_c$ before the reception of the first detected path (in time) of the corresponding DL frame from the reference cell. For serving cell(s) in the Primary TAG, the UE uses the SpCell as the reference cell for deriving the UE transmit timing for cells in the Primary TAG. For serving cell(s) in the Secondary TAG, the UE can use any of the activated SCells as the reference cell for deriving the UE transmit timing for the cells in the Secondary TAG. There are UE initial transmit timing accuracy, gradual timing adjustment and timing advance adjustment delay requirements.

The UE initial transmission timing error must be less than or equal to $\pm T_e$ where the timing error limit value $T_e$ as defined in REF7 is shown in TABLE 1. This requirement applies when it is the first transmission in a DRX cycle for PUCCH, PUSCH and SRS, or it is the PRACH transmission, or it is the MsgA transmission. The UE must meet the $T_e$ requirement for an initial transmission provided that at least one SSB is available at the UE during the last 160 msec. The reference point for the UE initial transmit timing control requirement is the DL timing of the reference cell minus $(N_{TA}+N_{TA\ offset}) \times T_c$. The DL timing is defined as the time when the first detected path (in time) of the corresponding DL frame is received from the reference cell. $N_{TA}$ for PRACH is defined as 0. $(N_{TA}+N_{TA\ offset}) \times T_c$ (in $T_c$ units) for other channels is the difference between UE transmission timing and the DL timing immediately after when the last timing advance was applied. $N_{TA}$ for other channels is not changed until next timing advance is received. The value of $N_{TA,offset}$ is defined by REF7 is shown in TABLE 2. $N_{TA,offset}$ depends on the duplex mode of the cell in which the UL transmission takes place and the frequency range.

TABLE 1

| Timing Error Limit $T_e$ | | | |
|---|---|---|---|
| Frequency Range | SCS of SSB signals (kHz) | SCS of uplink signals (kHz) | $T_e$ |
| 1 | 15 | 15 | 12*64*$T_c$ |
| | | 30 | 10*64*$T_c$ |
| | | 60 | 10*64*$T_c$ |
| | 30 | 15 | 8*64*$T_c$ |
| | | 30 | 8*64*$T_c$ |
| | | 60 | 7*64*$T_c$ |
| 2 | 120 | 60 | 3.5*64*$T_c$ |
| | | 120 | 3.5*64*$T_c$ |
| | 240 | 60 | 3*64*$T_c$ |
| | | 120 | 3*64*$T_c$ |

Note 1:
$T_c$ is the basic timing unit defined in REF1

TABLE 2

| Value of $N_{TA,\ offset}$ | |
|---|---|
| Frequency range and band of cell used for uplink transmission | $N_{TA\ offset}$ (Unit: $T_C$) |
| FR1 FDD or TDD band with neither E-UTRA-NR nor NB-IoT-NR coexistence case | 25600 (Note 1) |
| FR1 FDD band with E-UTRA-NR and/or NB-IoT-NR coexistence case | 0 (Note 1) |
| FR1 TDD band with E-UTRA-NR and/or NB-IoT-NR coexistence case | 39936 (Note 1) |
| FR2 | 13792 |

Note 1:
The UE identifies $N_{TA,\ offset}$ based on the information n-TimingAdvanceOffset as specified in REF6. If UE is not provided with the information n-TimingAdvanceOffset, the default value of $N_{TA,\ offset}$ is set as 25600 for FR1 band. In case of multiple UL carriers in the same TAG, UE expects that the same value of n-TimingAdvanceOffset is provided for all the UL carriers according to REF3 and the value 39936 of $N_{TA,\ offset}$ can also be provided for a FDD serving cell.

When it is not the first transmission in a DRX cycle or there is no DRX cycle, and when it is the transmission for PUCCH, PUSCH and SRS transmission, the UE must be capable of changing the transmission timing according to the received DL frame of the reference cell except when the timing advance is applied.

When the transmission timing error between the UE and the reference timing exceeds $\pm T_e$ then the UE is required to adjust its timing to within $\pm T_e$. The reference timing is $(N_{TA}+N_{TA\ offset}) \times T_c$ before the DL timing of the reference cell. All adjustments made by the UE to the UL transmit timing must follow these rules:

the maximum amount of the magnitude of the timing change in one adjustment is $T_q$;
the minimum aggregate adjustment rate is $T_p$ per second;
the maximum aggregate adjustment rate is $T_q$ per 200 ms.
where the maximum autonomous time adjustment step $T_q$ and the aggregate adjustment rate $T_p$ as defined in REF7 are shown in TABLE 3.

TABLE 3

Maximum Autonomous Time Adjustment Step Tq and
Minimum Aggregate Adjustment Rate Tp

| Frequency Range | SCS of uplink signals (kHz) | $T_q$ | $T_p$ |
|---|---|---|---|
| 1 | 15 | $5.5*64*T_c$ | $5.5*64*T_c$ |
|   | 30 | $5.5*64*T_c$ | $5.5*64*T_c$ |
|   | 60 | $5.5*64*T_c$ | $5.5*64*T_c$ |
| 2 | 60 | $2.5*64*T_c$ | $2.5*64*T_c$ |
|   | 120 | $2.5*64*T_c$ | $2.5*64*T_c$ |

NOTE:
$T_c$ is the basic timing unit defined in REF1

When a UE operates in EN-DC, NR-DC, NE-DC or NR SA operation modes and receives a MAC CE that implies the adjustment of the timing advance as defined in REF5, the UE must adjust the timing of its UL transmission timing at time slot n+k+1 for a timing advance command received in time slot n, and where the value of k is defined by REF3. The relative accuracy of the adjustment for the signalled timing advance value when compared to the timing of the preceding UL transmission must be better than or equal to the UE Timing Advance adjustment accuracy requirement defined in REF7 and shown in TABLE 4.

TABLE 4

UE Timing Advance adjustment accuracy

| UL SCS (kHz) | 15 | 30 | 60 | 120 |
|---|---|---|---|---|
| UE Timing Advance adjustment accuracy | ±256 $T_c$ | ±256 $T_c$ | ±128 $T_c$ | ±32 $T_c$ |

Figure 9:
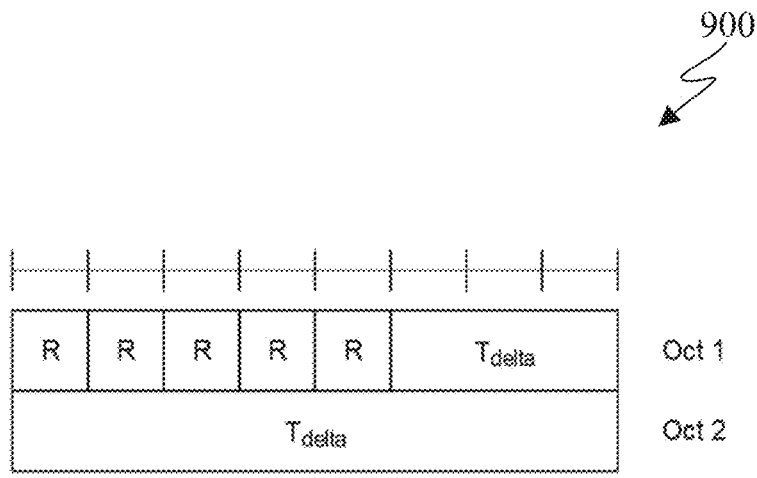
FIG. 9 illustrates an example timing delta MAC CE for IAB according to embodiments of the present disclosure.

FIG. 9 illustrates an example Timing Delta MAC CE for IAB 900 according to embodiments of the present disclosure. The embodiment of the Timing Delta MAC CE for IAB 900 illustrated in FIG. 9 is for illustration only. FIG. 9 does not limit the scope of this disclosure to any particular implementation of the Timing Delta MAC CE for IAB 900.

Rel-16 NR introduced support for the Integrated Access and Backhaul (IAB) feature. IAB-nodes are infrastructure relaying nodes capable of wirelessly relaying the uplink or downlink transmissions or receptions between UEs and gNBs. IAB operation can use NR or LTE radio in FR1 or FR2. In the context of Rel-16 IAB operation, there is an additional relative timing adjustment mechanism. For time-domain synchronization across multiple backhaul hops, an additional IAB timing adjustment $T_{delta}$ can be provided to the IAB node by its parent node. This parameter is applicable only to IAB nodes and signaled using the Timing Delta MAC CE shown in FIG. 9. The Timing Delta MAC CE is identified by MAC subheader with eLCID codepoint 255. It has a fixed size and consists of two octets. The 5 reserved bits R are set to 0. $T_{delta}$ indicates the value (0, 1, 2 . . . 1199) used to control the amount of timing adjustment that MAC entity indicates and is defined in REF3. The length of the field is 11 bits.

If an IAB-node is provided an index $T_{delta}$ in a Timing Delta MAC CE from a serving cell, the IAB-node may assume that $(N_{TA}/2+N_{delta}+T_{delta} \cdot G_{step}) \cdot T_c$ is a time difference between a DU transmission of a signal from the serving cell and a reception of the signal by the IAB-MT when $N_{TA}/2+N_{delta}+T_{delta} \cdot G_{step}>0$. The IAB-node may use the time difference to determine an IAB-DU transmission time. $N_{TA}$ is obtained as for a "UE" in REF3 for the TAG containing the serving cell. $N_{delta}$ and $G_{step}$ are determined as:

$N_{delta}=-70528$ and $G_{step}=64$, for an FR1 serving cell providing the Timing Delta MAC CE, $N_{delta}=-17664$ and $G_{step}=32$, for an FR2 serving cell providing the Timing Delta MAC CE.

Coverage is a fundamental aspect of cellular network deployments. Cellular operators rely on different types of network nodes to offer blanket coverage in their deployments. Deployment of regular full-stack cells, e.g., cells served by a gNB type base stations usually based results in expensive implementation, high cost for equipment and backhaul connectivity. Their deployment is subjected to a variety of constraints such as expensive site leases. While this is the predominant deployment type encountered in practice, it is not always preferred cost-wise. As a result, other types of network nodes have been considered to increase cellular operators' economic flexibility for their network deployments.

For example, Integrated Access and Backhaul (IAB) was introduced in 5G NR Rel-16 and enhanced in Rel-17 as a new type of network node not requiring a wired backhaul. IAB nodes can be considered full-stack cells similar to gNBs. The IAB node is a new type of relay node building over the front-haul architecture and constituting a node with a dual role consisting of an IAB Distributed Unit (DU) component making it possible to appear as a regular cell to the UEs which it serves, and an IAB Mobile Terminal (MT) component inheriting many properties of a regular UE whereby the IAB node connects to its donor parent node(s) or a gNB. The IAB node is based on a Layer 2 architecture with end-to-end PDCP layer from the donor IAB node to the UE for Control Plane (CP) and User Plane (UP). IAB nodes can also be classified as re-generative relays. Every packet traversing the link between the donor node and the IAB-MT component of the IAB node, i.e., the backhaul-link, must be properly decoded and re-encoded by the IAB node for further transmission to the UE on the access link. The first version of IAB in Rel-16 NR assumes half duplex operation in TDM between access and backhaul links for transmission and reception by the IAB node but includes features for forward compatibility towards evolving IAB using full duplex operation. Rel-17 NR further enhances IAB operation with better support of full duplex implementations of IAB nodes.

Another type of network node is the RF repeater which amplifies-and-forwards any signal that it receives. RF repeaters have seen a wide range of deployments in 2G GSM/(E)GPRS, 3G WCDMA/HSPA and 4G LTE/LTE-A to supplement the coverage provided by regular full-stack cells. RF repeaters constitute the simplest and most cost-effective way to improve network coverage. The main advantages of RF repeaters are their low-cost, their ease of deployment and the fact that they do not much increase latency. The main disadvantage is that they amplify both desired signal(s) and (undesired) noise and hence, often contribute to an increase of interference levels observed at system level. Within RF repeaters, there are different categories depending on the power characteristics and the amount of spectrum that they are configured to amplify, e.g., single band, multi-band, etc. RF repeaters are considered non-regenerative type of relay nodes. RF repeaters are typically full-duplex nodes and they do not differentiate between UL and DL transmissions or receptions. LTE specifies RF repeater requirements in 36.106. Their use is limited to LTE FDD bands.

In Rel-17 NR, RF and EMC requirements in FR1 and FR2 for RF repeaters using NR were introduced. As NR often uses higher frequencies, e.g., 3-4 GHz in FR1 and above 24

GHz for FR2, propagation conditions are degraded when compared to lower frequencies in use by LTE. This exacerbates the coverage challenges for NR. More densification of cells becomes necessary. Massive MIMO operation in FR1, analog beamforming in FR2 and multi-beam operation with associated beam management in FR1 and FR2 are integral part of the NR design to cope with the challenging propagation conditions of these higher frequencies. Note that these NR frequency bands are TDD. In consequence, simultaneous or bi-directional amplify-and-forward as employed by traditional RF repeaters is not always necessary (unlike in the FDD LTE case) and can therefore be avoided. This much reduces the noise pollution problem of regular RF repeaters which amplify both (undesired) noise and desired signal(s). Beamformed transmissions and receptions to/from individual NR users are a fundamental feature and inherent to NR operation. However, the use of a simple RF repeater operating in the NR network implies that the prerequisite beamforming gains for NR operation to provide coverage are not available when relaying the NR transmissions and receptions. While a conventional RF repeater presents a very cost-effective means of extending network coverage, it has limitations when considering NR.

Therefore, a new type of network node, somewhere in-between RF repeaters and IAB nodes is a compelling proposition to try to leverage the main advantages of both. That new type of network node, i.e., a smart repeater (SR) or network-controlled repeater (NETCON or NCR) can make use of some side control information (SCI) to enable a more intelligent amplify-and-forward operation in a system with TDD access and multi-beam operation. SCI allows a network-controlled or smart repeater to perform the amplify-and-forward operation in a more efficient manner. Potential benefits include mitigation of unnecessary noise amplification, transmissions and receptions with better spatial directivity, and much simplified network integration. In the control plane (C-plane), an SR may be provided or configured by the gNB with information on semi-static and/or dynamic downlink/uplink configuration, adaptive transmitter/receiver spatial beamforming, Tx ON/OFF status, etc. In the user plane (U-plane), the SR is still non-regenerative, e.g., it employs amplify-and-forward to relay the actual UE signals from/to the gNB. SCI transmission and requires only low capacity for the control backhaul between the donor cell(s), e.g., gNB and the SR. As a result, the low-complexity and low-cost properties of RF repeaters are mostly preserved while a degree of network configurability and control is enabled similar to eIAB nodes.

Throughout the disclosure, the term smart repeater (SR) is used as a short form for a network-controlled repeater (NCR). The terms smart repeater and network-controlled repeater may be used interchangeably in the disclosure.

Figure 10:
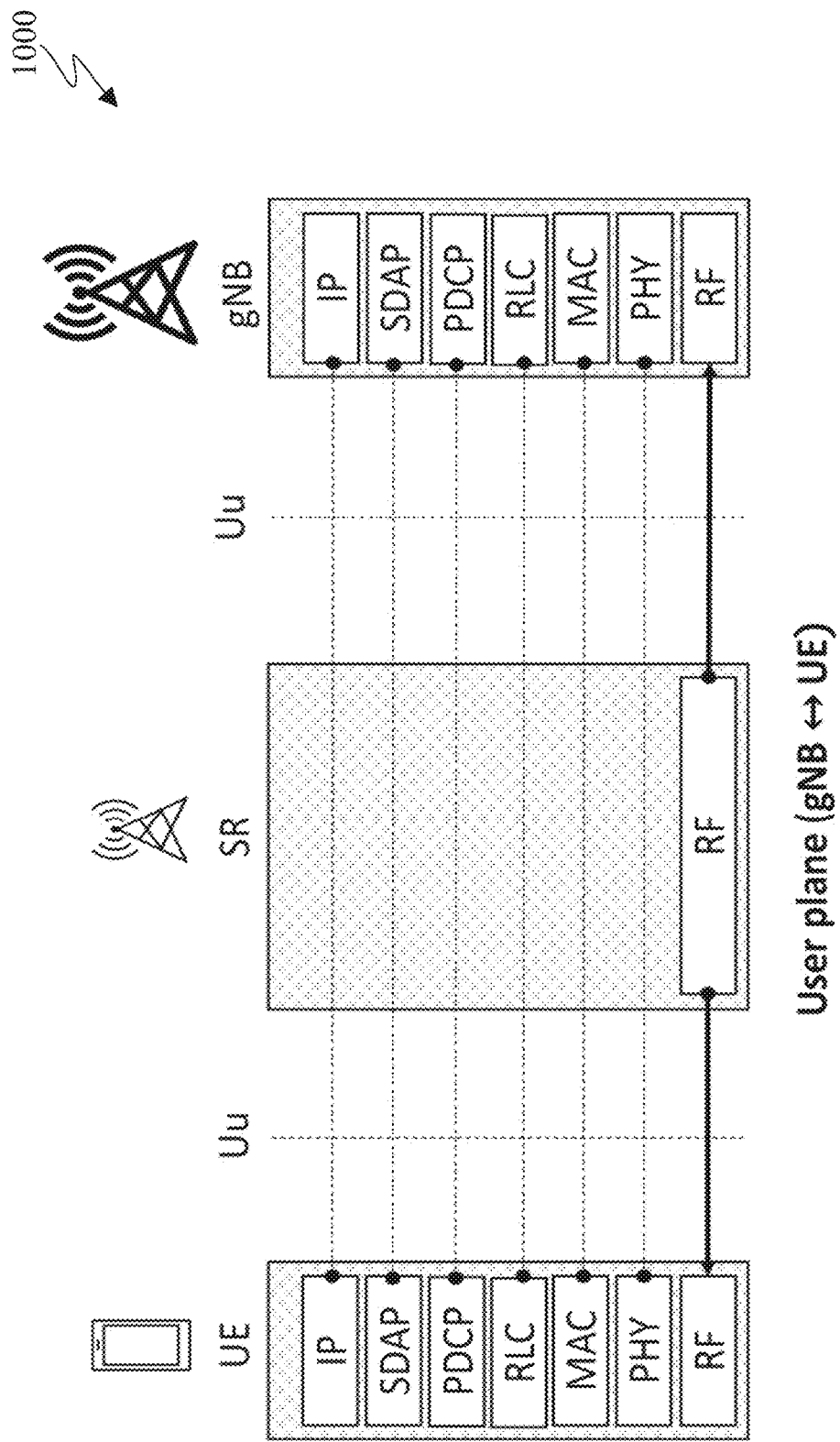
FIG. 10 illustrates an example user plane protocol architecture for smart repeater according to embodiments of the present disclosure.

FIG. 10 illustrates an example user plane protocol architecture for smart repeater 1000 according to embodiments of the present disclosure. The embodiment of the user plane protocol architecture for smart repeater 1000 illustrated in FIG. 10 is for illustration only. FIG. 10 does not limit the scope of this disclosure to any particular implementation of the user plane protocol architecture for smart repeater 1000.

Figure 11:
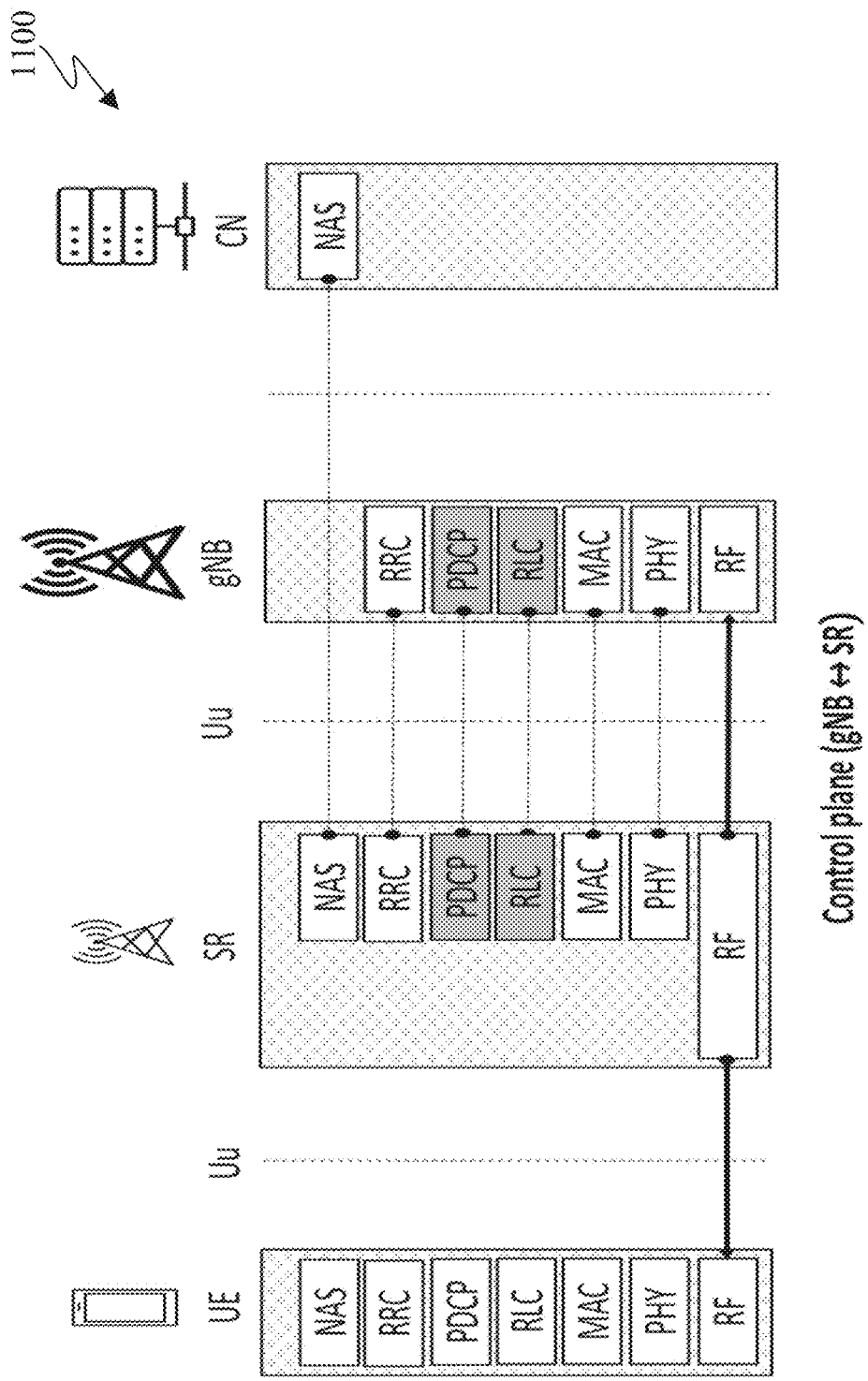
FIG. 11 illustrates an example control plane protocol architecture for smart repeater according to embodiments of the present disclosure.

FIG. 11 illustrates an example control plane protocol architecture for smart repeater 1100 according to embodiments of the present disclosure. The embodiment of the control plane protocol architecture for smart repeater 1100 illustrated in FIG. 11 is for illustration only. FIG. 11 does not limit the scope of this disclosure to any particular implementation of the control plane protocol architecture for smart repeater 1100.

Figure 12:
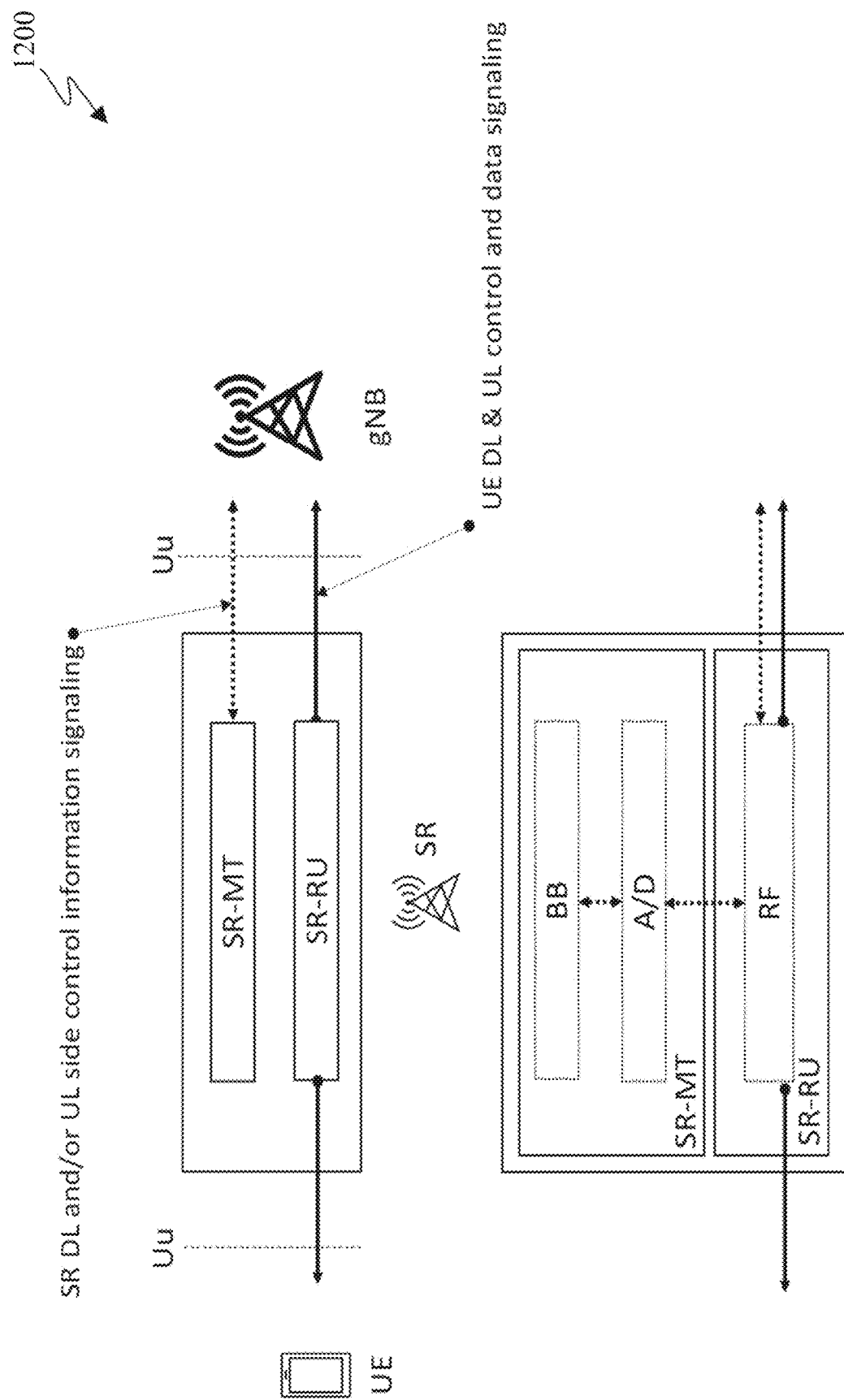
FIG. 12 illustrates an example functional architecture for smart repeater according to embodiments of the present disclosure.

FIG. 12 illustrates an example functional architecture for smart repeater 1200 according to embodiments of the present disclosure. The embodiment of the functional architecture for smart repeater 1200 illustrated in FIG. 12 is for illustration only. FIG. 12 does not limit the scope of this disclosure to any particular implementation of the functional architecture for smart repeater 1200.

FIGS. 10 through 12 show an example for the functional and protocol architectures of a SR or NCR. Throughout the present disclosure an SR-MT is also referred to as NCR-MT, an SR-RU is also referred to as NCR-Fwd or NCR-RU. In various embodiments, the Uu link between the SR-MT (or NCR-MT) entity and the gNB is referred to as the SR or NCR control link (C-link) while the Uu link between the SR-RU (or NCR-Fwd) entity and the gNB is referred to as the SR or NCR forward link (or backhaul link). The Uu link between the SR-RU (or NCR-Fwd) entity and the UE is referred to as the SR or NCR access link.

In the user plane (FIG. 10), the SR receives the incoming RF signal from the gNB (or the UE) at its ingress antenna port, then amplifies-and-forwards the RF signal to its egress antenna port to the UE (or gNB). Note that similar to a conventional RF repeater, the amplified-and-forwarded signal traverses the RF path, e.g., is the signal is processed in analog domain. In the control plane (FIG. 11), e.g., when transmitting DL side control information (DL SCI) from gNB to the SR, or when transmitting UL side control information (UL SCI) from the SR to the gNB, the signal processing by the SR differs. For transmission of DL SCI, the gNB can use one or a combination of signaling options. DL SCI can be transmitted in L1, e.g., by DCI or in any DL control channel, in L2 MAC, e.g., by MAC CE(s) or as part of any DL data channel, in L2 RRC, e.g., by RRC signaling messages and/or IEs. Without loss of generality and illustration purposes, it may be assumed that the SR converts part of the incoming (DL) RF signal from the gNB to digital domain to determine presence and further process the received signaling contents of DL SCI. For transmission of UL SCI to the gNB, it may be assumed that the SR receives the incoming RF signal from the UE at its ingress antenna port, then amplifies-and-forwards the RF signal while adding the UL SCI following its conversion from digital signaling processing to analog domain for transmission at the egress antenna port (FIG. 12). For transmission of UL SCI, the SR can use one or a combination of signaling options. UL SCI can be transmitted in L1, e.g., by an UL control or data channel, in L2 MAC, e.g., by MAC CE(s) or as part of any UL data channel, in L2 RRC, e.g., by RRC signaling messages and/or IEs. Note that the SR may also be configured or provisioned or receive or transmit signaling messages using non-access stratum (NAS) protocol messages, e.g., CM, SM, etc., and/or by O&M signaling. Furthermore, transmission and reception of DL and UL SCI may occur using in-band signaling, e.g., using the same frequency band/channel as the amplified-and-forwarded UE signal(s), or may occur using out-of-band signaling, e.g., SCI is transmitted and received using a different band, channel or frequency range than the amplified-and-forwarded UE signal(s).

Figure 13:
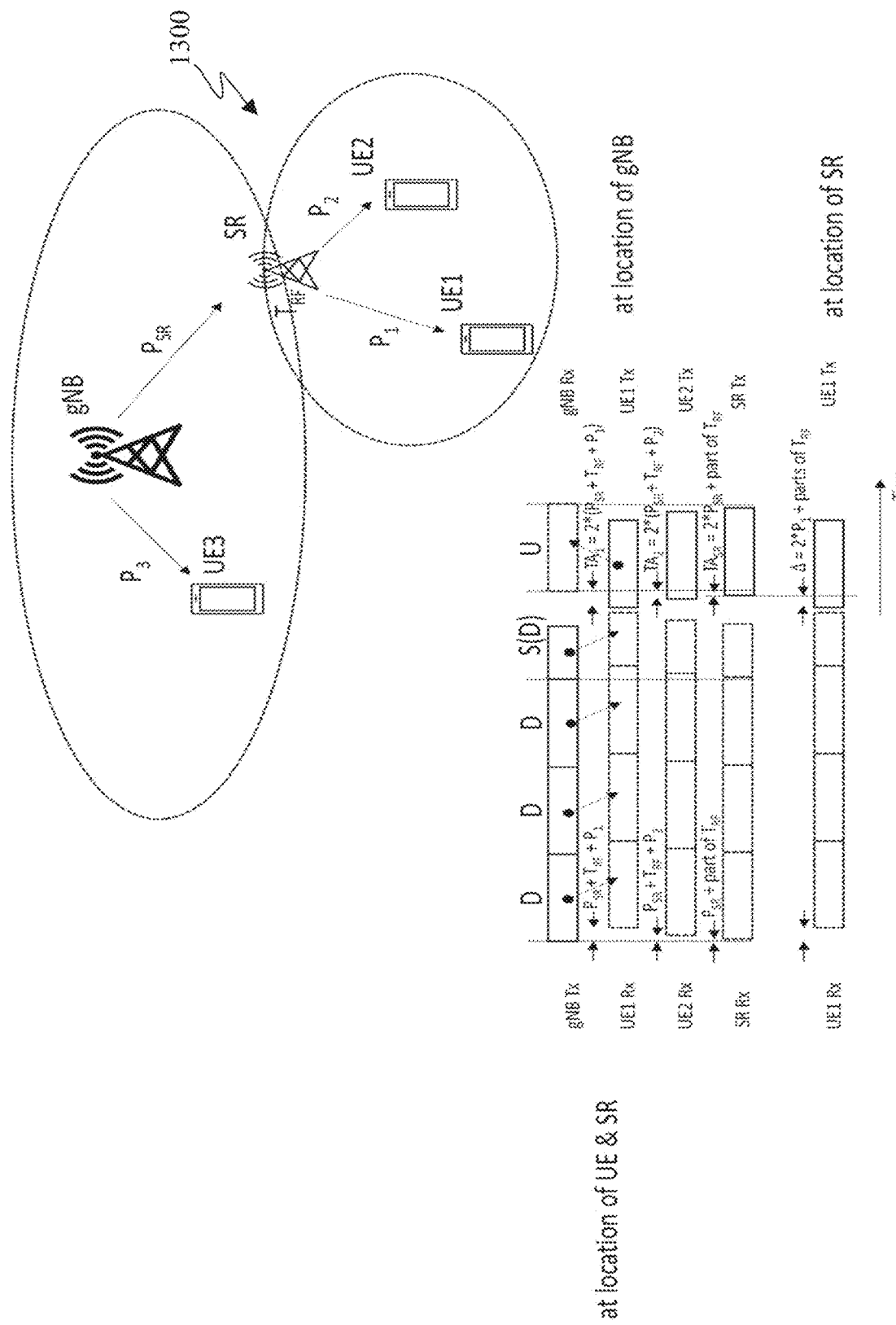
FIG. 13 illustrates an example for effects of UE TA when operating with smart repeaters according to embodiments of the present disclosure.

FIG. 13 illustrates an example for effects of UE $T_A$ when operating with smart repeaters 1300 according to embodiments of the present disclosure. The embodiment of the effects of UE $T_A$ when operating with smart repeaters 1300 illustrated in FIG. 13 is for illustration only. FIG. 13 does not limit the scope of this disclosure to any particular implementation of the effects of UE $T_A$ when operating with smart repeaters 1300.

Various embodiments of the present disclosure provide transmission timing for smart repeaters.

With respect to the example as shown in FIG. 13, a smart repeater is deployed to extend coverage in an FR2 TDD cell. Without loss of generality, the NR TDD gNB uses SCS=120 kHz and an UL-DL frame allocation of type DDDSU with duration 0.625 msec. UE1 and UE2 are not in radio range of the gNB and their signal(s) are relayed to the gNB by the SR. UE3 is in radio range of the gNB and is directly connected to the gNB. Note that the resulting timing advance settings $TA_1$, $TA_2$, $TA_3$ for UE1, UE2, UE3 correspond to several contribution delays. Transmissions and receptions between gNB and UE3 do not involve the SR and are therefore only subject to one-way propagation delay $P_3$. Transmissions and receptions between gNB and UE1, UE2 are subject to the one-way propagation delays $P_1$, $P_2$ between UE1, UE2 and the SR respectively, the one-way propagation delay $P_{SR}$ between gNB and SR and the SR internal one-way RF processing delay $T_{RF}$. The one-way RF processing delay may be assumed in the range of up to several usec's, e.g., 2-3 usec. $T_{RF}$ mostly results from delays due to the signal propagation and filtering in the RF path during the amplify-and-forward operation of the SR user plane. Note that for LTE OFDM SCS=15 kHz resulting in an OFDM symbol duration of ~71 usec, $T_{RF}$ is smaller than the CP and can be absorbed easily, e.g., LTE symbol timing is not affected. For NR OFDM SCS=120 kHz resulting in an OFDM symbol duration of ~9 usec, $T_{RF}$ can exceed the CP. The amplify-and-forward path of repeater can result in a delay potentially affecting the OFDM symbol timing.

FIG. 13 also shows the relative Tx and Rx timings of transmissions for 2 cases, first when received at the gNB location and second when received at the location of the SR. For example, the gNB can set the timing advance values $TA_1=2*(P_{SR}+T_{RF}+P_1)$ for UE1, $TA_2=2*(P_{SR}+T_{RF}+P_2)$ for UE2 to align the receive timings of UL signals transmitted by UE1 and UE2 relayed by the SR in the UL slot. Assuming for simplicity that the UL transmit timing of UL SCI transmitted from the SR to the gNB is timing-controlled "as if" the SR was a UE, the gNB can set the timing advance value $TA_{SR}=2*P_{SR}+\alpha*T_{RF}$ where $\alpha$ is in the range 0 to 2. Depending at which point in the RF chain of the amplify-and-forward operation the DL SCI is received and the UL SCI is added to the RF signal by the SR, a smaller (including zero) or larger part of the SR internal RF processing delay must be compensated for. It can then be shown that UL signal transmitted by UE1 is received by the SR at its ingress RF port with a relative timing difference $\Delta_1=2*P1+\alpha*T_{RF}$ where $\alpha$ is in the range 0 to 2 when compared to gNB-controlled UL transmit timing for the UL SCI signal. Similarly, the UL signal transmitted by UE2 is received by the SR at its ingress RF port with a relative timing difference $\Delta_2=2*P_2$+part of $T_{RF}$.

In one example, UE-autonomous adjustment of the UE maintained timing advance value to meet the reference timing within the allowed timing error limit may be used by the NR $T_A$ procedures when tracking the first detected path (in time) of a DL frame from the serving cell. Therefore, the UE can to some extent adjust its maintained $N_{TA}$ value autonomously. After the random-access procedure where the absolute timing advance value is provided to the UE by the gNB during initial access, the gNB may not know the exact value of the $N_{TA}$ internally maintained by the UE. The gNB can only know the sequence of MAC CE timing commands and their timing adjustment values, e.g., $T_A$ which the gNB has previously transmitted to the UE in RRC_CONNECTED mode.

Various embodiments of the present disclosure recognize issues with the timing advance procedure in a TDD cell with smart repeater operation. The existing TA procedure controls the UE UL transmit timing with respect to the propagation delay of the UE to the gNB. The purpose of the existing timing advance procedure is to align the receive timings of multiple UL signals transmitted by multiple UEs at the location of the gNB, e.g., ideally within a CP. The gNB controls the UE timing advance through MAC CE signaling carried on DL PDSCH. These MAC CEs and DL PDSCHs transmitted from the gNB to the UEs are relayed by the SR and traverse the (DL) amplify-and-forward RF path of the SR, e.g., the SR user plane. Therefore, the SR is unaware of and doesn't know the exact UL transmission timings of the UE signal(s) in its (UL) amplify-and-forward path when relaying received UE transmissions to the gNB.

Unlike UL transmission timing of UEs, control of the UL transmission timing of the SR for transmission of UL SCI is challenging. UE UL transmission generates a single UL signal in BB which is then digital to analog (D/A) converted, amplified, and filtered. The UL transmission timing, e.g., start of symbol(s) or slot(s) with respect to the DL timing reference and determined TA value can be adjusted by the UE, e.g., at sample level. SR UL transmissions for the UL SCI are generated in BB, then D/A converted. The resulting analog signal for purpose of UL SCI insertion by the SR must be added to the user plane (analog) amplify-and-forward signal by the SR. However, the SR is unaware of the UL transmission timing of the analog UE signal(s) in the amplify-and-forward path. The gNB controls the UE timing advance and the UE TA values are not known to the SR. The SR cannot easily estimate the UL reception timing of the analog UE signal(s) at its ingress antenna port, e.g., not at sample level. Power-based detection only allows an SR to detect power-ramp ups and transmissions within the Tx On/Off time masks, e.g., order of several usec. Without loss of generality, it can be assumed that the gNB can determine the relative receive timing difference between a first timing-controlled UL signal from a UE relayed by the SR and a second timing-controlled UL signal with UL SCI from the SR inserted in the amplify-and-forward path. Correspondingly, for timing control of UL SCI transmissions from the SR, the gNB can reuse the principles of the NR (UE) transmission timing procedure. The gNB can use a single timing control loop on the carrier with a sequence of TA commands to control UL timing of UL SCI transmission by the SR. The level of required accuracy and the needed adjustment range for the SR timing control adjustments of the SR however can be different when compared to the UE. The SR can control its own transmit timing of UL SCI, because UL SCI is generated in BB and converted to analog domain, but the SR may not control the timing of the analog amplify-and-forward signal in the user-plane. Furthermore, combining the analog signal with UL SCI generated locally by the SR and the analog signal in the amplify-and-forward path of the SR is subject to power envelope and dynamic range constraints. Requiring the SR to support arbitrarily flexible UL transmission timing settings for its UL SCI transmissions with respect to the user-plane UE signal(s) may require complex SR implementation. It can be expected that the SR often uses a smaller TA than the TAs of the UEs which it is relaying, e.g., the SR is closer to the gNB in a typical relay deployment compared to the UE(s) served through the SR. Therefore, the UL SCI transmissions by the SR can be expected to start later than the UE UL transmissions in a slot (with respect to the same DL timing reference). The start and duration of UL SCI transmission by the SR in a slot must also be timing-controlled with respect to the next slot. UL transmission of UL SCI by the SR with respect to transmission timing, power envelope and dynamic range constraints to which the amplify-and-forward RF path is subjected may become even more challenging.

It cannot be expected that the SR demodulates, decodes, and determines the signaling contents of the transmissions from the gNB to the UEs being relayed by the SR. This would require provisioning the SR with many UE-specific identifiers such as C-RNTI and many UE-specific transmission parameters such as the UE-specific DCI formats and their associated PDCCH configurations in time, e.g., CORE-SETs, and in frequency, e.g., search spaces. First, such provisioning would greatly increase the side control signaling load of the backhaul between gNB and SR. Second, because many UE-specific transmission parameters must be regularly re-configured by the gNB during the lifetime of the UE-gNB connection to adapt to the changing radio conditions, provisioning the SR with the same UE-specific transmission parameters needed to decode the UE PDCCHs and PDSCHs would create real-time processing requirements for the SR implementation which much increases cost. Third, requiring the SR to demodulate and decode on a per-slot basis the UE specific DL control and data signals for the UEs being relayed by the SR, even if all the UE-specific transmission parameters were known to the SR, would be an exceedingly complex BB processing task for the SR implementation which is clearly undesirable.

One design requirement for NR smart repeaters is their ability to operate efficiently in presence of NR beamforming. Side control information (SCI) is provided to the SR to enable a more intelligent amplify-and-forward operation in a system with NR TDD access and NR multi-beam operation. For the SR to support beamforming of transmissions to and receptions from the UEs being relayed, measurements by the SR can be beneficial on signals transmitted to UEs or received from UEs. For example, Rel-15 NR transmitter/receiver spatial beamforming can use SSB and/or CSI-RS configured in the DL and transmitted by the gNB, and SRS transmitted by the UE in the UL for the purpose of measurements and the associated reporting for radio link management, beam management and mobility handling.

Because the precise UE UL transmission timings are not known by the SR, UL measurements by the SR on the UE UL signal(s), received by the SR at the ingress RF port of the SR amplify-and-forward RF path cannot be done without undue complexity. For example, in Rel-15 NR, the symbol allocations for SRS transmission by a UE in a slot, the SRS periodicity, the SRS transmission bandwidth, the SRS frequency hopping behavior, and the SRS sequence generation are configured by the gNB using RRC signaling to the UE. The SR doesn't know the SRS configuration of the UE(s) for which it relays signals. In addition, in Rel-15 NR many UL transmissions by UEs can be dynamically scheduled or triggered by the gNB. Similarly, the SR cannot estimate the UL reception timing of the UE transmission(s) autonomously without undue complexity. For example, it might be considered to use the analog UE signal(s) at the SR ingress antenna port and to implement power-based detection of the UE UL signals. However, this task would be exceedingly complex to implement in the SR, because the receive timing uncertainty can be in the order of several micro-seconds (usec) for the UE transmission(s) when the UE operates in presence of the gNB controlled timing advance procedure. The received UE UL signal(s) must be detected and processed by the SR at sample level across the duration of the receive timing uncertainty window. Note that detection performance-wise, the receive timing uncertainty degrades the theoretically achievable signal estimation quality in the SR for the received UL transmission(s) from the UE(s). In consequence, not knowing the precise UL transmit timing of the UE signal(s) being relayed in the amplify-and-forward path is detrimental to SR operation in presence of beamforming, e.g., it requires a very complex SR implementation (if even possible at all).

Note that IAB operation does not suffer from these shortcomings. Contrary to SR operation, the IAB node creates its own cells towards the UEs, e.g., the IAB-DU itself controls the UL transmit timing and the Tx/Rx beam settings of the UEs which are connected to it. The IAB-DU can therefore determine the UL reception timing of the UL signals transmitted by the UEs using information available locally at the IAB node, then configure its UL receiver timing correspondingly, and set its spatial domain transmit and receive filters during beam management for the connected UEs to perform the UL-based measurements. The IAB node (unlike the SR) knows the UL transmit timing and DL and/or UL spatial settings for the UEs.

For SR operation, not knowing the precise UL transmit timing of the UE signal(s) being relayed in the SR amplify-and-forward path results in additional constraints. For example, and without loss of generality, it can be assumed that for purpose of SR UL transmit timing control of the SCI transmissions from the SR mobile terminal (SR-MT), the gNB can reuse the principles of the existing NR (UE) transmission timing procedure. The gNB can use a single timing control loop on the carrier with a sequence of TA commands to control the UL timing of UL SCI transmission by the SR-MT. The gNB can then determine the relative receive timing difference between a first transmit timing-controlled UL signal from a UE being relayed by the SR remote/RF unit (SR-RU) and a second transmit timing-controlled UL signal with UL SCI from the SR-MT in a slot. The level of required accuracy and the needed adjustment range for the SR timing control adjustments of the SR are necessarily different when compared to the UE. It can be expected that the SR-MT often uses a smaller TA than the TAs of the UEs which it is relaying, e.g., the SR is closer to the gNB in a typical relay deployment. Therefore, the UL SCI transmissions by the SR-MT can be expected to start later than the UE UL transmissions in a slot (with respect to the same DL timing reference). Using the existing NR UL transmit timing procedure, the SR transmit timing of UL SCI can be controlled, because UL SCI is generated in the SR-MT BB and converted from digital to analog domain. However, the SR-RU cannot control the timing of the UE signals being relayed in its analog (UL) amplify-and-forward signal in the user-plane. Combining the analog user plane signal with UE signals being relayed by the SR-RU amplify-and-forward path with the digital-to-analog converted UL transmissions of SCI generated locally in the SR is subject to power envelope and dynamic range constraints. Requiring the SR to support arbitrarily flexible UL transmission timing settings for its SCI transmissions with respect to the user-plane UE signal(s) being relayed in analog domain requires an exceedingly complex SR implementation. The start and duration of UL SCI transmission by the SR-MT in a slot must also be timing-controlled with respect to the next slot. UL transmission of UL SCI by the SR with respect to transmission timing, power envelope and dynamic range constraints to which the amplify-and-forward RF path is subjected then becomes even more challenging.

Accordingly, embodiments of the present disclosure provide methods and solutions to improve upon the UL SCI transmission timing of smart repeaters to reduce the SR implementation complexity and to control the interference and receive power levels when multiplexing UL transmissions by UEs with UL transmissions of UL SCI by the SR.

Embodiments of the present disclosure further provide methods and solutions to improve upon the transmission and reception timing(s) of smart repeaters to enable measurements by the SR using signals received from UEs being relayed, to reduce the implementation complexity of the SR and to control the interference and receive power levels in a cell or deployment when multiplexing UL transmissions from UEs with the UL transmissions of SCI from the SR.

Various embodiments of the present disclosure provide additional design aspects for support of UL SCI transmission timing by smart repeaters, and provide solutions as fully elaborated in the following. The present disclosure considers methods using the SR timing advance procedure with configurable transmit timing adjustment value(s), methods using multiple SR timing advance procedures in a serving cell with timing slot groups (or multiple timing advance groups in one serving cell), methods for UL SCI transmission using timing slot groups or per-channel/signal configurable timing adjustments or based on signal reception conditions.

Various embodiments of the present disclosure provide additional design aspects for support of reception and transmission timings by smart repeaters, and provide solutions as fully elaborated in the following. The present disclosure considers methods for signaling to and provisioning of the SR with configurable receive timing adjustment(s) for one or multiple UE(s), methods using receive timing adjustment as values or as window/range for reception of UE UL signals by the repeater, and methods for signaling and configuration of timing signal(s) and/or timing reference(s) for a repeater.

In the following, unless otherwise explicitly noted, providing a parameter value by higher layers includes providing the parameter value by a system information block (SIB), such as a SIB 1, or by a common RRC signaling, or by UE-specific RRC signaling.

In the following, for brevity and conciseness of description, the higher layer provided TDD UL-DL frame configuration refers to tdd-UL-DL-ConfigurationCommon as example for RRC common configuration and/or tdd-UL-DL-ConfigurationDedicated as example for UE-specific configuration. The UE determines a common TDD UL-DL frame configuration of a serving cell by receiving a system information block (SIB) such as a SIB1 when accessing the cell from RRC_IDLE or by common RRC signaling when the UE is configured with Scell(s) or additional SCG(s) by an IE ServingCellConfigCommon in RRC_CONNECTED. The UE determines a dedicated TDD UL-DL frame configuration using the IE ServingCellConfig when the UE is configured with a serving cell, e.g., add or modify, where the serving cell may be the SpCell or an SCell of an MCG or SCG. A TDD UL-DL frame configuration designates a slot or symbol as one of types 'D', 'U' or 'F' using at least one time-domain pattern with configurable periodicity.

In the following, for brevity and conciseness of description, SFI refers to a slot format indicator as example which is configured using higher layer provided IEs such as slotFormatCombination or slotFormatCombinationsPerCell and which is indicated to the UE by group common DCI such as DCI F2_0 where slotFormats are defined in REF3.

In one embodiment, the SR is provided with a configurable transmit timing adjustment value $N_{delta}$ allowing to adjust the SR UL Tx timing in a slot to $(N_{TA}+N_{TA,offset}+N_{delta})*T_c$. A value of $N_{delta}$ can be configured for a slot or a same $N_{delta}$ value can be configured for multiple slots. $N_{delta}$ can be configured per UL signal or per channel type. A same $N_{delta}$ value can be configured for multiple SRs to determine their UL transmit timing in a slot, or different $N_{delta}$ values can be configured for different SRs. $N_{delta}$ value(s) including their associated slot(s), signal or channel type(s) or their associated signal transmission and reception condition(s) can be predetermined in the specifications for system operation or can be provided to an SR by means of pre-configuration or by higher layer signaling such as RRC signaling message(s) or by MAC CE(s) or by a DCI format, or variants thereof. If a same $N_{delta}$ value is provided for multiple SRs in a slot, a common RRC or MAC signaling message may be used. A dedicated or common type RRC signaling configuration may be used to provide value(s) of $N_{delta}$ to an SR. $N_{delta}$ value(s) including their associated slot(s), UL signal or channel type(s) or their associated signal transmission and reception condition(s) can be provided to an SR by means of a MAC CE signaling message or signaling received on PDSCH. The SR may determine a default value for $N_{delta}$ in a slot. $N_{delta}$ value(s) provided to the SR by RRC or MAC signaling may be used in conjunction.

In one embodiment, the SR maintains a first and a second timing advance value $N_{TA1}$ and $N_{TA2}$ for a serving cell. The first timing advance value $N_{TA1}$ for a serving cell is associated with UL transmission timing of SCI by the SR for a first set of slots on the serving cell. The second timing advance value $N_{TA2}$ for a serving cell is associated with UL transmission timing of SCI by the SR for a second set of slots on the serving cell. The first and second set of slots on the serving cell may be referred to as a first Timing Slot Group $TSG_1$ and a second Timing Slot Group $TSG_2$. An SR can be configured with one or more Timing Slot Group(s) (TSG(s)) for a serving cell where α TSG is a set of slots of a serving cell associated with a same signaled timing advance value. The SR may determine the UL transmission timing of SCI in a slot using either the first or the second timing advance value $N_{TA1}$ or $N_{TA2}$, e.g., the SR maintains two independent timing advance loops for the serving cell, one for UL transmissions of SCI in the first set of slots and another one for UL transmissions of SCI in the second set of slots. A first value $N_{TA1}$ may be used by the SR to determine UL transmission timing of SCI in a first type of slot(s). The second value $N_{TA2}$ may be used by the SR to determine UL transmission timing of SCI in a second type of slot(s). The SR may determine the UL transmission timing of SCI in a slot using both the first and the second timing advance value $N_{TA1}$ or $N_{TA2}$, e.g., the SR may maintain two independent timing advance loops, but the UL transmission timing of SCI in a slot is determined by the SR using $N_{TA1}$ and $N_{TA2}$ in combination. The timing advance values $N_{TA1}$ and $N_{TA2}$ associated with the SR UL transmission timing of SCI in different slot groups may be provided to the SR by MAC CE. Indications to update the first and second timing advance values $N_{TA1}$ and $N_{TA2}$ maintained by the SR for a serving cell may be provided to the SR by a same or by different Timing Advance Command and/or Absolute Timing Advance Command MAC CE(s) by means of index values $TA_1$ and $TA_2$ respectively. Configuration parameters associated with a Timing Slot Group may be provided to the SR by pre-configuration or by higher layer signaling such as RRC signaling. A timer value or counter value or priority indicator may be associated with a Timing Slot Group. The SR determines transmission timing of SCI in a slot using the transmit timing of the timing slot group configured with a higher priority.

Figure 14:
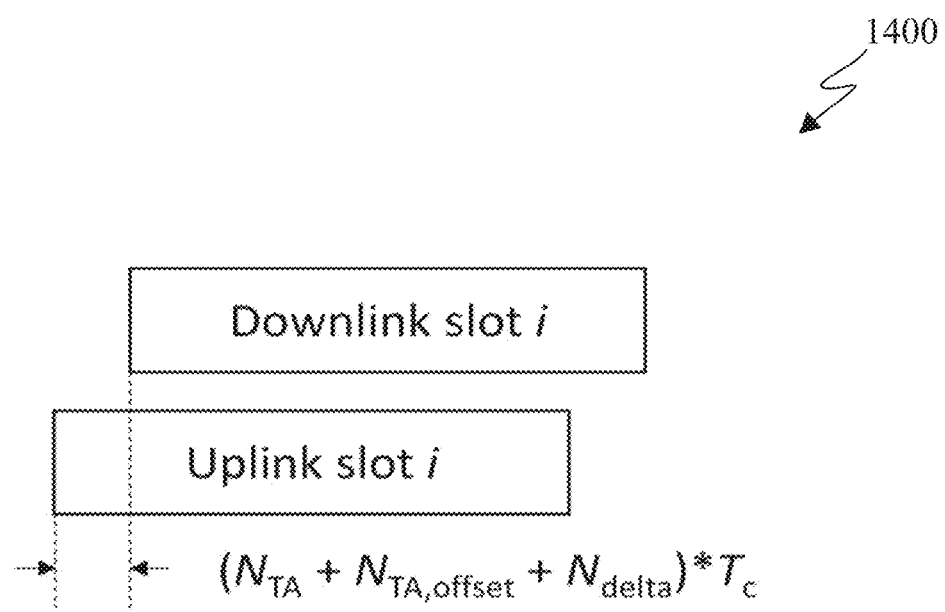
FIG. 14 illustrates an example SR UL-DL timing relation with a timing offset adjustment according to embodiments of the present disclosure.

FIG. 14 illustrates an example SR UL-DL timing relation with a timing offset adjustment 1400 according to embodiments of the present disclosure. The embodiment of the SR UL-DL timing relation with a timing offset adjustment 1400 illustrated in FIG. 14 is for illustration only. FIG. 14 does not limit the scope of this disclosure to any particular implementation of the SR UL-DL timing relation with a timing offset adjustment 1400.

In one embodiment, the SR is provided with a configurable transmit timing adjustment value $N_{delta}$ allowing to adjust the SR UL Tx timing in a slot. As shown in FIG. 14, UL slot number i for transmission from the SR starts $(N_{TA}+N_{TA,offset}+N_{delta})*T_c$ before the start of the corresponding DL slot i at the SR where $N_{TA}$ and $N_{TA,offset}$ are given by REF3 and REF5. An SR can be provided a value $N_{delta}$ of a transmit timing adjustment in a slot for a serving cell by an RRC and/or MAC CE provided parameter n-TimingAdvanceAdjustment for the serving cell as described in the embodiments of the disclosure. In another example, a value $N_{delta}$ can be provided in a PDCCH/DCI for the SR that schedules a PUSCH by the SR to transmit an UL SCI. If the SR is not provided n-TimingAdvanceAdjustment for a serving cell, the SR may determine a default value $N_{delta}$ of the transmit timing adjustment in a slot for the serving cell. If an SR is configured with two UL carriers for a serving cell, a same timing advance offset value $N_{delta}$ may be applied to both carriers. Upon reception of a timing advance command for the serving cell, the SR adjusts the UL timing for an UL SCI transmission using PUSCH, SRS, PUCCH or RACH in a slot of the serving cell based on a value $N_{TA,offset}$ that the SR expects to be same for all the slots in the serving cell and based on the received timing advance command and based on the transmit timing adjustment value $N_{delta}$ provided for the slot.

Different timing adjustment values $N_{delta}$ may be provided for different slots, e.g., a first value $N_{delta,i}$ is provided for slot i and a second value $N_{delta,j}$ is provided for slot j. Upon reception of a timing advance command for the serving cell, the SR adjusts the UL timing for an SCI transmission using PUSCH, SRS, PUCCH or RACH in the serving cell in slot i based on $N_{TA,offset}$ that the SR expects to be same for all the slots in the serving cell and based on the received timing advance command and based on the transmit timing adjustment value $N_{delta,i}$ provided for the slot i where the PUSCH, SRS, PUCCH or RACH transmission occurs. A value for $N_{delta}$ may be encoded jointly with the existing parameter $N_{TA,offset}$ and provided to the SR. Instead of a value $N_{delta}$ provided for a slot, a timing adjustment value may be provided for a symbol time interval or a multiple thereof. A timing adjustment value $N_{delta}$ may be defined with respect to a same or a predetermined or an adjustable or scalable step size and/or desired timing resolution. For example, a value for $N_{delta}$ may be provided as a multiple of $16*64*T_c/2^\mu$.

Using the configurable transmit timing adjustment $N_{delta}$ to control the UL transmit timing of SCI transmissions in a slot, the relative transmission timing difference in a slot can be adjusted for the SR with respect to the UL reception of the UE signal(s) at the gNB when an SR is deployed in a cell. Reception timing by the gNB of a first UL transmission from the SR in a first slot carrying a first SCI can be set differently from reception timing by the gNB of a second UL transmission carrying a second SCI by that same SR in a second slot. The gNB can adjust its receiver processing accordingly, because the transmit timing offset for SCI transmissions by the SR is set by and known to the gNB. Use of a single timing advance procedure and $T_A$ loop is still possible for the SR. For example, the gNB can select and configure the timing adjustment values $N_{delta}$ using gNB-side and/or SR-reported measurements, e.g., based on SRS when configured for link adaptation and cross-link interference management reporting.

The provided timing adjustment value $N_{delta}$ may be associated with a set of slots. A set of slots for which a same transmit timing adjustment value $N_{delta}$ is provided is referred to as Timing Slot Group (TSG) in the disclosure.

In one embodiment, an SR can be provided information of a TSG containing only a single slot or multiple slots. In one example, =there may be only a single TSG, e.g., the TSG comprises all slots. The determination of the transmit timing by the SR in a slot may then be described by not using the term "TSG" and substituting the term "slot" for it in the following exemplary procedures described in the disclosure.

When the TSG comprise more than one slot, the slots of the TSG can be consecutive, or they can be non-consecutive. For example, when SR is provided information of a TDD DL/UL configuration, a TSG can include a number of UL or flexible slots (that may or may not be consecutive). In one example, an SR does not apply TSG configuration to DL slots. One or multiple TSGs may be configured for the SR by parameter n-tsgList. For example, a first TSG for a first set of slots of type 'U' may be configured in the SR. A second TSG for a second set of slots slot of type 'F' may be configured in the SR. When a transmit timing adjustment value $N_{delta}$ is provided for a TSG, the value $N_{delta}$ is applied by the SR to determine the UL transmit timing for SCI in a slot in the TSG. The value $N_{delta}$ is not applied by the SR to determine the UL transmit timing in a slot when the slot is not part of the TSG. Different values $N_{delta}$ may be associated with different TSGs, e.g., one or more sets of values $N_{delta}$ may be provided to the SR. When a set of $N_{delta}$ values is provided to the SR, the SR determines a value $N_{delta}$ in the slot from the set of provided a set of $N_{delta}$ values by selecting the value $N_{delta}$ associated with the TSG of the slot.

Figure 15:
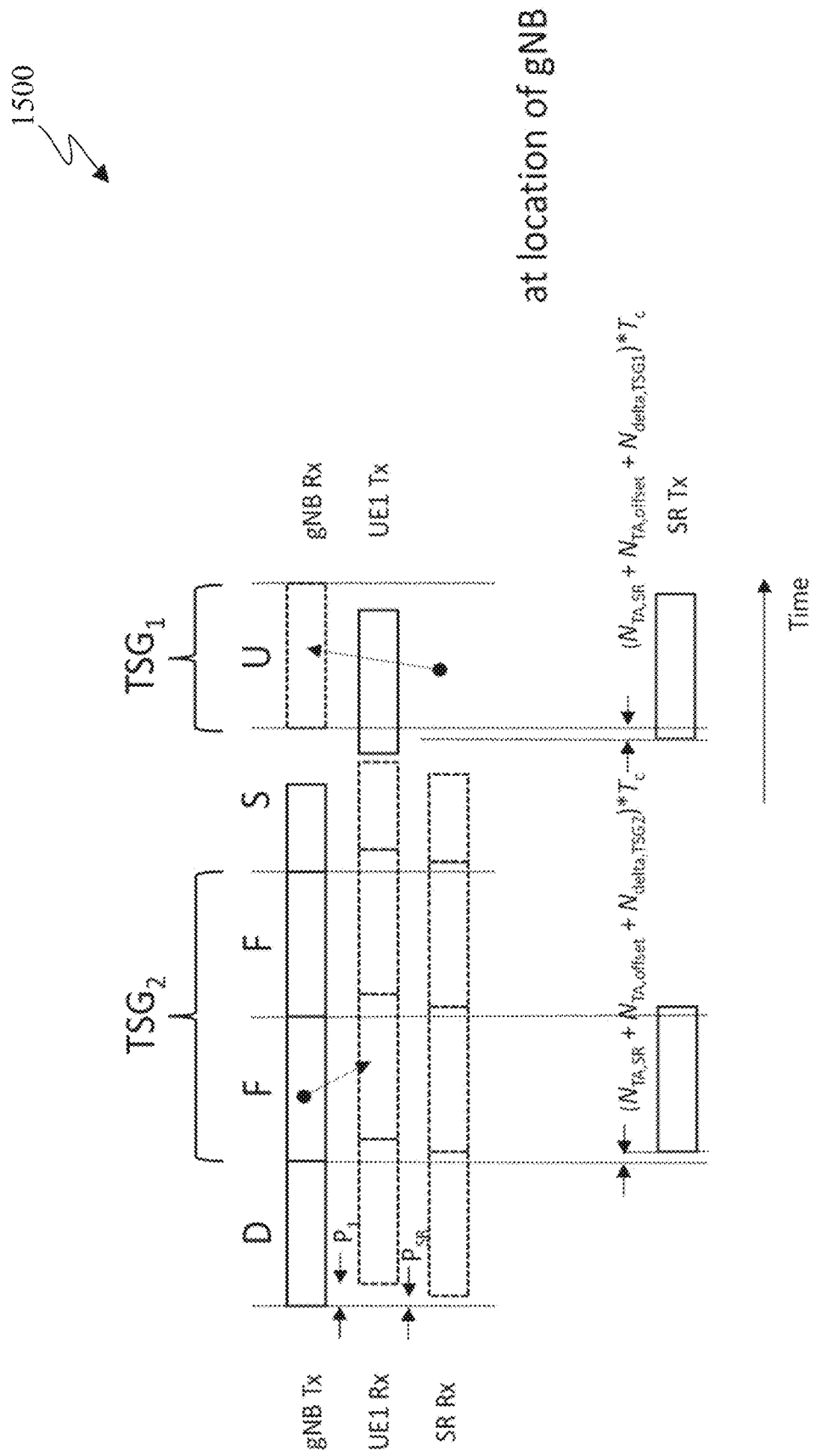
FIG. 15 illustrates an example SR UL-DL timing relations with timing slot groups according to embodiments of the present disclosure.

FIG. 15 illustrates an example SR UL-DL timing relations with timing slot groups 1500 according to embodiments of the present disclosure. The embodiment of the SR UL-DL timing relations with timing slot groups 1500 illustrated in FIG. 15 is for illustration only. FIG. 15 does not limit the scope of this disclosure to any particular implementation of the SR UL-DL timing relations with timing slot groups 1500.

As shown in FIG. 15, a first timing slot group, $TSG_1$ and a second timing slot group $TSG_2$ are configured for the SR. $TSG_1$ contains the UL slot, e.g., slot #4 and TSG2 contains the flexible slots, e.g., slot #1 and #2, where slots are numbered from 0 to 4. The SR is provided a first timing adjustment value $N_{delta,TSG1}$ for $TSG_1$ and a second timing adjustment value $N_{delta,TSG2}$ for $TSG_2$. When the SR transmits SCI in the UL, it determines its transmission timing as $(N_{TA}+N_{TA,offset}+N_{delta,TSG2})*T_c$ if the UL transmission with SCI using PUSCH, SRS, PUCCH, or RACH occurs in the 'F' slots. The SR determines a transmission timing as $(N_{TA}+N_{TA,offset}+N_{delta,TSG1})*T_c$ if SCI is transmitted in the UL slot of type 'U'. Note that when the SR is provided $N_{delta,TSG1}=0$, the UL transmissions from the SR in the UL slot would result in the determination of transmit timing by the SR according to the existing UE transmit timing procedure in that slot.

An SR can be configured with one or more Timing Slot Group (TSG) for a serving cell. A TSG is a set of slots that is configured by RRC or MAC for a serving cell with an UL using a timing reference and using a same signaled timing advance value but using a different transmit timing adjustment value. A TSG containing an UL slot may be referred to as Primary Timing Slot Group (PTSG), whereas the term Secondary Timing Slot Group (STSG) may refer to other TSGs. For example, an STSG may be configured to comprise slots where SCI transmissions from the SR to the gNB are possible.

When a TSG m is configured for the SR, UL slot number i for transmission from the SR starts $(N_{TA}+N_{TA,offset}+N_{delta,TSGm})*T_c$ before the start of the corresponding DL slot at the SR where $N_{TA}$ and $N_{TA,offset}$ are given by REF3 and REF5. If only a single transmit timing adjustment value is provided, the TSG index m can be omitted, e.g., $N_{delta,TSGm}=N_{delta}$.

The SR can be provided one or more values $N_{delta,TSGm}$ of a transmit timing adjustment for a serving cell by an RRC or MAC CE provided parameter n-tsgList for a TSG of the serving cell as described in the embodiments of the disclosure. If the SR is not provided n-tsgList for a TSG of the serving cell, the SR may determine one or more default values $N_{delta,TSGm}$ associated with a TSG for the serving cell.

Upon reception of a timing advance command for the TSG, the SR adjusts UL timing for SCI transmission using PUSCH, SRS, PUCCH or RACH in the serving cell for the configured TSG(s) based on a value $N_{TA,offset}$ that the SR expects to be same for all the slots in the TSG(s) and based on the received timing advance command and based on transmit timing adjustment value $N_{delta,TSGm}$ provided for TSG m for slot(s) configured by parameter n-tsgList for TSG m.

In one example, for a timing advance command received on UL slot i and for a transmission other than a PUSCH scheduled by a RAR UL grant or a fallbackRAR UL grant, or a PUCCH with HARQ-ACK information in response to a successRAR, the corresponding adjustment of the UL transmission timing applies from the beginning of UL slot i+k+1 where $k=[N_{slot}^{subframe,\mu} \cdot (N_{T,1}+N_{T,2}+N_{TA,max}+0.5)/T_{sf}]$, where parameters $N_{T,1}$ and $N_{T,2}$ are provided by REF4, $N_{TA,max}$ is the maximum timing advance value in msec that can be provided by a $T_A$ command field of 12 bits, and where $N_{slot}^{subframe,\mu}$ and $T_{sf}$ are provided by REF1. The UL slot i is the last slot among UL slot(s) overlapping with the slot(s) of PDSCH reception assuming $T_{TA}=0$, where the PDSCH provides the timing advance command and $T_{TA}$ is defined in REF1. In another example, when a TSG is configured in the SR, the corresponding adjustment of the transmission timing following reception of a timing advance command may be applied either before the first or after the last slot of a sequence of consecutive slots of the TSG, e.g., a same transmit timing during a sequence of consecutive slots configured for TSG m should be maintained by the SR.

When the SR is configured with a TSG m, the UL frame transmission in a slot associated with TSG m takes place $(N_{TA}+N_{TA,offset}+N_{delta,TSGm})*T_c$ before the reception of the first detected path (in time) of the corresponding DL frame from the reference cell. When the transmission timing error between the SR and the reference timing exceeds $\pm T_e$ then the SR adjusts its timing to within $\pm T_e$. The reference timing is $(N_{TA}+N_{TA,offset}N_{delta,TSGm})*T_c$ before the DL timing of the reference cell. The size of the adjustment steps and the minimum and maximum magnitude of the adjustment steps in a period of time is described by REF7.

Figure 16:
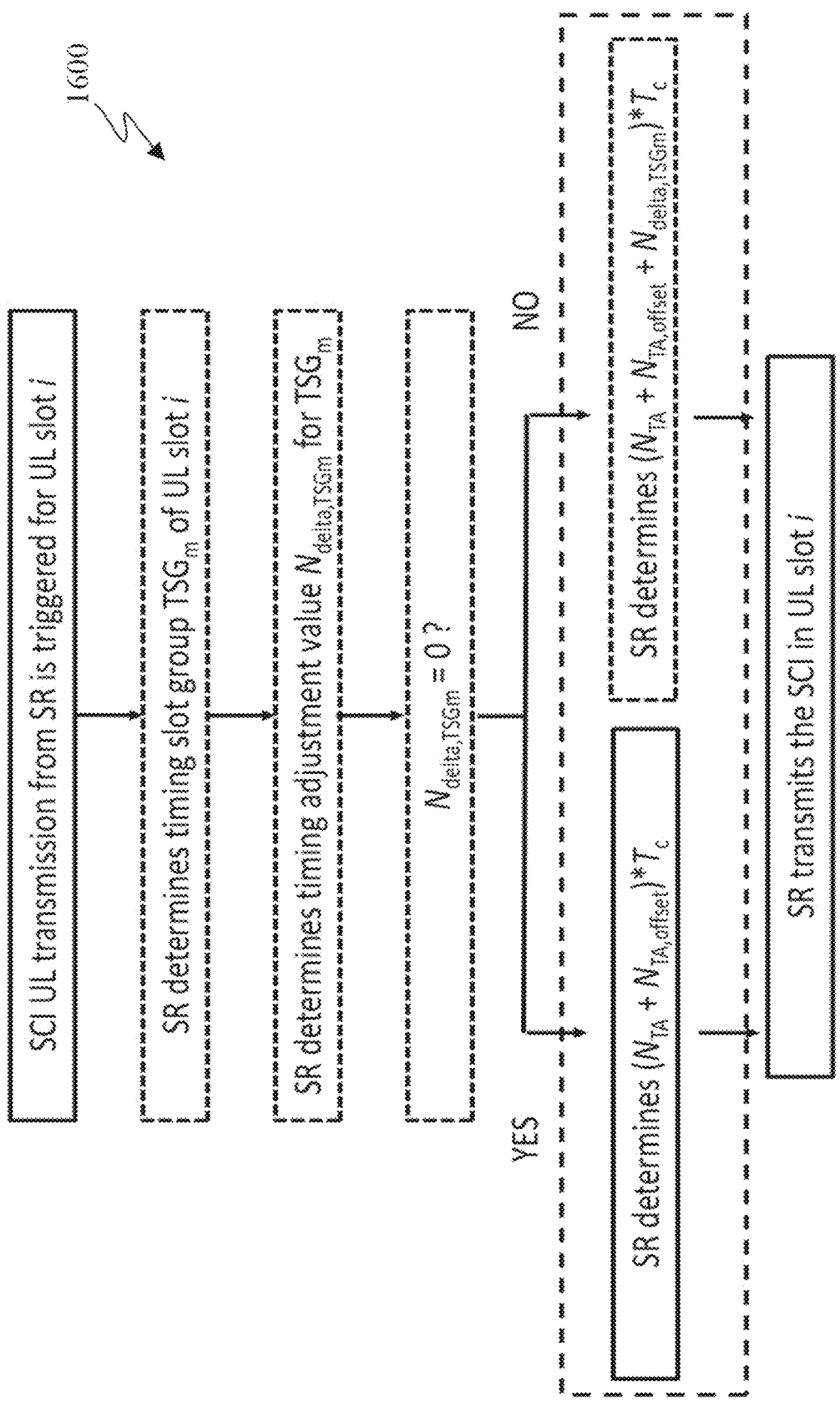
FIG. 16 illustrates an example SR processing flowchart for determination of UL transmission timing of SCI with a timing slot group according to embodiments of the present disclosure.

FIG. 16 illustrates an example SR processing flowchart for determination of UL transmission timing of SCI with a timing slot group 1600 according to embodiments of the present disclosure. The embodiment of the SR processing flowchart for determination of UL transmission timing of SCI with a timing slot group 1600 illustrated in FIG. 16 is for illustration only. FIG. 16 does not limit the scope of this disclosure to any particular implementation of the SR processing flowchart for determination of UL transmission timing of SCI with a timing slot group 1600.

FIG. 16 illustrates an example SR transmit timing processing chain according to embodiments of the disclosure. An SR determines transmit timing for an UL transmission of SCI starting in slot i. The SR determines the timing slot group of the slot i for the UL transmission of SCI. The SR determines a transmit timing adjustment value $N_{delta,TSGm}$ from a signaled or tabulated value(s) for the timing slot group in which slot i is configured. The SR determines an UL transmit timing of SCI for slot i as $(N_{TA}+N_{TA,offset})*T_c$ and applies the transmit timing adjustment value $N_{delta,TSGm}$ to determine the quantity $(N_{TA}+N_{TA,offset}+N_{delta,TSGm})*T_c$ with reference to the timing provided by reception of the first detected path (in time) of the corresponding DL frame (or slot). The SR sets the transmit timing of the UL transmission of SCI in UL slot i to the computed value and proceeds with the UL transmission of SCI at the determined transmission time.

In one embodiment, the SR is provided with a configurable transmit timing adjustment value $N_{delta}$ allowing to adjust the SR UL Tx timing in a slot per UL signal or channel type carrying SCI, e.g., PUSCH, SRS or PUCCH. A value of $N_{delta}$ per UL signal or channel type can be configured for a slot or a same $N_{delta}$ value per UL signal or channel type can be configured for multiple slots. A same $N_{delta}$ value per UL signal or channel type can be configured for multiple SRs to determine the UL transmit timing of the UL signal or channel type in a slot, or different $N_{delta}$ values can be configured for different SRs. $N_{delta}$ value(s) including their associated slot(s), UL signal or channel type(s) or their associated signal transmission and reception condition(s) can be provided to the SR by means of RRC or MAC signaling message(s). If a same $N_{delta}$ value is provided for multiple SRs in a slot, a common RRC signaling message may be used. A dedicated or common type RRC signaling configuration may be used to provide value(s) of $N_{delta}$ per UL signal or channel type carrying SCI to an SR. $N_{delta}$ value(s) including their associated slot(s), UL signal or channel type(s) or their associated signal transmission and reception condition(s) can be provided to an SR by means of a MAC CE signaling message. The SR may determine a default value for $N_{delta}$ in a slot. $N_{delta}$ value(s) provided to the SR by RRC signaling may be used in conjunction with MAC CE provided $N_{delta}$ values.

Different timing adjustment values $N_{delta}$ may be provided for UL signals or channels carrying SCI of different types and formats. For example, a first value $N_{delta,SRS}$ is provided for UL transmissions of SRS by the SR, a second value $N_{delta,PUSCH}$ is provided for UL transmissions of SCI using PUSCH by the SR or a third value $N_{delta,PUCCH}$ is provided for UL transmissions of SCI using PUCCH by the SR. In another example, a separate transmit timing adjustment value $N_{delta,PUCCH-F0}$ is provided to the SR for UL transmissions of SCI using 1 or 2 symbol short PUCCH format and another timing adjustment value $N_{delta,PUCCH-F1}$ is provided to the SR for UL transmissions of SCI using a 4-14 symbol long PUCCH format. Upon reception of a timing advance command for the serving cell, the SR adjusts the UL Tx timing of SCI for a PUSCH, SRS or PUCCH transmission in the serving cell in slot i based on $N_{TA,offset}$ that the SR expects to be same for all the slots in the serving cell and based on the received timing advance command and based on the transmit timing adjustment value $N_{delta,type}$ provided for the slot i where 'type' corresponds to the UL transmission format of SCI, e.g., PUSCH, SRS or PUCCH.

Using the configurable transmit timing adjustment $N_{delta,type}$ to control the UL transmit timing of SCI transmissions, the relative transmission timing difference can be best adjusted with respect to the signal characteristics of UL transmissions of the UE signal(s) at the gNB when an SR is deployed in a cell. For short UL transmissions carrying SCI, e.g., SRS with only L=1 or 2 symbol groups or PUCCH F0 with 1 or 2 symbols, there may not be needed to adjust the SR transmit timing in a slot due to their sequence based transmission format. Moreover, transmission of such short UL signals carrying SCI can be configured or scheduled avoiding the last symbols of a slot. For longer UL transmission carrying SCI occupying multiple symbols in a slot, it is desirable to adjust the SR transmit timing with respect to the transmission timing of the UEs in a slot to avoid the need for guard symbols for purpose of UL SCI transmissions by the SR. Reception timing of the UL transmission carrying SCI for a particular UL signal or channel type from the SR by the gNB in a slot can be different from the reception timing of UL transmissions carrying SCI by that same SR in another slot. The gNB can adjust its receiver processing accordingly, because the transmit timing offset for SCI transmissions by the SR is set by and known to the gNB. Use of a single timing advance procedure and TA loop is still possible for the SR.

Figure 17:
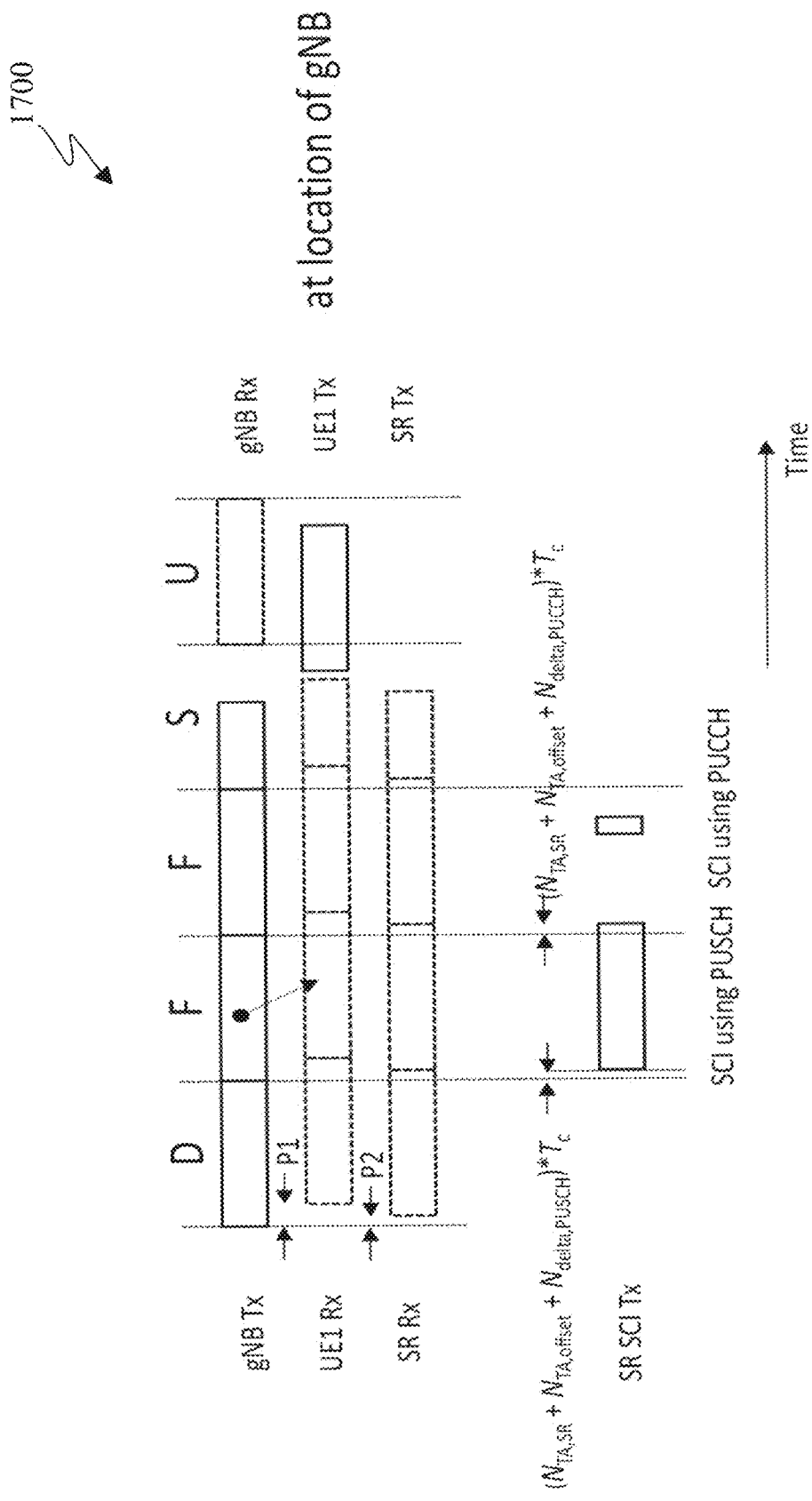
FIG. 17 illustrates an example SR UL-DL timing relations with different UL signal or channel types according to embodiments of the present disclosure.

FIG. 17 illustrates an example SR UL-DL timing relations with different UL signal or channel types 1700 according to embodiments of the present disclosure. The embodiment of the SR UL-DL timing relations with different UL signal or channel types 1700 illustrated in FIG. 17 is for illustration only. FIG. 17 does not limit the scope of this disclosure to any particular implementation of the SR UL-DL timing relations with different UL signal or channel types 1700.

As shown in FIG. 17, the SR is provided a first timing adjustment value $N_{delta,PUCCH}$ and a second timing adjustment value $N_{delta,PUSCH}$ When the SR transmits PUCCH with SCI in the UL, it determines its transmission timing as $(N_{TA}+N_{TA,offset}+N_{delta,PUCCH})*T_c$. The SR determines a transmission timing as $(N_{TA}+N_{TA,offset}+N_{delta,PUSCH})*T_c$ if it transmits PUSCH with SCI in a slot. When the SR is provided $N_{delta,x}=0$, the UL transmissions of SCI from the SR would result in the determination of UL transmit timing for SCI transmission by the SR according to the existing UE transmit timing procedure.

In one embodiment, the SR determines a transmit timing adjustment value $N_{delta}$ in a slot for SCI transmission depending on DL signal reception and/or UL signal transmission conditions. DL signal reception and/or UL signal transmission conditions may include one or more of:
  slot and/or symbol types of type D (Downlink), U (Uplink) or F (Flexible) in a TDD common or dedicated UL-DL frame configuration or provided through SFI such as in DCI F2_0;
  a measurement of type received or transmitted signal power (or quality) incl. associated threshold and/or hysteresis values to determine an evaluation metric using a measurement;
  a signal range, e.g., within limit(s) of minimum and/or maximum power or signal levels
  a timer or counter value associated with a duration of time during which a signal transmission from an SR is permitted or prohibited.

In one example, a different transmit timing adjustment value $N_{delta,type}$ may be provided for different slots of types U or F, e.g., a first value $N_{delta,F}$ is provided for a slot of type 'F' and a second value $N_{delta,U}$ is provided for a slot of type 'U'. Upon reception of a timing advance command for the serving cell, the SR adjusts the UL timing for SCI transmission using PUSCH, SRS, PUCCH or RACH in the serving cell in a slot i based on $N_{TA,offset}$ that the SR expects to be same for all the slots in the serving cell and based on the received timing advance command and based on the transmit timing adjustment value $N_{delta,type}$. If slot i is determined to be of type 'F', $N_{delta,F}$ is used by the SR to determine the transmit timing adjustment, but $N_{delta,U}$ is used by the SR of slot i is determined to be of type 'U'.

Using the configurable transmit timing adjustment $N_{delta}$ to control the UL transmit timing of SCI transmissions, the relative transmission timing difference of the SR with respect to UE transmissions can be be best adjusted by the gNB with respect to propagation conditions and according to suitable deployment aspects during SR operation. Moreover, the relative receive timing difference of SCI transmissions by the SR can be autonomously adjusted during relaying operation. Reception timing of the UL transmission with SCI from the SR by the gNB in a slot can be different from the reception timing of UL transmissions with SCI by that same SR in another slot. For a slot configured as 'U', $N_{delta,type}$ may be configured as 0. The UL transmissions from the SR in the slot then follow existing UE transmit timing procedures. The gNB can adjust its receiver processing for reception of SCI from the SR accordingly, because the transmit timing offset that an SR determines in a slot is derived from RRC provided configuration.

Figure 18:
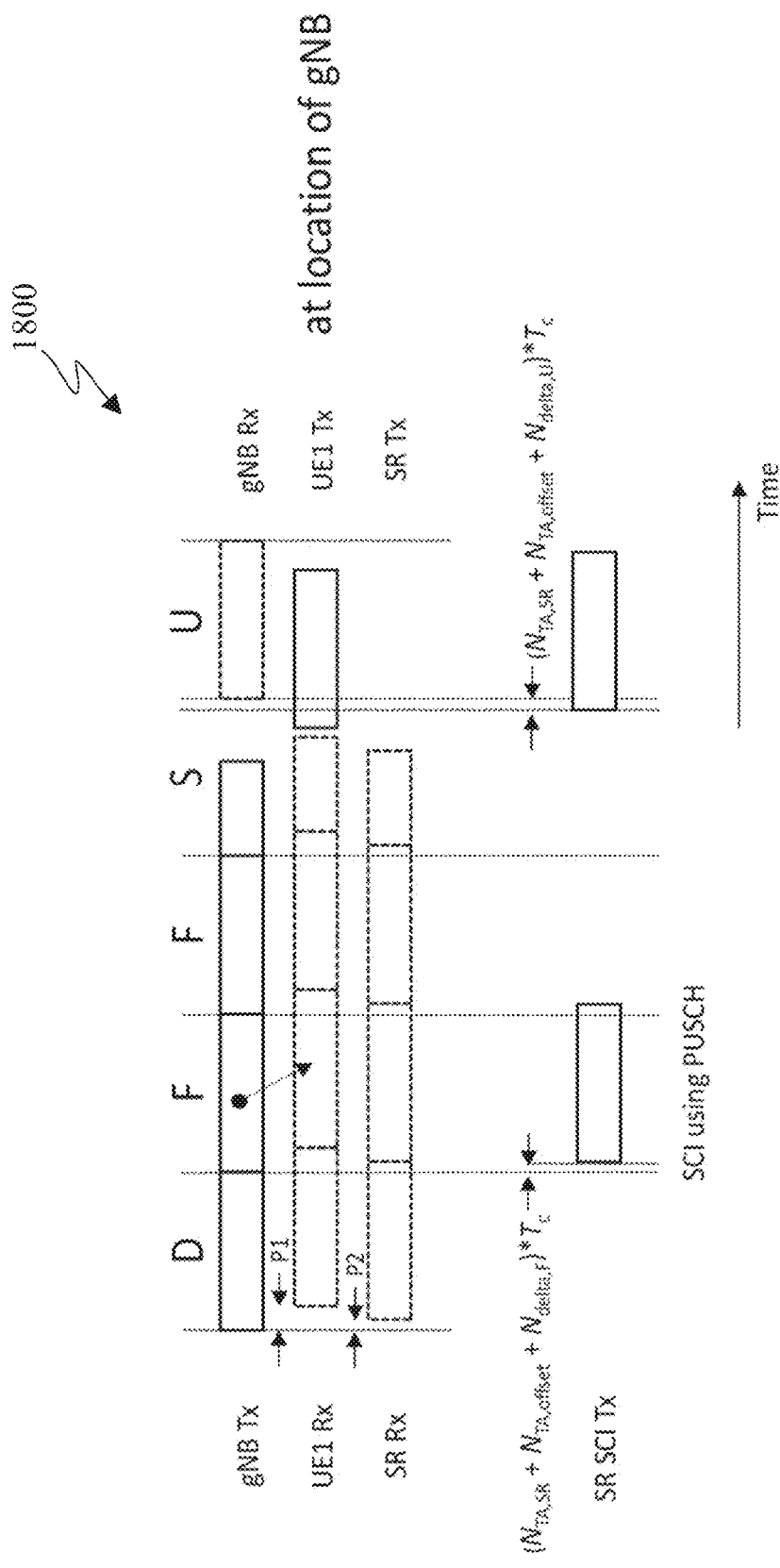
FIG. 18 illustrates an example UL-DL timing relations with signal reception conditions according to embodiments of the present disclosure.

FIG. 18 illustrates an example UL-DL timing relations with signal reception conditions 1800 according to embodiments of the present disclosure. The embodiment of the UL-DL timing relations with signal reception conditions 1800 illustrated in FIG. 18 is for illustration only. FIG. 18 does not limit the scope of this disclosure to any particular implementation of the UL-DL timing relations with signal reception conditions 1800.

As shown in FIG. 18, a TDD UL-DL frame configuration of type 'DFFFU' is provided to the SR by means of cell common RRC signaling, e.g., SIB1. The SR is provided a first timing adjustment value $N_{delta,F}$ for slots of type 'F' and a second timing adjustment value $N_{delta,U}$ for slots of type 'U'. When the SR is scheduled for UL transmission of SCI in slot #1 of type 'F' it determines its transmission timing as $(N_{TA}+N_{TA,offset}+N_{delta,F})*T_c$. The SR determines a transmission timing as $(N_{TA}+N_{TA,offset}+N_{delta,U})*T_c$ if it is scheduled to transmit SCI in slot #4. When the SR is provided $N_{delta,U}=0$, the UL transmissions with SCI from the SR in the UL slot would result in the determination of transmit timing by the SR according to the existing UE transmit timing procedure rules in that slot.

When a timing adjustment value is $N_{delta,type}$ is provided to the SR, UL slot number i for transmission from the SR starts $(N_{TA}+N_{TA,offset}+N_{delta,type})*T_c$ before the start of the corresponding DL slot at the SR where $N_{TA}$ and $N_{TA,offset}$ are given by REF3 and REF5. If only a single transmit timing adjustment value is provided, the index "type' can be omitted, e.g., $N_{delta,type}=N_{delta}$.

The SR can be provided one or more values $N_{delta,type}$ of a transmit timing adjustment for a serving cell by an RRC or MAC CE provided parameter n-timingAdjustmentList for a serving cell as described in the embodiments of the disclosure. If the SR is not provided n-timingAdjustmentList for a TSG of the serving cell, the SR may determine one or more default values $N_{delta,type}$ associated with an UL signal or channel type for SCI transmission in the serving cell.

Upon reception of a timing advance command for the serving cell, the SR adjusts UL timing SCI transmission on PUSCH, SRS, or PUCCH for the serving cell based on a value $N_{TA,offset}$ that the SR expects to be same for all slots in the TSG(s) and based on the received timing advance command and based on the transmit timing adjustment value $N_{delta,type}$ provided for slot(s) configured by parameter n-timingAdjustmentList.

When the SR is provided a timing adjustment value $N_{delta,type}$, the UL frame transmission of SCI in a slot associated with an UL signal or channel of 'type'={PUSCH, SRS, PUCCH} takes place $(N_{TA}+N_{TA,offset}+N_{delta,type})*T_c$ before the reception of the first detected path (in time) of the corresponding DL frame from the reference cell. When the transmission timing error between the SR and the reference timing exceeds $\pm T_e$ then the SR adjusts its timing to within $\pm T_e$. The reference timing is $(N_{TA}+N_{TA,offset}+N_{delta,type})*T_c$ before the DL timing of the reference cell. The size of the adjustment steps and the minimum and maximum magnitude of the adjustment steps in a period of time is described by REF7.

Figure 19:
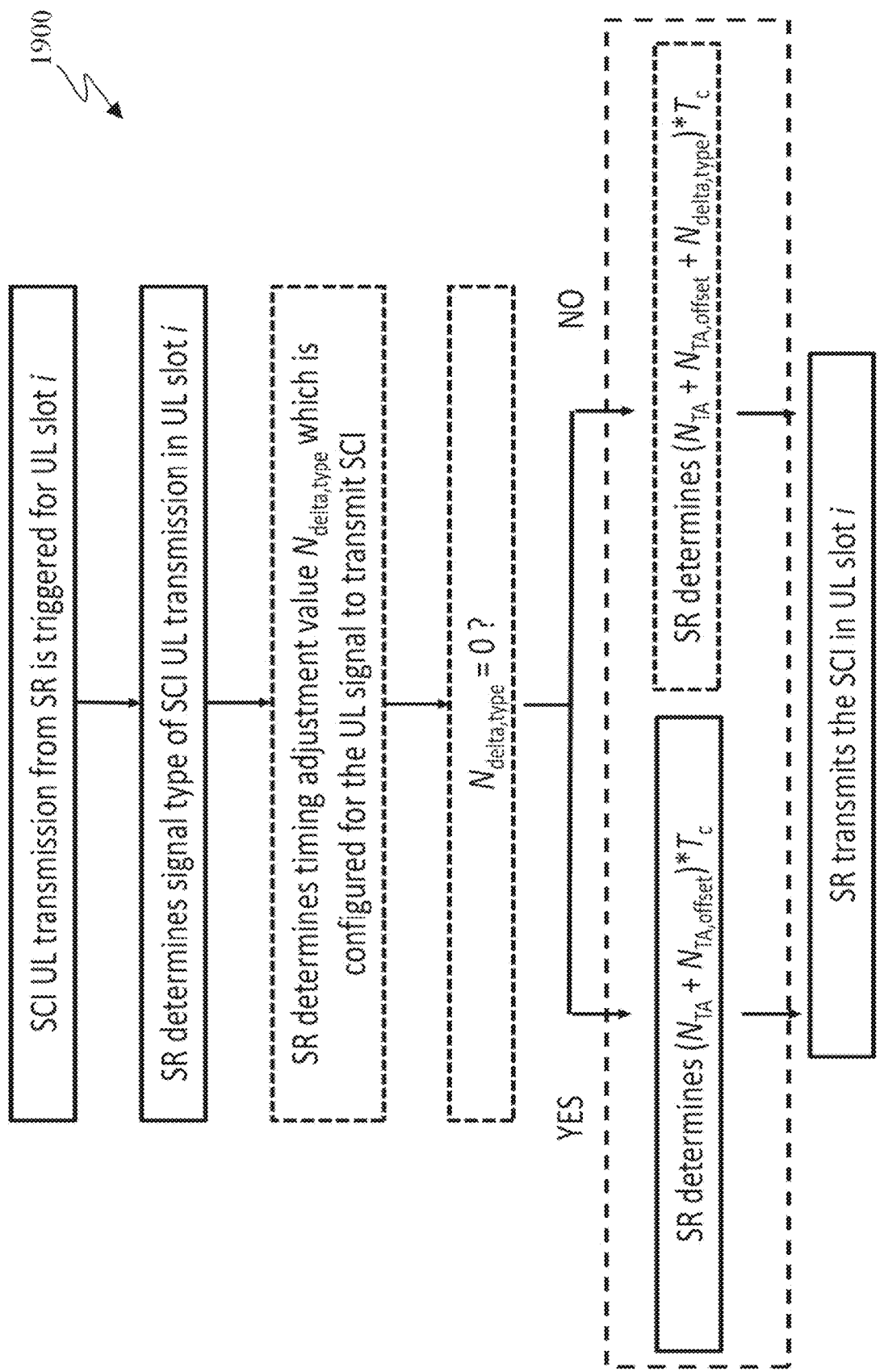
FIG. 19 illustrates an example SR processing flowchart for determination of UL transmission timing of SCI with a signal or channel type according to embodiments of the present disclosure.

FIG. 19 illustrates an example SR processing flowchart for determination of UL transmission timing of SCI with a signal or channel type 1900 according to embodiments of the present disclosure. The embodiment of the SR processing flowchart for determination of UL transmission timing of SCI with a signal or channel type 1900 illustrated in FIG. 19 is for illustration only. FIG. 19 does not limit the scope of this disclosure to any particular implementation of the SR processing flowchart for determination of UL transmission timing of SCI with a signal or channel type 1900.

FIG. 19 illustrates an example SR transmit timing processing chain according to embodiments of the disclosure. An SR determines transmit timing for an UL transmission of SCI starting in slot i. The SR determines the type of the UL signal or channel of the UL transmission with SCI in slot i. The SR determines a transmit timing adjustment value $N_{delta,type}$ from a signaled or tabulated value(s) for the UL signal or channel for SCI transmission. The SR determines an UL transmit timing for slot i as $(N_{TA}+N_{TA,offset})*T_c$ and applies the transmit timing adjustment value $N_{delta,type}$ to determine the quantity $(N_{TA}+N_{TA,offset}+N_{delta,type})*T_e$ with reference to the timing provided by reception of the first detected path (in time) of the corresponding DL frame (or slot). The SR sets the transmit timing of the UL transmission with SCI in UL slot i to the computed value and proceeds with the UL transmission of SCI at the determined transmission time.

Figure 20:
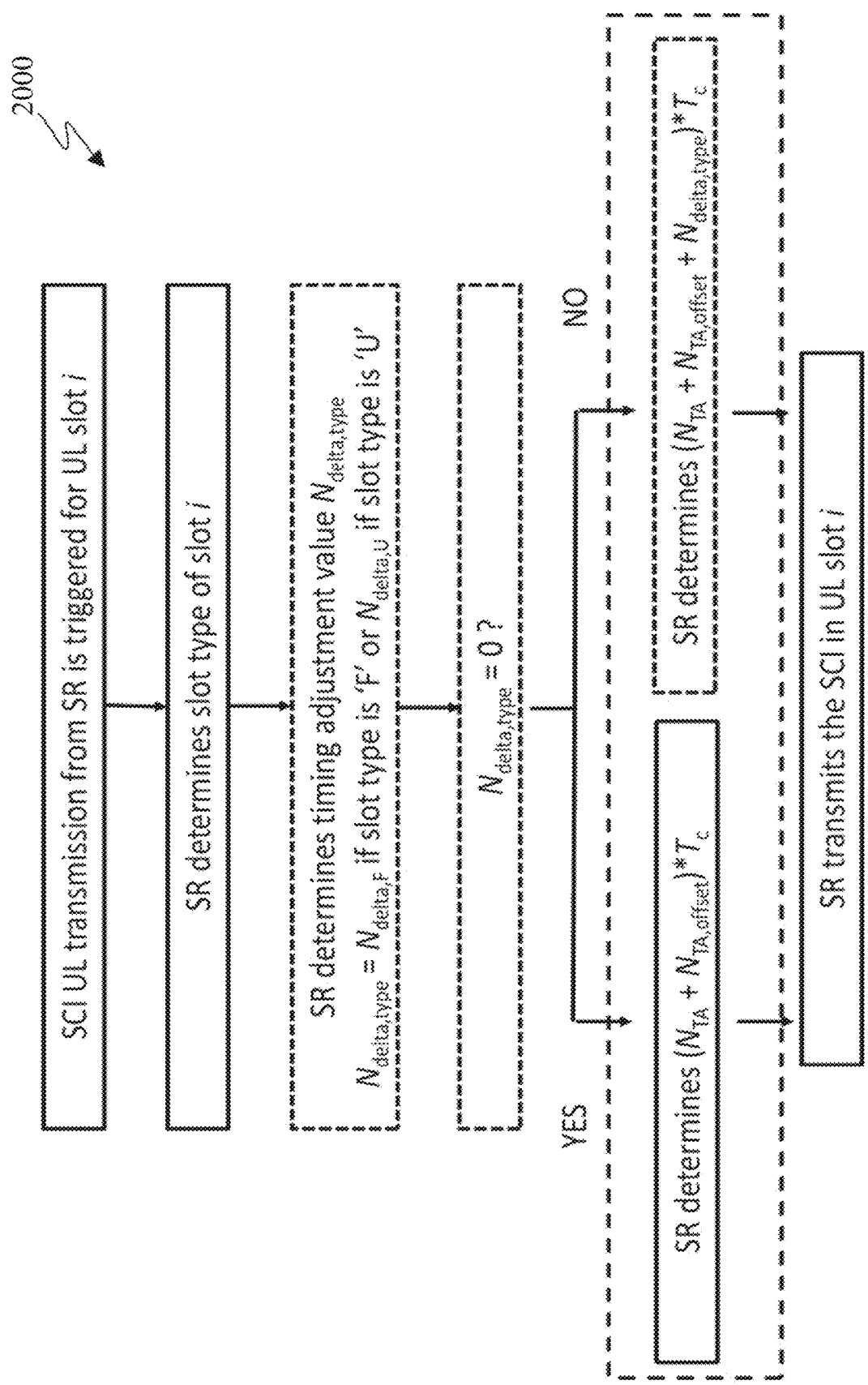
FIG. 20 illustrates an example SR processing flowchart for determination of UL transmission timing of SCI with a signal reception condition according to embodiments of the present disclosure.

FIG. 20 illustrates an example SR processing flowchart for determination of UL transmission timing of SCI with a signal reception condition 2000 according to embodiments of the present disclosure. The embodiment of the SR processing flowchart for determination of UL transmission timing of SCI with a signal reception condition 2000 illustrated in FIG. 20 is for illustration only. FIG. 20 does not limit the scope of this disclosure to any particular implementation of the SR processing flowchart for determination of UL transmission timing of SCI with a signal reception condition 2000.

FIG. 20 illustrates an example SR transmit timing processing chain according to embodiments of the disclosure. An SR determines transmit timing for an UL transmission with SCI starting in slot i. The SR determines the slot type for the UL transmission with SCI in slot i. The SR determines a transmit timing adjustment value $N_{delta,F}$ from a signaled or tabulated value(s) if the slot is configured as F ('Flexible'), or the SR determines a transmit timing adjustment value $N_{delta,U}$ from a signaled or tabulated value(s) if the slot is configured as U ('Uplink'). The SR determines the transmit timing as quantity $(N_{TA}+N_{TA,offset}+N_{delta,type})*T_c$ where $N_{delta,type}=N_{delta,F}$ or $N_{delta,U}$ with reference to the timing provided by reception of the first detected path (in time) of the corresponding DL frame (or slot). The SR sets the transmit timing of the UL transmission with SCI in UL slot i to the computed value and proceeds with the UL transmission of SCI at the determined transmission time.

In one embodiment, an SR is provided configuration parameters n-timingAdvanceAdjustment and/or and n-tsgList for UL transmissions of SCI. These configuration parameters may be provided by RRC signaling messages and IEs. For example, and without loss of generality, these parameters may be signaled from the gNB to the SR as part of the RRC signaling messages of type RRCSetup, RRCReconfiguration, SIB1 or SystemInformation and may be included in RRC IEs of type ServingCellConfig, ServingCellConfigCommon, ServingCellConfigSIB1. These configuration parameters may be of enumerated, listed or sequence type and/or may be encoded as a bit string.

For example, a value for n-timingAdvanceAdjustment may be provided to the SR as a set of values at the desired resolution such as n-timingAdvanceAdjustment={−5000, −4000, −3000, −2000, −1000, 0, +1000, +2000, +3000, +4000, +5000}. For example, a configuration for n-tsgList may be provided as SEQUENCE (SIZE (1 . . . maxNrofTSGs)) OF Tsg where 'Tsg' is a bit string of of size M. For example, M=5 or a multiple thereof. When Tsg={01100} indicating that the $2^{nd}$ and $3^{rd}$ slot in a sequence of 5 slots are part of the timing slot group. When Tsg={00001}, only the last slot in a sequence of 5 slots is indicated as part of the timing slot group. Alternatively, values for n-timingAdvanceAdjustment and/or n-tsgList may be provided in a MAC CE. When no values are provided to the SR, the SR may select a default value. A default value may be provided in listed or tabulated form for parameters n-timingAdvanceAdjustment and/or n-tsgList. A default value may be 0.

The SR is provided with a first and a second timing advance value $N_{TA1}$ and $N_{TA2}$ for a serving cell. When only a single carrier is configured for the SR, the first and the second timing advance values $N_{TA1}$ and $N_{TA2}$ are provided for that carrier. When carrier aggregation or dual connectivity are configured in the SR, there may be multiple cell groups configured in the SR, e.g., a MCG and/or an SCG. Each of the MCG and/or SCG may comprise one or more component carriers. Each of the cell groups configured in the SR may be be configured with a TAG. The SR is provided with a first and a second timing advance value $N_{TA1}$ and $N_{TA2}$ for a component carrier. The first and a second timing advance value $N_{TA1}$ and $N_{TA2}$ may be used by the SR to determine the UL transmit timing of SCI for multiple component carriers part of the same configured TAG. If an SR is configured with two UL carriers for a serving cell such as when a Supplemental UL carrier is configured in the SR, a same timing advance value $N_{TA1}$ and $N_{TA2}$ may be applied to both carriers. Note that it is possible to configure or to provide one $N_{delta}$ value for multiple TSGs or to provide multiple $N_{delta}$ values, e.g., a value for a TSG, but different values for different TSGs.

Figure 21:
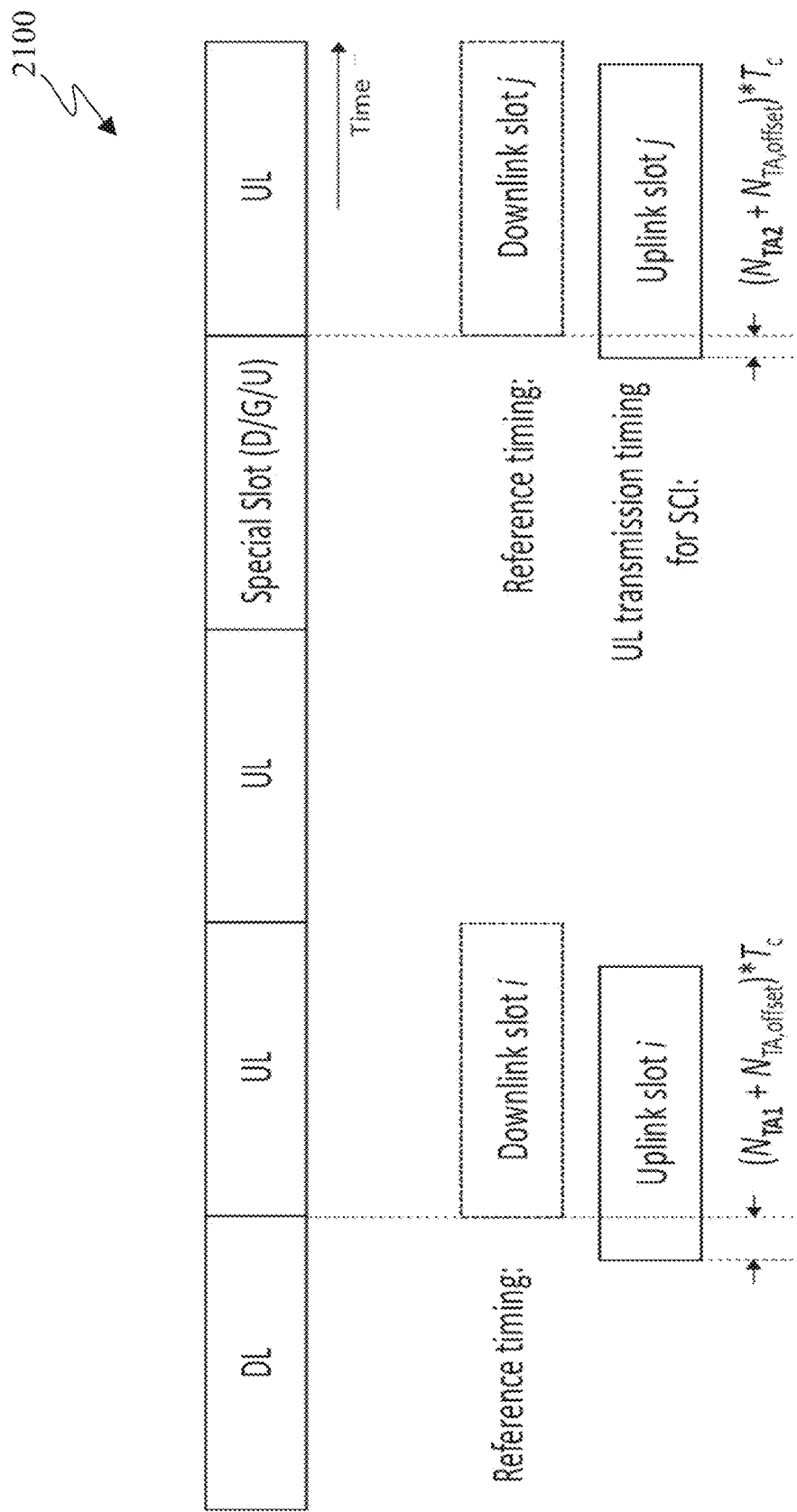
FIG. 21 illustrates an example SR UL-DL timing relation using 2 UL timing alignment procedures per serving cell according to embodiments of the present disclosure.

FIG. 21 illustrates an example SR UL-DL timing relation using 2 UL timing alignment procedures per serving cell 2100 according to embodiments of the present disclosure. The embodiment of the SR UL-DL timing relation using 2 UL timing alignment procedures per serving cell 2100 illustrated in FIG. 21 is for illustration only. FIG. 21 does not limit the scope of this disclosure to any particular implementation of the SR UL-DL timing relation using 2 UL timing alignment procedures per serving cell 2100.

As shown in FIG. 21, UL slot number i of the serving cell for transmission of SCI from the SR starts $(N_{TA1}+N_{TA,offset})$ *$T_c$ before the start of the corresponding DL slot i at the SR where $N_{TA,offset}$ is given by REF3 and REF5. UL slot number j of the serving cell for transmission of SCI from the SR starts $(N_{TA}2+N_{TA,offset})$*$T_c$ before the start of the corresponding DL slot j at the SR. Note that the determination of a DL reference timing by the SR to adjust the UL transmit timing of SCI does not require DL measurements in DL slots i or j. For example, the SR can use SSB(s) transmissions from the gNB in the $1^{st}$ DL slot shown in FIG. 13 to determine the first detected path (in time) for purpose of establishing the DL reference timing of SCI transmissions in slots i or j.

The SR may determine the UL transmission timing of SCI in a slot using either the first or the second timing advance value $N_{TA1}$ or $N_{TA2}$, e.g., the SR maintains two independent timing advance loops for the serving cell, one for UL transmissions of SCI in the first set of slots and another one for UL transmissions of SCI in the second set of slots. A first value $N_{TA1}$ may be used by the SR to determine UL transmission timing of SCI in a first type of slots, e.g., slot(s) of type 'U'. The second value $N_{TA2}$ may be used by the SR to determine UL transmission timing of SCI in a second type of slots, e.g., slot(s) of type 'F'.

Upon reception of a timing advance command $N_{TAk}$ for the serving cell, the SR adjusts the UL transmit timing of SCI using a PUSCH, PUCCH, SRS or RACH transmission in the serving cell using the provided timing advance value $N_{TAk}$ for the associated UL slot(s). For example, for slots numbered from 0 to 4 in the UL-DL frame configuration, if a first timing advance value $N_{TA1}$ is associated with slots 1 and 2 and a second timing advance value $N_{TA2}$ is associated with slot 4, the SR adjusts the UL transmit timing of SCI in slots 1 and 2 using the provided first timing advance value $N_{TA1}$. The SR adjusts the UL transmit timing of SCI in slot 4 using the provided second timing advance value $N_{TA2}$. If a timing advance offset value $N_{TA,offset}$ is provided to determine the UL transmit timing of SCI, the SR expects the offset value to be same for all the slots in the serving cell, Alternatively, different timing advance offset value $N_{TA,offsetk}$ values may be provided. For example, a first timing advance offset value $N_{TA,offset1}$ is associated with slots 1 and 2 and a second timing advance offset value $N_{TA,offset2}$ is associated with slot 4. The SR adjusts the UL transmit timing of SCI in slots 1 and 2 using the provided timing advance value $N_{TA1}$ and offset value $N_{TA,offset1}$. The SR adjusts the UL transmit timing of SCI in slot 4 using the provided timing advance value $N_{TA2}$ and offset value $N_{TA,offset2}$. There may be different timing advance offsets associated with a timing advance command $N_{TAk}$, e.g., a first offset for an UL channel or signal with SCI of a first type and a second offset for an UL channel or signal with SCI of a second type.

Figure 22:
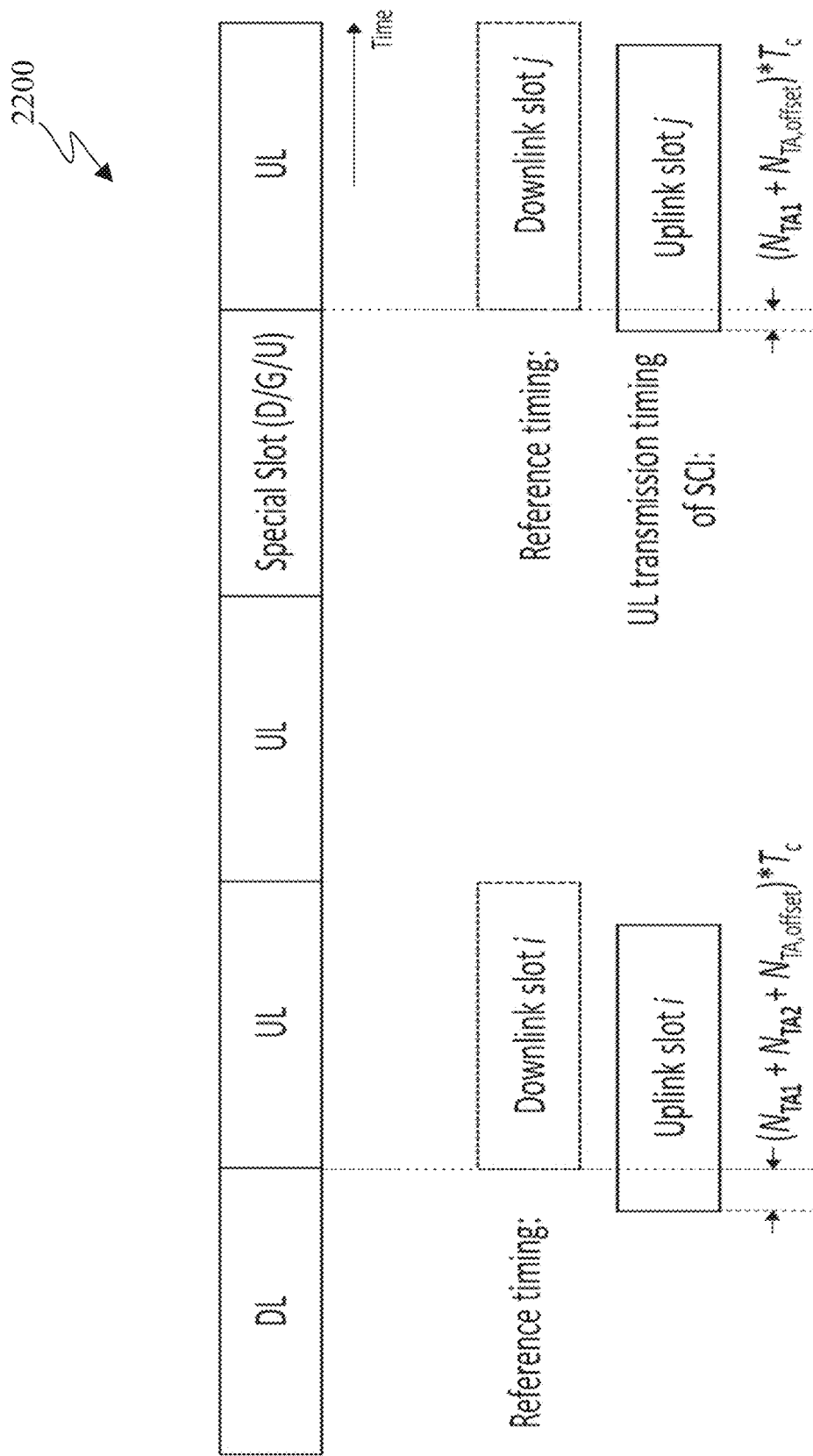
FIG. 22 illustrates an example SR UL-DL timing relation using 2 UL timing alignment procedures per serving cell according to embodiments of the present disclosure.

FIG. 22 illustrates an example SR UL-DL timing relation using 2 UL timing alignment procedures per serving cell 2200 according to embodiments of the present disclosure. The embodiment of the SR UL-DL timing relation using 2 UL timing alignment procedures per serving cell 2200 illustrated in FIG. 22 is for illustration only. FIG. 22 does not limit the scope of this disclosure to any particular implementation of the SR UL-DL timing relation using 2 UL timing alignment procedures per serving cell 2200.

The SR may determine the UL transmission timing of SCI in a slot using both the first and the second timing advance value $N_{TA1}$ or $N_{TA2}$, e.g., the SR maintains two independent timing advance loops, but the UL transmission timing of SCI in a slot is determined by the SR using $N_{TA1}$ and $N_{TA2}$ in combination.

Upon reception of a timing advance command $N_{TAk}$ for the serving cell, the SR adjusts the UL transmit timing of SCI in a PUSCH, PUCCH, SRS or RACH transmission in the serving cell using one or more provided timing advance value(s) $N_{TAk}$ in the associated UL slot(s). For example, if a first timing advance value $N_{TA1}$ is associated with all slots and a second timing advance value $N_{TA2}$ is associated with only slots 1 and 2, the SR adjusts the UL transmit timing of SCI in slot 4 using the provided first timing advance value $N_{TA1}$. The SR adjusts the UL transmit timing of SCI in slot 1 and 2 using both the provided first and second timing advance values $N_{TA1}$ and $N_{TA2}$. As shown in FIG. 22, UL slot number i=1 of the serving cell for transmission of SCI from the SR starts $(N_{TA1}+N_{TA}2+N_{TA,offset})$*$T_c$ before the start of the corresponding DL slot i=1 at the SR. UL slot number j=4 of the serving cell for transmission of SCI from the SR starts $(N_{TA1}+N_{TA,offset})$*$T_c$ before the start of the corresponding DL slot j=4 at the SR. The first timing advance value $N_{TA1}$ in the example of FIG. 14 may be seen as timing advance value of the serving cell for the SR with respect to the gNB location, whereas the second timing advance value $N_{TA2}$ can be seen as an adjustable timing offset value in a selected subset of slots signaled by MAC CE and indexed as a timing advance value for purpose of adjusting relative reception timing of SCI from the SR with respect to the UL signals of amplified-and-forwarded signals from the relayed UEs in designated slots. If a timing advance offset value $N_{TA,offset}$ is provided to determine the UL transmit timing of SCI, the SR expects the offset value to be same for all the slots in the serving cell. Alternatively, different timing advance offset value $N_{TA,offsetk}$ values may be provided. For example, a first timing advance offset value $N_{TA,offset1}$ is associated with all slots and a second timing advance offset value $N_{TA,offset2}$ is associated with slots 1 and 2. The SR adjusts the UL transmit timing of SCI in slot 4 using the provided timing advance value $N_{TA1}$ and offset value $N_{TA,offset1}$. The SR adjusts the UL transmit timing of SCI in slots 1 and 2 using the provided timing advance values $N_{TA1}$ and $N_{TA2}$ and the offset value $N_{TA,offset2}$. There may be different timing advance offsets associated with a timing advance command $N_{TAk}$, e.g., a first offset for an UL channel or signal with SCI of a first type and a second offset for an UL channel or signal with SCI of a second type.

Instead of a timing advance value $N_{TAk}$ provided for UL transmissions of SCI in a slot interval, a timing advance value $N_{TAk}$ may be provided for a symbol time interval or a multiple thereof. The time duration(s) need not be the same for $N_{TA1}$ and $N_{TA2}$. A timing advance value $N_{TAk}$ may be defined with respect to an adjustable or a scalable step size and/or a desired timing resolution. For example, a value for $N_{TAk}$ may be provided as a multiple of $M*64*T_c/2\mu$ where M=16. The timing resolution or step size for a first and a second timing advance value $N_{TA1}$ and $N_{TA2}$ may be selected the same, e.g., both $N_{TA1}$ and $N_{TA2}$ use $M*64*T_c/2^\mu$, or it may be selected different, e.g., $N_{TA1}$ uses a time resolution M/*64*TIT' and $N_{TA2}$ uses a time resolution $M2*64*T_c/2^\mu$ where M1 and M2 are different values. For example, M1=16 for use with $N_{TA1}$ on all slots, but M2=8 for timing adjustment steps using smaller resolution when adjusting for the relative receive timing difference of SCI transmissions from the SR in designated slot(s) as shown in FIG. 22.

Using a first and a second timing advance value $N_{TA1}$ and $N_{TA2}$ on the same serving cell to control the UL transmit timing of SCI from the SR in designated slot(s), the relative receive timing difference of SCI transmissions received by the gNB can be controlled and adjusted for separately from SCI transmissions by the SR with respect to the UL transmit timing controlled UL signals from UEs in the SR amplify-and-forward RF path. The reception timing of the UL transmissions of SCI from the SR in a first slot can be adjusted differently by the gNB when compared to the reception timing of UL transmissions of SCI from the SR in another slot on the same carrier or serving cell. The gNB can adjust its receiver processing accordingly because the sequence of issued timing advance commands associated with $N_{TA1}$ and $N_{TA2}$ for the SR on the serving cell is known to the gNB. For the SR, the gNB can select and signal the timing advance values associated with the first $N_{TA1}$ and the second $N_{TA2}$ UL transmit timing control control loops using gNB-side and/or SR-reported measurements. For example, SR-transmitted SRS and/or measurements reported from one or multiple SR(s) may be used by the gNB to determine the appropriate UL transmit timings of SCI by the SR in slots of a serving cell.

A timing advance value $N_{TAk}$ provided to the SR may be associated with a set of slots of a serving cell. A set of slots of a serving cell for which a same transmit timing advance value $N_{TAk}$ is provided to the SR is referred to as Timing Slot Group (TSG) in the disclosure. The first timing advance value $N_{TA1}$ for a serving cell is associated with UL transmission timing of SCI by the SR for a first set of slots on the serving cell. The second timing advance value $N_{TA2}$ for a serving cell is associated with UL transmission timing of SCI by the SR for a second set of slots on the serving cell. The first and second set of slots on the serving cell may be referred to as a first Timing Slot Group $TSG_1$ and a second Timing Slot Group $TSG_2$. An SR can be configured with one or more Timing Slot Group(s) (TSG(s)) for a serving cell where α TSG is a set of slots of a serving cell associated with a same signaled timing advance value. A TSG containing a first number of slot(s) may be referred to as Primary Timing Slot Group (PTSG), whereas the term Secondary Timing Slot Group (STSG) may refer to other TSGs. For example, an STSG may be configured to comprise slots of type 'F' where SCI transmission from the SR may be scheduled, whereas a PTSG may be configured for SCI transmissions from the SR in slots of type 'U'.

A TSG may be configured to contain only a single slot, or there may be only a single TSG, e.g., the TSG comprises all slots. The determination of the transmit timing of SCI by the SR in a slot may then be described by not using the term "TSG" and substituting the term "slot" for it in the following exemplary procedures described in the disclosure. Instead of the term "TSG", a set of slots of a serving cell for which a same transmit timing advance value $N_{TAk}$ is provided to the SR may be referred to as "Timing Advance Group k of a serving cell j" or $TAG_{j,k}$. The first timing advance value $N_{TA1}$ and the second timing advance value $N_{TA2}$ of a serving cell associated with UL transmit timings of SCI of the first and second set of slots of the serving cell respectively, may then be referred to as a first Timing Advance Group $TAG_{j,1}$ and a second Timing Advance Group $TAG_{j,2}$ where index j denotes a serving cell index j. The term "TSG" is used in this disclosure for conciseness.

When a TSG comprise more than one slot, the slots of the TSG can be consecutive, or they can be non-consecutive. One or multiple TSGs may be configured for the SR by parameter n-tsgList. For example, a first TSG containing a first number of slots for SCI transmission may be configured in the SR. A second TSG containing a second number of slots for SCI transmission may be configured in the SR.

When a timing advance value $N_{TAk}$ is provided for a TSG, the value $N_{TAk}$ is applied by the SR to determine UL transmit timing of SCI for a slot in the TSG. The timing advance value $N_{TAk}$ is not applied by the SR to determine the UL transmit timing of SCI in a slot when the slot is not part of the TSG. One or multiple timing advance values $N_{TAk}$ may be associated with a TSG, e.g., one or more values $N_{TAk}$ may be provided to the SR. When a TSG is associated with a timing advance value $N_{TAk}$, the SR determines a value $N_{TAk}$ in the slot from the set of provided set $N_{TAk}$ values by selecting the value $N_{TAk}$ associated with the TSG of the slot.

Figure 23:
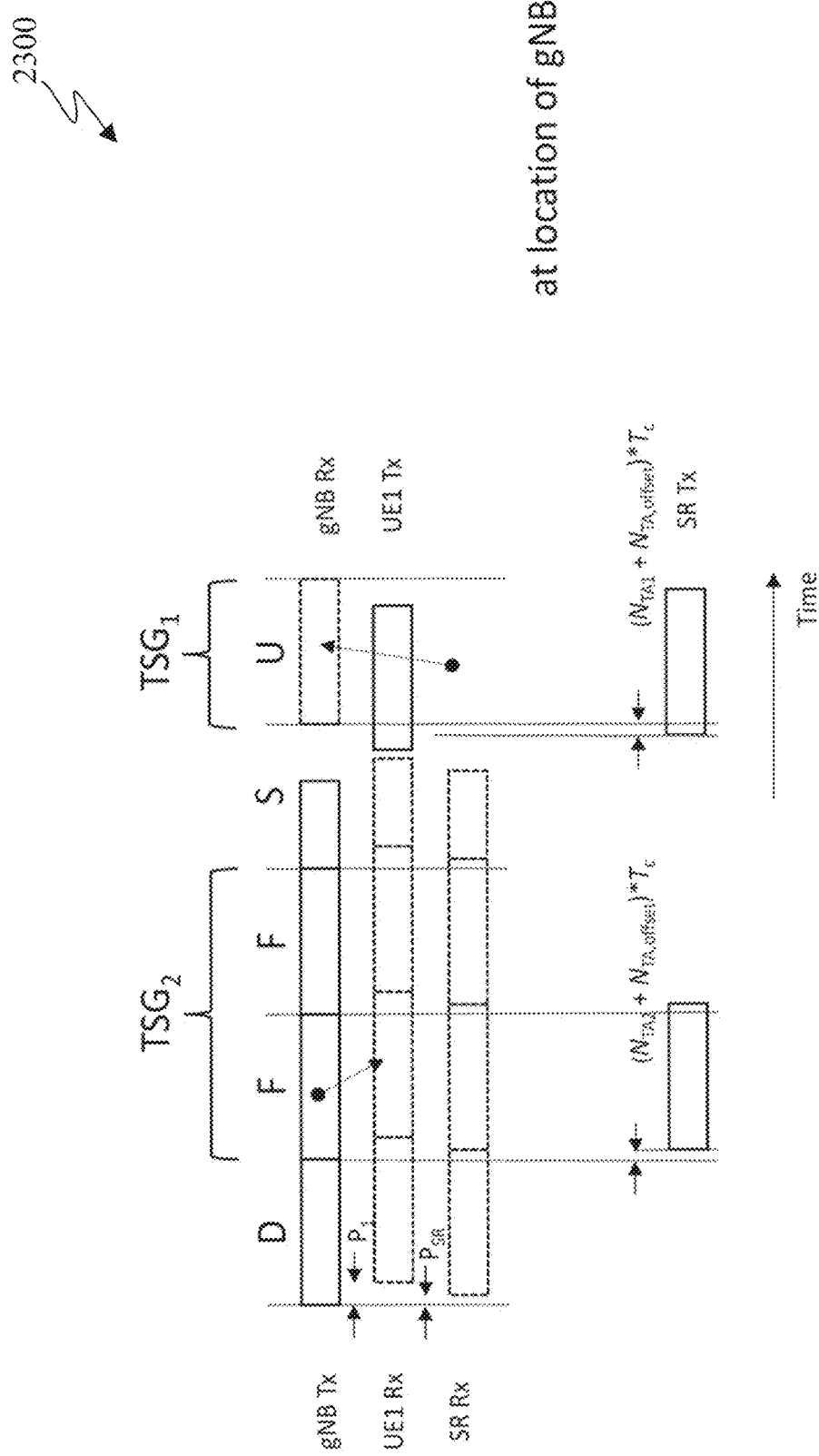
FIG. 23 illustrates an example SR UL-DL timing relation with timing slot groups according to embodiments of the present disclosure.

FIG. 23 illustrates an example SR UL-DL timing relation with timing slot groups 2300 according to embodiments of the present disclosure. The embodiment of the SR UL-DL timing relation with timing slot groups 2300 illustrated in FIG. 23 is for illustration only. FIG. 23 does not limit the scope of this disclosure to any particular implementation of the SR UL-DL timing relation with timing slot groups 2300.

As shown in FIG. 23, a first timing slot group, $TSG_1$ and a second timing slot group $TSG_2$ are configured for the SR. $TSG_1$ contains the normal UL slot, e.g., slot 4 and $TSG_2$ contains the slots of type 'F', e.g., slot 1 and 2, where slots are numbered from 0 to 4. The SR is provided a first timing advance value $N_{TA1}$ for $TSG_1$ and a second timing advance value $N_{TA2}$ for $TSG_2$. When the SR transmits SCI in the UL, it determines its transmission timing as $(N_{TA}2+N_{TA,offset})*T_c$ if the UL transmission of SCI in a PUSCH, SRS, PUCCH, or RACH occurs in the slots of type 'F'. The SR determines its transmission timing as $(N_{TA}1+N_{TA,offset})*T_c$ when it transmits SCI in slot of type 'U'.

Figure 24:
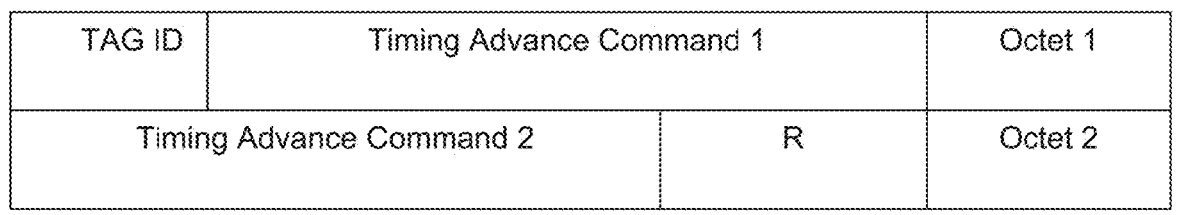
FIG. 24 illustrates an example multiple timing advance MAC CE according to embodiments of the present disclosure.

FIG. 24 illustrates an example Multiple Timing Advance MAC CE 2400 according to embodiments of the present disclosure. The embodiment of the Multiple Timing Advance MAC CE 2400 illustrated in FIG. 24 is for illustration only. FIG. 24 does not limit the scope of this disclosure to any particular implementation of the Multiple Timing Advance MAC CE 2400.

The timing advance values $N_{TA1}$ and $N_{TA2}$ associated with the SR UL transmission timing for SCI in different slot groups may be provided to the SR by MAC CE. Indications to update the first and second timing advance values $N_{TA1}$ and $N_{TA2}$ maintained by the SR for a serving cell may be provided to the SR by a same or by different Timing Advance Command and/or Absolute Timing Advance Command MAC CE(s) by means of index values $TA_1$ and $TA_2$ respectively. A same or different MAC CEs may be used to provide index values for $TA_1$ and $TA_2$.

In one example shown in FIG. 24, the first and a second timing advance value $N_{TA1}$ and $N_{TA2}$ are provided through signaled index values for $TA_1$ and $TA_2$ in a new Multiple Timing Advance MAC CE. The MAC CE may have length N=2 octets, or N for any required number of octets or bits. The gNB transmits and the SR receives the MAC CE associated with the first and the second timing advance value $N_{TA1}$ and $N_{TA2}$ as part of an DL transmission. FIG. 24 shows the example of a length N=2 octets MAC CE format where both the first and a second timing advance value $N_{TA1}$ and $N_{TA2}$ are provided to the SR using the same MAC CE. The MAC CE may be identified by either a selected LCID or a selected eLCID value or a combination of LCID and eLCID values. The MAC CE has fixed size and consists of two octets. It contains the TAG Identity (TAG ID) indicating the TAG Identity of the addressed TAG. The length of the field is 2 bits. This MAC CE then contains two timing advance commands. The first timing advance command field indicates the index value $T_{A1}$ (0, 1, 2 . . . 63) used to control the amount of timing adjustment that MAC entity must apply for $TSG_1$. The length of the field is 6 bits. The second timing advance command field indicates the index value $TA_2$ (0, 1, 2 . . . 63) used to control the amount of timing adjustment that MAC entity must apply for $TSG_2$. The length of the field is 6 bits. The 2 reserved bits "R" are set to "0".

Figure 25:
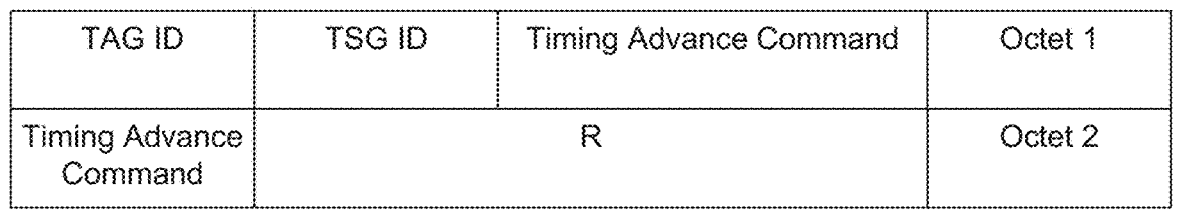
FIG. 25 illustrates an example multiple timing advance MAC CE according to embodiments of the present disclosure.

FIG. 25 illustrates an example Multiple Timing Advance MAC CE 2500 according to embodiments of the present disclosure. The embodiment of the Multiple Timing Advance MAC CE 2500 illustrated in FIG. 25 is for illustration only. FIG. 25 does not limit the scope of this disclosure to any particular implementation of the Multiple Timing Advance MAC CE 2500

When the SR receives a Multiple Timing Advance MAC CE, it determines the first and a second timing advance value $N_{TA1}$ and $N_{TA2}$ from the signaled index values $T_{A1}$ in the Timing Advance Command 1 field and $T_{A2}$ in the Timing Advance Command 2 field for a TAG as adjustment of a current $N_{TA}1$ value, $N_{TA1\_old}$ to the new $N_{TA1}$ value, $N_{TA1\_new}$ by index values of $T_{A1}$=0, 1, 2, . . . , 63, where for a SCS of $2^\mu \cdot 15$ kHz, $N_{TA1\_new}=N_{TA1\_old}+(T_{A1}-31)*16*64/2^\mu$. Similarly, $N_{TA2}$ is adjusted as $N_{TA2\_new}=N_{TA2\_old}+(T_{A2}-31)*16*64/2^\mu$.

In another example shown in FIG. 25, a timing advance value $N_{TAk}$ is provided through signaled index values for $T_{Ak}$ in a new Multiple Timing Advance MAC CE including a Timing Slot Group (TSG) Identifier (ID). For example, M=2 bits may be used to indicate one of the TSGs of a serving cell for which the indicated index value $T_{Ak}$ is to be applied by the SR. In an alternative technical realization, instead of the TSG ID, more than the 2 bits available for the TAG ID in the existing Timing Advance MAC CE are used to transmit index values $T_{Ak}$ and their association with slots on a serving cell for a TAG. For example, M=4 bits are used to encode the combinations of TAGs and associated time-domain resources associated with a timing advance value on a serving cell. The MAC CE may have length N=1 octet, or N=2 octets, or N for any required number of octets or bits. The gNB transmits and the SR receives the MAC CE associated one or more of the TAG ID, TSG ID and index value $T_{Ak}$ as part of an DL transmission. FIG. 25 shows the example of a length N=2 octets MAC CE format where a TAG ID, TSG ID and an index value $T_{Ak}$ are provided to the SR using the same MAC CE. The MAC CE may be identified by either a selected LCID or a selected eLCID value or a combination of LCID and eLCID values. The MAC CE has fixed size and consists of two octets. It contains the TAG Identity (TAG ID) indicating the TAG Identity of the addressed TAG. The length of the field is 2 bits. The MAC CE then contains the TSG Identity (TSG ID) indicating the TSG Identity of the addressed $TSG_k$. The length of the field is 2 bits. This MAC CE then contains a timing advance command. The timing advance command field indicates the index value $T_{Ak}$ (0, 1, 2 . . . 63) used to control the amount of timing adjustment that MAC entity must apply for $TSG_k$. The length of the field is 6 bits. The 6 reserved bits "R" are set to "0".

When the SR receives a Multiple Timing Advance MAC CE, it determines the timing advance value $N_{TAk}$ from the signaled index values $T_{Ak}$ in the Timing Advance Command field for the indicated TAG and $TSG_k$ as adjustment of a current $N_{TAk}$ value, $N_{TAk\_old}$ to the new $N_{TAk}$ value, $N_{TAk\_new}$ by index values of $T_{Ak}$=0, 1, 2, . . . , 63, where for a SCS of $2^\mu \cdot 15$ kHz, $N_{TAk\_new}=N_{TAk\_old}+(T_{Ak}-31)*16*64/2^\mu$.

As can be understood by someone skilled in the art, the naming or labeling of the new Multiple Timing Advance MAC CE format or the included IEs for purpose of timing indication to the SR is not important for as long as it is distinct from currently named IEs and parameterization provided by REF5. The new Multiple Timing Advance MAC CE may include additional fields not shown in the examples provided by FIG. 24 and FIG. 25. For example, a length indicator L or indicator of the number of TSGs $N_{TSG}$ for which timing advance index(es) are provided in the MAC CE may be included such that a variable instead of a fixed number of Timing Advance Commands can be signaled through the MAC CE. A timer value or counter value or priority indicator associated with a Timing Slot Group $TSG_k$ may be included in the MAC CE. The field length(s) to signal timing indications may be chosen differently as a function of the required step size and maximum value(s).

Configuration parameters associated with a Timing Slot Group may be provided to the SR by RRC signaling. A timer value or counter value or priority indicator may be associated with a Timing Slot Group. The SR determines transmission timing of SCI in a slot using the transmit timing of the timing slot group configured with a higher priority An SR may be provided RRC configuration parameters associated with a first and a second timing advance value $N_{TA1}$ and $N_{TA2}$ for a serving cell. These associated parameters may include one or more of the following, slot(s) in a TSG and timer or counter or priority value(s). These parameters associated with SCI transmission from the SR may be provided by RRC signaling messages and IEs. For example, and without loss of generality, these associated parameters may be signaled from the gNB to the SR as part of RRC signaling messages of type RRCSetup, RRCReconfiguration, SIB1 or SystemInformation and may be included in RRC IEs of type ServingCellConfig, ServingCellConfigCommon, or ServingCellConfigSIB1. These configuration parameters associated with SCI transmissions from the SR may be of enumerated, listed or sequence type and/or may be encoded as a bit string.

For example, a configuration for n-tsgList may be provided as SEQUENCE (SIZE (1 . . . maxNrofTSGs)) OF Tsg where 'Tsg' is a bit string of of size M. For example, M=5 or a multiple thereof. When Tsg={01100}, the $2^{nd}$ and $3^{rd}$ slot or slot 1 and 2 in a sequence of 5 slots numbered from 0 to 4 are part of the timing slot group. When Tsg={00001}, only the last slot in a sequence of 5 slots is indicated as part of the timing slot group.

For example, a timer value t_tsg may be indicated for a timing slot group. The timer value may control how long the MAC entity considers the timing slot group of the serving cells belonging to be uplink time aligned.

For example, a priority value p_tsg may be indicated for a timing slot group in the range P from 0 to 7. When the UL transmit timing for SCI in a slot is updated by the SR, the slot duration of a TSG with higher configured priority value is not shortened and the slot duration of a preceding or following slot associated with a lower configured priority value is reduced.

When no values are provided to the SR, the SR may select a default value. A default value may be provided in listed or tabulated form. A default value may be 0.

When an SR determines an UL transmission timing for SCI in a slot of a serving cell using a first and a second timing advance value $N_{TA1}$ and $N_{TA2}$ for the serving cell, it may follow the following steps illustrated by example. Note that the shown steps do not necessarily need to be executed in order.

UL slot number i of the serving cell for transmission of SCI from the SR starts $(N_{TAk}+N_{TA,offset})*T_c$ for a slot in $TSG_k$ before the start of the corresponding DL slot i at the SR where α timing advance value $N_{TAk}$ is associated with a timing slot group k, $TSG_k$. $N_{TA,offset}$ is given by REF3 and REF5, except for MsgA transmission on PUSCH where $N_{TAk}=0$ is used. NR devices must have the capability to follow the frame timing changes of the reference cell in RRC_CONNECTED state. The UL frame transmission of SCI in $TSG_k$ of a serving cell takes place $(N_{TAk}+N_{TA,offset})$ *$T_e$ before the reception of the first detected path (in time) of the corresponding DL frame from the reference cell.

An SR can be configured with one or more Timing Advance Group (TAG) and one or more Timing Slot Group (TSG). A TAG is a group of Serving Cells that is configured by RRC for cells with an UL using the same timing reference cell and the same Timing Advance value. A Timing Advance Group containing the SpCell of a MAC entity is referred to as Primary Timing Advance Group (PTAG), whereas the term Secondary Timing Advance Group (STAG) refers to other TAGs. A TSG is one or more slots of a serving cell using the same timing reference cell and the same Timing Advance value. For a serving cell, an SR can be configured by RRC with one or multiple TSG(s) by parameter n-tsgList Upon reception of a timing advance command for a TSG in a TAG, the SR adjusts UL timing of SCI in a PUSCH, SRS, or PUCCH transmission in a slot of the TSG for all the serving cells in the TAG based on a value $N_{TA\ offset}$ that the SR expects to be same for all the serving cells in the TAG and based on the received timing advance command for the TSG where the UL timing of a PUSCH, SRS or PUCCH transmission with SCI is the same for all the serving cells in a TSG for a TAG.

For a SCS of $2^\mu \cdot 15$ kHz, the timing advance command for a TSG in a TAG indicates the change of the UL timing of SCI transmission relative to the current UL timing of SCI transmission for the TSG in a TAG in multiples of $16 \cdot 64 \cdot T_c/2^\mu$. The start timing of the random access preamble is handled differently by the SR.

A timing advance command received by multiple timing advance command MAC CE (REF5), $T_{Ak}$, for a TSG in a TAG indicates adjustment of a current $N_{TAk}$ value, $N_{TAk\_old}$ to the new $N_{TAk}$ value, $N_{TAk\_new}$ by index values of $T_{Ak}=0$, 1, 2, . . . , 63, where for a SCS of $2^\mu \cdot 15$ kHz, $N_{TAk\_new}=N_{TAk\_old}+(T_{Ak}-31)*16*64/2^\mu$.

If an SR has multiple active UL BWPs in a same TAG for SCI transmission, including UL BWPs in two UL carriers of a serving cell, the timing advance command value for a TSG is relative to the largest SCS of the multiple active UL BWPs. The applicable $N_{TA,new}$ value for an UL BWP with lower SCS may be rounded to align with the timing advance granularity for the UL BWP with the lower SCS while satisfying the timing advance accuracy requirements in REF7.

Adjustment of an $N_{TA}$ value by a positive or a negative amount indicates advancing or delaying the UL transmission timing of SCI in the TSG in a TAG by a corresponding amount, respectively.

For a timing advance command received on UL slot i and for an SCI transmission other than using PUSCH scheduled by a RAR UL grant or a fallbackRAR UL grant, or a PUCCH with HARQ-ACK information in response to a successRAR, the corresponding adjustment of the UL transmission timing of SCI in a TSG applies from the beginning of UL slot i+k+1 where $k=\lceil N_{slot}^{subframe,\mu} \cdot (N_{T,1}+N_{T,2}+N_{TA,max}+0.5)/T_{sf} \rceil$, where parameters $N_{T,1}$ and $N_{T,2}$ are provided by REF4, $N_{TA,max}$ is the maximum timing advance value in msec that can be provided by a $T_A$ command field of 12 bits, and where $N_{slot}^{subframe,\mu}$ and $T_{sf}$ are provided by REF1. The UL slot i is the last slot among UL slot(s) overlapping with the slot(s) of PDSCH reception where the PDSCH provides the timing advance command. In another example, when a TSG is configured for SCI transmission by the SR, the corresponding adjustment of the transmission timing following reception of a timing advance command may be applied either before the first or after the last slot of a sequence of consecutive slots of the TSG, e.g., a same transmit timing for SCI transmission from the SR during a sequence of consecutive slots configured for the TSG should be maintained by the SR.

If an SR changes an active UL BWP on a serving cell between a time of a timing advance command reception for a TSG and a time of applying a corresponding adjustment for the UL transmission timing of SCI for the TSG, the SR determines the timing advance command value based on the SCS of the new active UL BWP. If the SR changes an active UL BWP on a serving cell after applying an adjustment for the UL transmission timing of SCI for a TSG, the SR assumes a same absolute timing advance command value before and after the active UL BWP change on the serving cell.

If the received DL timing changes and is not compensated or is only partly compensated by the UL timing adjustment without timing advance command as described in REF7, the SR changes $N_{TAk}$ for a TSG on a serving cell accordingly. If two adjacent slots overlap due to a TA command for a TSG, the slot with lower configured TSG priority provided by RRC parameter p_tsg is reduced in duration relative to the slot configured with higher TSG priority.

RRC configures the following parameters for the maintenance of UL time alignment associated with SCI transmission by the SR: timeAlignmentTimer (per TSG and/or TAG) which controls how long the MAC entity considers the Serving Cells belonging to the associated TSG in a TAG to be UL time aligned.

When a Multiple Timing Advance Command MAC CE is received, and if an $N_{TAk}$ as defined in REF1 has been maintained with the indicated TAG, the MAC applies the Timing Advance Command for the indicated TSG(s) in a TAG and starts or restarts the timeAlignmentTimer associated with the indicated TSG(s) in a TAG.

When a timeAlignmentTimer associated with the Primary TSG in a Primary TAG expires, the MAC entity flushes all HARQ buffers for all Serving Cells, notifies RRC to release PUCCH and/or SRS for all Serving Cells, and if configured, clears any configured DL assignments and configured UL grants, clears any PUSCH resource for semi-persistent CSI reporting, considers all running timeAlignmentTimers as expired, but maintains $N_{TAk}$ (REF1) for the TSGs in all TAGs. When the timeAlignmentTimer associated with a Secondary TSG in a Primary TAG or a TSG in a Secondary TAG expires, the SR may continue UL transmissions with SCI in slots of the Primary TSG.

When the MAC entity stops UL transmissions of SCI in a TSG of a serving cell due to the fact that the maximum UL transmission timing difference between TSGs of the MAC entity or the maximum UL transmission timing difference between TSGs of any MAC entity of the SR is exceeded, the MAC entity considers the timeAlignmentTimer associated with the TSG as expired.

Figure 26:
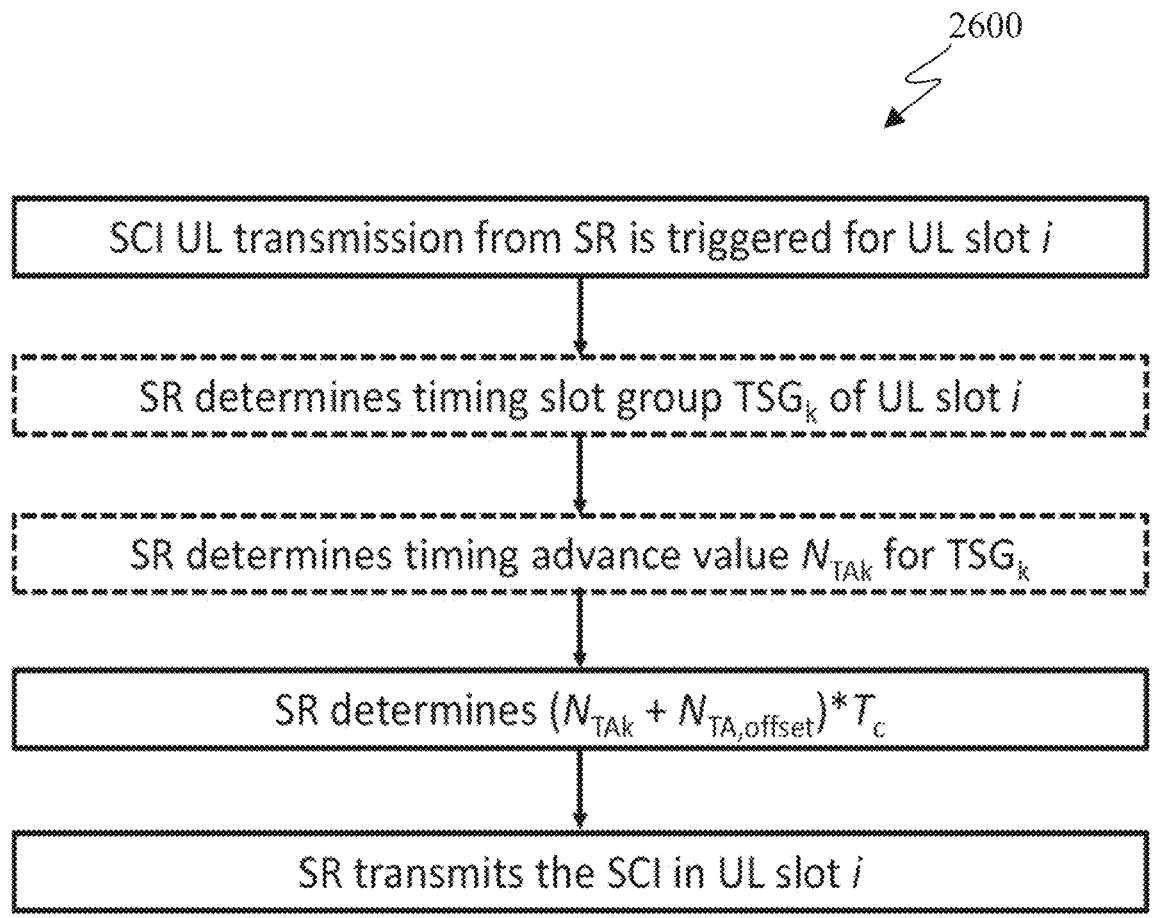
FIG. 26 illustrates an example SR processing flowchart for determination of UL transmission timing for SCI with a timing slot group according to embodiments of the present disclosure.

FIG. 26 illustrates an example SR processing flowchart for determination of UL transmission timing for SCI with a timing slot group 2600 according to embodiments of the present disclosure. The embodiment of the SR processing flowchart for determination of UL transmission timing for SCI with a timing slot group 2600 illustrated in FIG. 26 is for illustration only. FIG. 26 does not limit the scope of this disclosure to any particular implementation of the SR processing flowchart for determination of UL transmission timing for SCI with a timing slot group 2600.

An example SR transmit timing processing chain for SCI transmissions according to embodiments of the disclosure is illustrated in FIG. 26. An SR determines transmit timing for an UL transmission with SCI starting in slot i. The SR determines the timing slot group k of the slot i for the UL transmission of SCI. The SR determines a timing advance value $N_{TAk}$ for the timing slot group k in which slot i is configured. The SR determines an UL transmit timing of SCI for slot i as $(N_{TAk}+N_{TA,offset})*T_c$ and applies the UL transmit timing of SCI with reference to the timing provided by reception of the first detected path (in time) of the corresponding DL frame (or slot). The SR sets the transmit timing of the UL transmission of SCI in UL slot i to the computed value and proceeds with the UL transmission of SCI at the determined transmission time.

Figure 27:
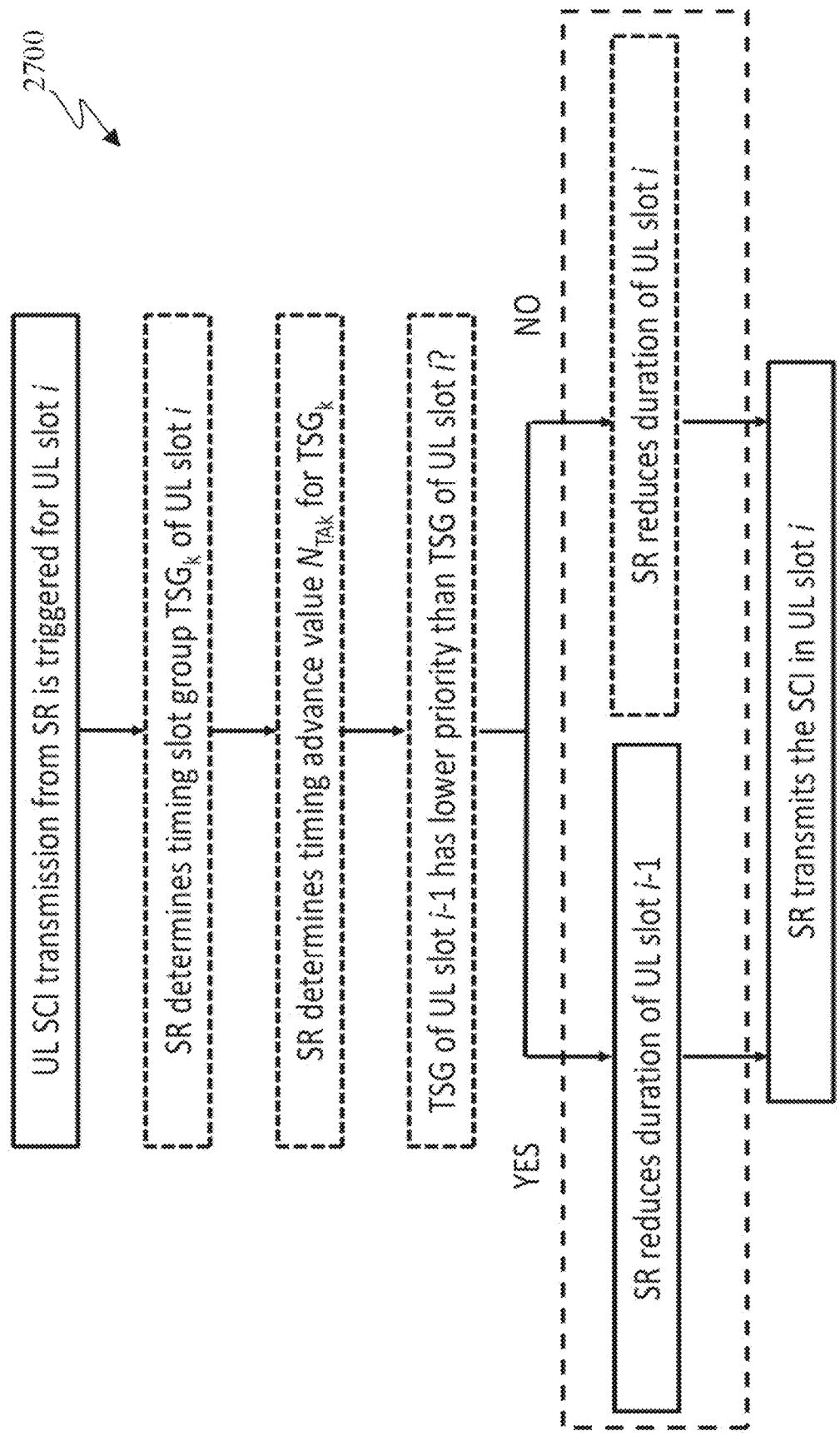
FIG. 27 illustrates an example SR processing flowchart for determination of UL transmission timing for SCI using TSG priority according to embodiments of the present disclosure.

FIG. 27 illustrates an example SR processing flowchart for determination of UL transmission timing for SCI using TSG priority 2700 according to embodiments of the present disclosure. The embodiment of the SR processing flowchart for determination of UL transmission timing for SCI using TSG priority 2700 illustrated in FIG. 27 is for illustration only. FIG. 27 does not limit the scope of this disclosure to any particular implementation of the SR processing flowchart for determination of UL transmission timing for SCI using TSG priority 2700.

An example SR transmit timing processing chain for SCI transmissions according to embodiments of the disclosure is illustrated in FIG. 27. The SR determines transmit timing for an UL transmission with SCI starting in slot i. The SR determines the timing slot group k of the slot i for the UL transmission with SCI. The SR determines a timing advance value $N_{TAk}$ for the timing slot group k in which slot i is configured. The SR determines an UL transmit timing for SCI transmission in slot i as $(N_{TAk}+N_{TA,offset})*T_c$. Following the update to the UL transmit timing of SCI for slot i, the SR determines if UL transmissions with SCI in the adjacent slot i−1 overlap due to the TA command received for $TSG_k$ in slot i. If yes, the slot with the lower configured TSG priority of the SCI transmission is reduced in duration relative to the slot configured with higher TSG priority of the SCI transmission. The SR applies the UL transmit timing for slot i with reference to the timing provided by reception of the first detected path (in time) of the corresponding DL frame (or slot). The SR sets the transmit timing of the UL transmission of SCI in UL slot i to the computed value and proceeds with the UL transmission of SCI at the determined transmission time.

As described above, a UE receives from and transmits to the gNB. The UE signal is relayed from/to the gNB by the SR. One solution is that every time the gNB signals a relative TA command to a UE, then the gNB also signals that same relative TA command of the UE to the SR using DL SCI. Under condition that the SR has previously kept track of the sequence of the relative $T_A$ commands of the UE which were also signaled to the SR by the gNB, and under condition that the SR knows the initial (absolute) TA command having been issued to that UE, the SR can compute the same value of the adjustment to the UE UL transmission timing as the UE. The SR can then adjust its own UL reception timing correspondingly to greatly reduce the timing uncertainty window for measuring the UE SRS received at the SR ingress antenna port. This solution requires that the gNB sends a "copy" of the UE relative TA command to the SR using DL SCI every time such a TA command is issued for a UE. When the UE is in low-mobility conditions, the gNB might send a TA command to the UE once or twice per second. When there are only few UEs whose signals are relayed by the SR, the resulting SCI signaling load is acceptable. Reliability of DL SCI is another aspect. When the UE receives a PDSCH with a relative TA by MAC CE, any successful PDSCH reception (or any unsuccessful decoding attempt) is acknowledged by the UE (or a negative acknowledgment is transmitted in the UL). The gNB can know if the MAC CE transmitted to the UE was (un-) successfully received by the UE and if the MAC CE needs to be re-transmitted. But when the gNB "copies" the SR, e.g., the gNB signals the UE (relative) TA command also to the SR in the DL SCI, the gNB uses SCI signaling to the SR. Depending on how the SCI signaling is implemented, there may or may not be an acknowledgement of (un-)successful reception by the SR. For example, DL SCI using DCI only (but no PDSCH) does not provide the possibility of acknowledgement for the SR. DL SCI using PDSCH, e.g., as MAC CE or as PDSCH payload may provide the possibility of acknowledgement depending on the UL SCI protocol design. If the SR "misses out" on one of the relative TA commands of a UE signaled by the gNB to the SR in the DL SCI because the SCI transmission failed and there is no possibility for the gNB to know, the gNB won't re-transmit the SCI and the SR will not compute the same value for the adjustment to the UL transmission timing as the UE from this point in time going forward.

Based on these considerations, another solution is that every time the gNB signals a relative TA command to a UE, then the gNB signals the latest "aggregated" or "absolute" TA value for the UE to the SR using SCI. For purpose of UL reception, a gNB implementation in existing state-of-the-art keeps track of the sequence of relative TA commands issued to the UE. The gNB knows the initial (absolute) TA command having been issued to that UE. The gNB can then send a "copy" of its most recent internally computed "aggregate" or "absolute" TA value of the UE to the SR using SCI. An absolute TA requires 12 bits instead of the 6 bits used for a relative TA in the payload of the MAC CE (in 5G NR). There is an additional overhead due to MAC (sub-) header(s). The resulting DL SCI payload size increase is acceptable, especially when the absolute TA values for multiple UEs are signaled together by the gNB to the SR which reduces the overall MAC overhead of such a transmission. The DL SCI signaling load can be reduced when compared to the case where the gNB signals a "copy" of the UE relative TA command to the SR by DL SCI every time such a relative TA command is transmitted to the UE by the gNB. When the gNB signals a relative TA command to the UE, the gNB computed latest "aggregated" or "absolute" TA value for a UE known by the gNB does not need to be transmitted to the SR every time. The gNB can only signal the latest gNB internally computed absolute TA value of the UE to the SR by SCI if the value changes "substantially", e.g., more than a number of TA steps. Each updated absolute TA value for a UE which the gNB provides to the SR using DL SCI is "self-decodable". If the SR misses the DL SCI signaling from the gNB, the next following DL SCI transmission still allows the SR to update its reception timing for the UE UL transmissions and measure the UE SRS. The DL SCI decoding error doesn't "propagate" as is the case for the first solution using (a sequence) of relative TA commands of the UE signaled from the gNB to the SR using DL SCI. The same considerations and the need for acknowledgement of successful reception of SCI by the SR apply as in the case of the first solution.

Based on these considerations, another solution is that rather than the gNB signaling the (meaningfully recent) absolute TA value or (the sequence of) relative TA commands of a UE to the SR, the gNB instead signals a generic "reception timing adjustment" for a UE to the SR using DL SCI. The reception timing adjustment is a "decoding" assumption provided by the gNB to the SR. The SR may assume that an UL transmission from a UE whose signal is being relayed by the SR occurs earlier (or later) than the DL reference timing from the gNB as determined by the SR. Several other variations to derive the reference timing are possible. For example, the SR UL transmit timing of SCI can serve as timing reference. When the SR is signaled a reception timing adjustment for a UE by the gNB, the SR can configure is receiver to A/D convert, then demodulate and BB decode the UL transmissions such as SRS from the UE in the SR analog (UL) amplify-and-forward path correspondingly. One way to define the reception timing adjustment for a UE is a "reception window" or "range", e.g., to define a first time instant before which and a second time instant after which the SR may assume that (relevant) UL transmission from the UE will not occur. The SR then attempts to process the UE UL signals such as SRS inside the reception window or range. Existing gNB implementations implement reception windows during low-level BB front-end processing to deal with residual TA uncertainty and changing path profiles during UL reception. Two signaled values are necessary to define the reception window or range. Alternatively, when a single value for the reception timing adjustment for a UE is signaled from the gNB to the SR using SCI, a separate value for the reception window size "around" the reception timing adjustment value may be signaled (or a default value assumed). Several other variations are possible. Note that proper determination of the reception timing adjustment (value or window/range) for a UE signaled by the gNB to the SR using DL SCI requires an estimate of the one-way propagation delay from the gNB to the SR. Assuming there are UL transmissions of SCI from the SR to the gNB, there is need for UL transmission timing control of the SR, so the SR TA value is available in the gNB and the one-way propagation delay from the gNB to the SR can be estimated by the gNB. Alternative solutions to determine the one-way propagation delay from gNB to SR exist, including for the case when the UL SCI transmissions from the SR are not UL transmit timing controlled by the gNB.

Another consideration and another solution is that the "reception timing adjustment" for a UE which the gNB signals to the SR using SCI is not necessarily restricted in its usefulness and its use by the SR to exclusively set UL reception window(s) of the UE-transmitted SRS in the SR. First, UL-based measurements for beam management done by the SR on UL transmissions from UEs being relayed can be made (in principle) by the SR using several types of channels or signals, e.g., SRS, DMRS, etc. If the UE UL transmission timing and UE-specific transmission parameters are known by the SR, the SR might want to measure DMRS in PUCCH or PUSCH or the PTRS in PUSCH. Second, it can't be precluded that the "reception timing adjustment" for a UE which the gNB signals to the SR using SCI might be used to determine the SR "transmission" timings for either DL (egress or towards the UE) or UL (egress or towards the gNB) transmissions by the SR. For example, it might be considered to allow UL SCI transmissions from the SR to the gNB only within the confines of the maximum values of the UE "reception timing" windows, e.g., the SR must not transmit its UL SCI to the gNB "later" than the "closest" UE (with the smallest TA value or smallest reception timing adjustment) would. This is useful to reduce gNB complexity during UL reception to align the UL receptions from UE and SR signals received at the gNB location but amounts to a change to the UL transmission timing procedure for the SR, e.g., different when compared to the NR UE UL transmission timing procedure today. Using the gNB provided reception time adjustment of a UE, the SR can configure its UL reception timing of the UE transmitted SRS correspondingly. The uncertainty in reception timing for the SR of the gNB timing-controlled UE UL signal(s) or channel(s) is greatly reduced, e.g., from the order of usec's to less than 0.2 us or to multiple TA step sizes. The SR can now demodulate and decode the UE UL transmissions from the UE signal being relayed by the SR in the UL amplify-and-forward path with a complexity and measurement quality comparable to the gNB.

In one embodiment, the SR is provided by the gNB with a configurable receive timing adjustment $N_{delta}$ for a UE allowing the SR to adjust the UL reception timing when processing an UL signal or channel transmitted by a UE. The receive timing adjustment for a UE may correspond to a single value. The receive timing adjustment for a UE may correspond to a receive timing adjustment range or window and may be defined with respect to more than one value, e.g., a first start and a second end value, or a first value defining the receive timing adjustment and a second value associated with its duration or length in time or an assumed receive timing uncertainty.

In one embodiment, the SR is provided by the gNB with the timing advance value $N_{TA}$ of a UE served by the gNB as receive timing adjustment. A relative or an absolute timing advance value $N_{TA}$ of a UE served by the gNB may be provided to the SR. If a relative timing advance value of a UE is provided to the SR, this value may correspond to a latest timing advance value transmitted to the UE by the gNB. If an absolute timing advance value of a UE is provided to the SR, this value may correspond to an accumulative or aggregate recent value determined by the gNB from the sequence of relative timing advance and/or initial timing advance values transmitted to the UE by the gNB. The SR can be provided by the gNB with the relative or absolute timing advance value(s) $N_{TA}$ of one or multiple UE(s). The SR can be provided by the gNB with the associated transmit timing adjustment value(s), e.g., $N_{TA, offset}$ for one or multiple UE(s). The UL transmit timing settings of a UE may be provided to the SR by the gNB using separately provided values for the UE, e.g., both the timing advance value $N_{TA}$ of a UE and the associated UE transmit timing adjustment value(s) $N_{TA, offset}$ of the UE are provided to the SR, or using a joint value representative of the UL transmit timing of the UE, e.g., a value using $N_{TA}$ and $N_{TA, offset}$ is provided to the SR.

In one embodiment, the SR is provided by the gNB with the receive timing adjustment of a UE, e.g., including when the receive timing adjustment is signaled as value(s) based on or determined using the timing advance value(s) $N_{TA}$ of a UE and/or transmit timing adjustment values of a UE, by means of DCI, MAC CE signaling, RRC signaling messages or signaling received using DL PDSCH. A receive timing adjustment value may be tabulated in system specifications. A same DCI, MAC-CE or RRC or PDSCH signaling message may be used for the values associated with the UL transmission timing of multiple UEs. A dedicated or common type RRC signaling configuration may be used to provide the values associated with the UL transmission timing of one or multiple UEs to the SR. The SR may determine a default value for the values associated with the UL transmission timing of a UE.

A timing reference signal and/or timing reference may be provided to the SR by the gNB with respect to the UL transmission timing of a UE.

Figure 28:
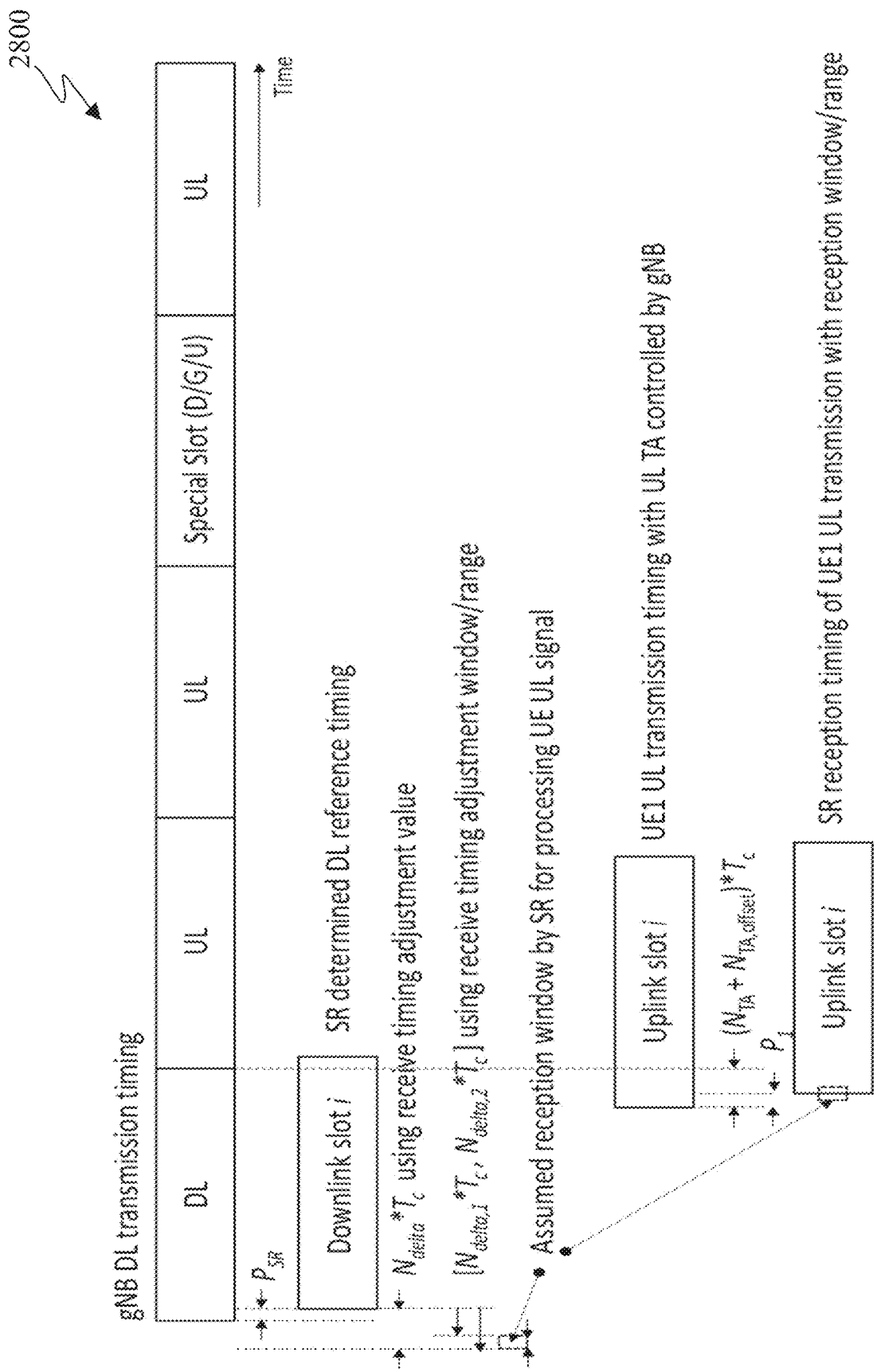
FIG. 28 illustrates an example for SR UL-DL timing relations with gNB provided receive timing adjustment of a UE according to embodiments of the present disclosure.

FIG. 28 illustrates an example for SR UL-DL timing relations with gNB provided receive timing adjustment of a UE 2800 according to embodiments of the present disclosure. The embodiment of the SR UL-DL timing relations with gNB provided receive timing adjustment of a UE 2800 illustrated in FIG. 28 is for illustration only. FIG. 28 does not limit the scope of this disclosure to any particular implementation of the SR UL-DL timing relations with gNB provided receive timing adjustment of a UE 2800.

The SR is provided by the gNB with a receive timing adjustment $N_{delta}$ for a UE signal or channel. The receive timing adjustment for a UE signal or channel may correspond to a single value. The receive timing adjustment for a UE may correspond to a receive timing adjustment range or window and may be defined with respect to more than one value, e.g., a first start and a second end value, or a first value defining the receive timing adjustment and a second value associated with its duration or length in time or assumed receive timing uncertainty. The UE signal or channel is transmitted from the UE and is relayed by the SR to the gNB. The receive timing adjustment value or range $N_{delta}$ for a UE provided to the SR by the gNB allows the SR to adjust its UL reception timing of the received UE signal or channel in a slot at the SR ingress antenna port with respect to a suitable timing reference, e.g., the DL reference timing of the serving cell. As shown in FIG. 28, the UL reception of the UE signal or channel by the SR in slot number i is assumed or expected at $N_{Delta}*T_c$ before the start of the timing reference, e.g., the DL reference timing of the serving cell when using a receive timing adjustment value. UL reception of the UE signal or channel by the SR in slot number i is assumed or expected in the range or window not earlier than $N_{Delta}*T_c$ and not later than $N_{Delta,2}*T_c$ with respect to the timing reference, e.g., the DL reference timing of the serving cell when using a receive timing adjustment window or range. $T_c$ is given by REF1. A receive timing adjustment $N_{delta}$ can be a positive or a negative value and include the value 0, e.g., SR receive timing with respect to the reference timing can be delayed or advanced. For example, when $N_{delta}=0$, the DL reference timing of the serving cell applies when the SR processes the received UE signals or channels being relayed at its ingress antenna port.

The SR determines a reference timing using a reference signal. The reference timing and/or reference signal for the SR can be based on either one or a combination of an absolute timing reference, using a DL-based reference timing and/or reference signal or an UL-based reference timing and/or reference signal. For example, an absolute timing reference can use a GPS-derived clock timing and reference timing of slots & (sub-)frames, e.g., SFN. For example, the SR can use (DL) SSB transmission(s) from the gNB received in the 1$^{st}$ DL slot shown in FIG. 28 to determine the first detected path (in time) for purpose of establishing the DL reference timing of slots i or j. Alternatively, a (DL) timing reference and/or timing reference signal may be configured for the SR with respect to which the reference timing of the serving cell is determined by the SR and/or the configurable receive timing adjustment $N_{delta}$ for a UE is applied by the SR for reception of an UL signal or channel from the UE. For example, a (DL) SSB or CSI-RS index is provided to the SR for purpose of determining the DL reference timing and/or timing reference signal. For example, a timing reference and/or timing reference signal may be configured for the SR with respect to the SR UL transmit timing, e.g., the UL SCI transmissions by the SR. The timing reference for UL reception of the UE signal or channel assumed by the SR in slot number i then starts at $N_{Delta}*T_c$ before the start of the SR UL timing reference, e.g., using the most recent $N_{TA}$ value maintained by the SR for its SCI transmissions to the gNB in the serving cell as the determined UL reference timing. When a timing reference signal is configured for the SR with respect to which the DL reference timing of the serving cell is determined by the SR and/or the configurable receive timing adjustment value $N_{delta}$ for a UE is applied by the SR for a reception of an UL signal or channel from the UE, a timing reference signal may be provided as TCI state(s) or RS resource index(es) corresponding to an SSB or to a CSI-RS resource index. One or more timing reference signals may be configured for the SR using SCI.

A value representative or associated with the receive timing adjustment $N_{delta}$ for a UE provided to the SR can be signaled from the gNB to the SR using DL SCI. Either one or a combination of methods such as DCI signaling, MAC CE signaling, RRC signaling can be used for signaling a receive timing adjustment value or window/range for a UE to the SR using SCI. A value representative or associated with the receive timing adjustment for a UE may be tabulated and/or listed by system operating specifications or may be indexed using the SCI signaled from the gNB to the SR. For example, a receive timing adjustment value can be provided by the gNB to the SR in the DL SCI using a DCI with a field of size M bits. The SR determines a receive timing adjustment value $N_{delta}$ for a UE from one of up to $2^M$ values tabulated in system specifications using an index value in the DCI. In another example, a receive timing adjustment value for a UE can be configured by the gNB in the SCI using a common or SR-specific RRC signaling message or IE. In another example, a receive timing adjustment value for a UE can be provided to the SR by the gNB in the SCI using a MAC CE or be contained in any DL transmission from the gNB to the SR using PDSCH.

A receive timing adjustment $N_{delta}$ for a UE provided to the SR by the gNB for UL receptions from a UE in a slot can be used by the SR to adjust the reception timing of either all or only some selected UL signals or channels from the UE. For example, a Rel-15 NR SRS is transmitted by the UE and received by the SR at its ingress antenna port in a number L of last 6 symbols of slot i. The SR sets the assumed reception timing or reception window/range using the DL reference timing and using the gNB provided receive timing adjustment for the UE to receive the UE signal containing SRS, convert it from analog to digital domain, then further process the signal in the BB, then derive a measurement sample/quantity based on the SRS. Otherwise, when the SR receives other UL transmissions from the same UE, e.g., not SRS, these transmissions traverse the amplify-and-forward path of the SR and no receive timing adjustment is applied by the SR for these UL signals or channels from the UE. Note however that the SRS transmissions from the UE in the UL amplify-and-forward path of the SR are relayed transparently to the gNB and may be subjected to the RF delay $T_{RF}$. The receive timing adjustment value or window is applied for extraction and measurement of the SRS by the SR from the analog signal being relayed by the SR.

When the SR is provided a receive timing adjustment value $N_{delta}$ for a UE, the SR may assume that for subcarrier spacing configuration μ, slots are numbered $n_s^\mu \in \{0, \ldots, N_{slot}^{subframe,\mu}-1\}$ in increasing order within a subframe and $n_{s,f}^\mu \in \{0, \ldots, N_{slot}^{subframe,\mu}-1\}$ in increasing order within a frame. There are $N_{symb}^{slot}$ consecutive OFDM symbols in a slot where $N_{symb}^{slot}$ depends on the cyclic prefix and is defined in REF1. The start of slot $n_s^\mu$ in a subframe is aligned in time with the start of OFDM symbol $n_s^\mu N_{symb}^{slot}$ in the same subframe for the DL reference timing determined by the SR. When the SR is provided a receive timing adjustment value $N_{delta}$ for a UE, the SR may assume that OFDM symbol $n_s^\mu N_{symb}^{slot}$ of the UL reception from the UE starts at $N_{Delta}*T_c$ before the start of OFDM symbol $n_s^\mu N_{symb}^{slot}$ according to the DL reference timing of the reference cell. When the SR is provided a receive timing adjustment value $N_{delta}$ for a UE to be applied to the reception(s) of an UL signal or channel from the UE in a slot of the serving cell, the SR adjusts the UL reception timing for a PUSCH, PUCCH, PRACH or SRS reception using the provided value $N_{delta}$ for the UE in the associated transmission resources.

When the SR is provided a receive timing adjustment window or range for a UE, the SR can configure its reception time window for the UE in an analog manner shown to the case of a receive timing adjustment value, e.g., when the SR is provided a receive timing adjustment range $[N_{delta,1}, N_{delta,2}]$ for a UE, the SR may assume that OFDM symbol $n_s^\mu N_{symb}^{slot}$ of the UL reception from the UE starts not earlier than $N_{Delta,1}*m_1*T_c$ before the start of OFDM symbol $n_s^\mu N_{symb}^{slot}$ and starts not later than $N_{Delta,2}*m_2*T_c$ according to the DL reference timing of the reference cell where $m_1$ and $m_2$ are suitably chosen parameters which can be the same or different, e.g., such as $m_1=m_2=16*64/2^\mu$.

For example, for slots numbered from 0 to 4 in the UL-DL frame configuration shown in FIG. 28, a receive timing adjustment value $N_{delta}$ for a UE is provided to the SR by SCI. The SR determines the DL reference timing of the gNB, e.g., based on reception of SSB(s) in slot 0. The SR adjusts the assumed reception timing of the UE1 signal transmitted in the UL slot 1 using the DL reception timing and using the provided value $N_{Delta}$ for UE1. The SR then applies the determined reception timing for UE1 and demodulates and decodes the SRS on the scheduled transmission resources in the slot 1. When a receive timing adjustment window or range $[N_{delta,1}, N_{delta,2}]$ for a UE is provided to the SR by SCI, the SR adjusts the assumed reception timing of the UE1 signal transmitted in the UL slot 1 using the DL reception timing and using the range provided by values $N_{Delta,1}$ and $N_{Delta,2}$ for UE1 to set the reception window. The SR then applies the determined reception window for UE1 and demodulates and decodes the UL transmission form the UE such as SRS on the scheduled transmission resources in the slot 1.

When the SR is configured for amplify-and-forward operation over a larger bandwidth, the UE may be served by the gNB using two or more carriers, e.g., the UE is configured with multiple serving cells. A same receive timing adjustment value $N_{delta}$ for a UE may be provided to the SR and is then applied by the SR to the multiple UL carriers in which UE transmissions are being relayed to the gNB. For example, when the UE is configured with 2 or more UL CCs or single-carrier UL operation is configured but the SRS transmissions from the UE use carrier switching in the SR amplify-and-forward bandwidth where the UE signals are relayed to the gNB, then the SR is provided a same receive timing adjustment value $N_{delta}$ for the UL transmissions from the UE for all UL carriers. This approach is advantageous for the case of intra-band contiguous CA where a single TAG for the CCs must be configured for the UE by the gNB. Alternatively, different receive timing adjustment values $N_{delta}$ for a UE may be provided to the SR for different UL CCs configured for the UE. A value for $N_{delta}$ for a UE may be provided to the SR for a suitable transmission duration, e.g., a timer or duration or validity may be associated with a reception timing adjustment value or window/range. Although for conciseness in the descriptive parts of the disclosure a slot is often used as exemplary time unit, instead of a value $N_{delta}$ provided with respect to a slot, a receive timing adjustment value may be associated with a symbol time interval or a multiple thereof. A receive timing adjustment value $N_{delta}$ may be associated or defined with respect to a same or an adjustable or scalable step size and/or desired timing resolution. For example, a value for $N_{delta}$ may be provided as a multiple of $16*64*T_c/2^\mu$.

As example and without loss of generality for the general case, it is assumed that the SR can know the SRS transmission parameters configured for a UE. When the SR then uses the provided receive timing adjustment value or window/range in a slot to configure its assumed reception timing for the UL transmissions, e.g., SRS, from UEs whose signals are measured, complexity and power consumption in the SR digital front-end and the SR baseband are reduced. Fewer candidate time instances when attempting to demodulate and decode the UL transmission such as SRS received from the UE must be processed than when the SR attempts to receive the UL transmissions in absence of knowledge of the UE UL transmit timing. Estimation quality of the UL transmissions such as SRS from the UE is increased because the received signal is correlated against fewer signal hypotheses. The SR can implement beam management functionality for DL transmissions (egress) to the UEs being relayed and for UL receptions (ingress) for the UEs. The assumed reception timing for the SR with respect to the UL transmissions from the UEs is controlled by the gNB. The gNB controls the UE UL transmission timing of the UEs being relayed by the SR as in existing state-of-the-art and the SCI signaling load is minimal.

The SR can be provided by the gNB with the receive timing adjustment of a UE, e.g., including the case when the receive timing adjustment is signaled as value(s) based on or determined using the timing advance value(s) $N_{TA}$ of a UE and/or transmit timing adjustment values of a UE, by means of DCI, MAC CE signaling, RRC signaling messages or signaling received using DL PDSCH. A receive timing adjustment value may be tabulated in system specifications. A same DCI, MAC-CE or RRC or PDSCH signaling message may be used for the values associated with the UL transmission timing of multiple UEs. A dedicated or common type RRC signaling configuration may be used to provide the values associated with the UL transmission timing of one or multiple UEs to the SR. The SR may determine a default value for the values associated with the UL transmission timing of a UE.

A receive timing adjustment value $N_{delta}$, possibly associated with a slot or set of slots, for selected or for all UL signal(s) or channel(s) and/or validity period(s) may be provided by SCI to the SR by one or a combination of L1 control signaling in DCI, MAC CE signaling, RRC signaling and/or configuration, tabulation, and/or listing in system operating specifications. If a same receive timing adjustment value is provided to the SR for multiple UEs, a common DCI or common RRC signaling message may be used. A UE-specific DCI or RRC signaling of dedicated or common type may be used to provide value(s) of $N_{delta}$ for a UE to the SR. A first receive timing adjustment value $N_{delta,1}$ associated with a first UL transmission from a UE may be provided to the SR by DCI in the SCI whereas a second receive timing adjustment value $N_{delta,2}$ associated with a second UL transmission for the same UE may be determined by the SR from RRC signaling parameters using SCI, MAC CE signaling carrying SCI or from system specifications. $N_{delta}$ value(s) for a UE provided to the SR by RRC signaling may be used in conjunction with MAC CE provided $N_{delta}$ values. A receive timing adjustment value $N_{delta}$ associated with the UL reception timing of an UL signal or channel for a UE may be determined by the SR by means of providing an index value through DCI signaling to the SR and the SR selecting one or more entries from an RRC configurable table using the provided index value. The SR may determine a default value for the receive timing adjustment $N_{delta}$ associated with an UL signal or channel for a UE in an UL slot.

In one embodiment, a value associated with the receive timing adjustment $N_{delta}$ for a UE to determine the UL reception timing of an UL signal or channel from the UE in a slot may be provided to the SR by L1 control signaling such as a DCI.

In one example, a value for the receive timing adjustment $N_{delta}$ for a UE is provided to the SR in a new information field "UL timing offset" of size M bits in a DCI carrying SCI. A first motivation is that the gNB can signal to the SR multiple values of the applicable receive timing adjustment for multiple UEs in a single DCI carrying SCI using an RRC configured table which is indexed by the new information field "UL timing offset". Alternatively, the new information field can index a table defined by system operating specifications. A second motivation for the use of DCI as SCI to signal the receive timing adjustment to the SR is that these values can be signaled relatively fast, e.g., at gNB run time.

TABLE 5 shows an example for the UL timing offset field using M=2 bits where the symbol duration is determined based on the SCS. When the UL timing offset field signals a value 00, no UL timing adjustment $N_{delta}$ is applied by the SR to determine the UL reception timing of the UE transmission, e.g., the SR assumes that SRS transmissions from the UE use the DL reference timing. Value 01 signals a receive timing adjustment $N_{delta}$ of ¼ symbol duration for the configured numerology μ. The SR may assume that UL transmission from the UE is then offset, e.g., advanced by $N_{Delta}*T_c$=¼ symbol duration for numerology μ when compared to the DL reference timing. Value 10 results in ½ symbol offset assumed by the SR for configuration of its reception timing when receiving the SRS from the UE, etc. In this example, the signaled UL timing offset (or receive timing adjustment) is either 0 or a positive value, e.g., UL transmissions from the UE are assumed to be either delayed or to use the DL reference timing.

TABLE 5

Example of new information field "UL timing offset"

| Value | UL timing offset |
|---|---|
| 00 | None |
| 01 | ¼ symbol duration |
| 10 | ½ symbol duration |
| 11 | ¾ symbol duration |

As can be seen by someone skilled in the art, a suitable range and resolution for the signaled "UL timing offset" can be chosen without departing from the scope of the present disclosure. The range can comprise both positive and negative receive timing adjustment values for the purpose of delaying or advancing the reception timing for the UL transmission timing from a UE which the SR may assume. The resolution or the range does not need to be uniform. For example, an UL timing offset in the range of [−½ symbol duration, +¾ symbol duration] can be indicated, where M=3 bits in the UL timing offset field allow to signal from a set of possible receive timing adjustment values [−½, −¼, 0, +⅛, +¼, +⅜, +½, +¾] of a symbol duration for numerology μ. The range of the signaled UL timing offset or receive timing adjustment can be larger than a symbol interval. For example, the UL timing offset field can allow to signal from a set of possible receive timing adjustment values [−1, −½, 0, +¼, +½, +1, +3/2, +2] of a symbol duration for numerology μ. A motivation is the use of a signaled receive timing adjustment for the case of NR operation using higher numerologies such as in FR2, e.g., μ≥3 or SCS=120 kHz and above, where symbol durations are much shorter and the required receive timing adjustment values may be larger than a symbol duration with a smaller numerology μ. Furthermore, the UL timing offset or receive timing adjustment in the example can be expressed in any suitable time unit, e.g., as a multiple of $T_c$ or $T_s$ defined in REF1 instead of fractions of an OFDM symbol duration at numerology μ provided by TABLE 5. Instead of a new information field in a DCI carrying SCI, an existing, e.g., re-purposed field of a DCI can be reused to provide an indication of a receive timing adjustment value to the SR. In another example, an indication for the receive timing adjustment to determine the assumed reception timing for one or more UL signal(s)/channel(s) for a UE may be transmitted to the SR through a group DCI instead of a unicast DCI carrying SCI.

Figure 29:
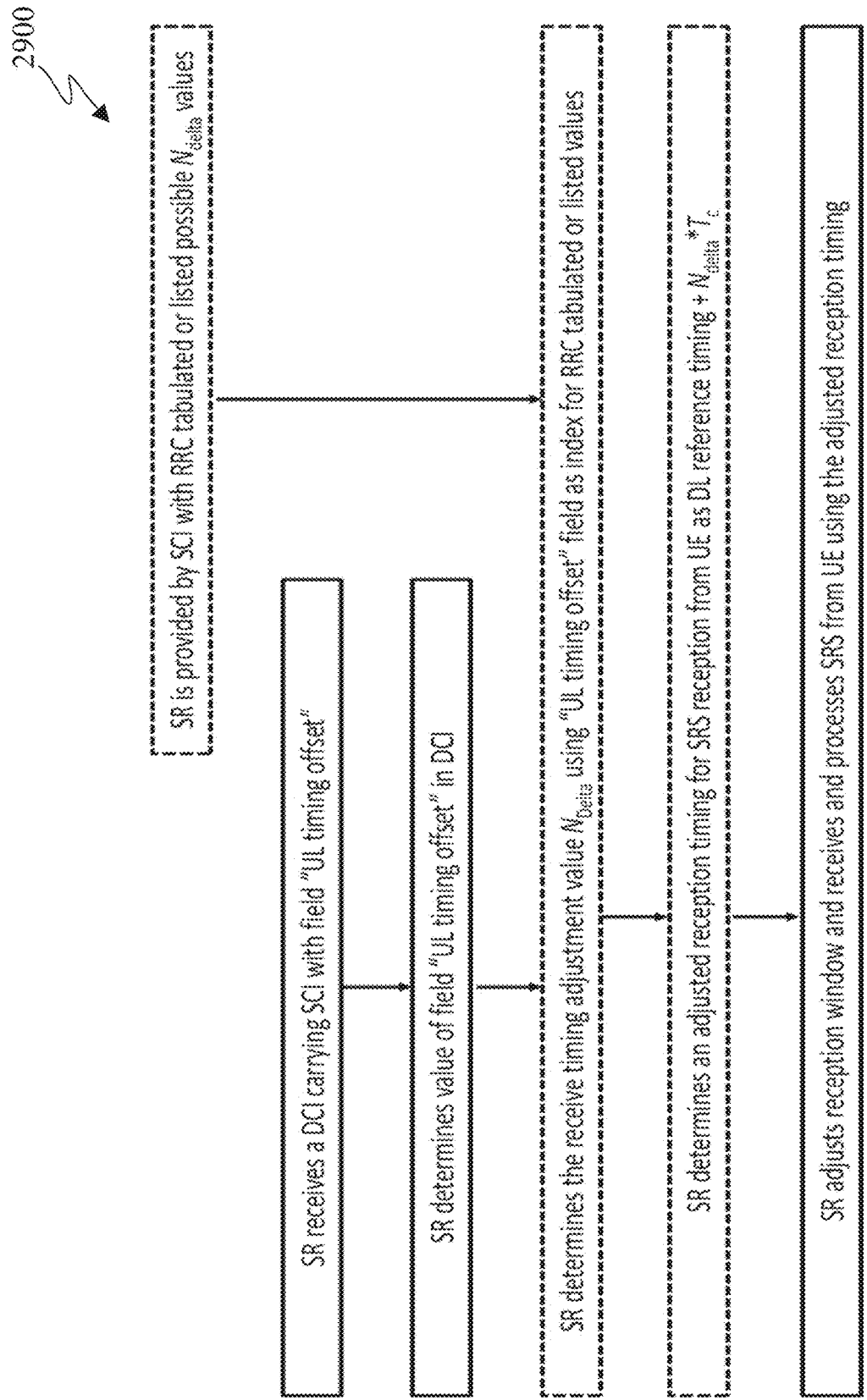
FIG. 29 illustrates an example SR timing processing chain using a receive timing adjustment value signaled by the gNB using a DCI carrying SCI according to embodiments of the present disclosure.

FIG. 29 illustrates an example SR timing processing chain using a receive timing adjustment value signaled by the gNB using a DCI carrying SCI 2900 according to embodiments of the present disclosure. The embodiment of the SR timing processing chain using a receive timing adjustment value signaled by the gNB using a DCI carrying SCI 2900 illustrated in FIG. 29 is for illustration only. FIG. 29 does not limit the scope of this disclosure to any particular implementation of the SR timing processing chain using a receive timing adjustment value signaled by the gNB using a DCI carrying SCI 2900.

As illustrated in FIG. 29, the SR determines the reception timing for an UL transmission of SRS from the UE in slot i. The SR has previously determined and maintains the DL reference timing of the serving cell. The SR has been provided by RRC with a table or list of possible receive timing offset values using SCI. The SR receives a DCI carrying SCI in the slot. The SR determines the value of the field UL timing offset in the DCI carrying the SCI. The SR determines a reception timing of a first OFDM symbol carrying the SRS transmission from the UE using the receive timing adjustment value indexed by the signaled value of the UL timing offset field and using the index to obtain the actual value from the RRC configured table. The SR determines an adjusted UL reception timing from the DL reference timing and $N_{Delta}*m*T_c$ where m is a suitably chosen parameter, e.g., such as m=16*64/2$^μ$. The SR adjusts its receiver processing to the reception timing determined in the previous step. The SR receives the SRS transmission from the UE in the symbols allocated to SRS transmission in the slot using the adjusted reception timing.

In one embodiment, a value associated with the receive timing adjustment value $N_{delta}$ for a UE to determine the UL reception timing of an UL signal or channel from the UE in a slot may be provided to the SR by higher layers, e.g., configured by RRC signaling.

The SR may be provided a higher layer parameter ulTimingOffset by RRC signaling and configuration. The parameter may be included in one or more SCI signaling messages and/or SCI IEs. For example, the parameter ulTimingOffset may be signaled from the gNB to the SR as part of RRC signaling messages of type RRCSetup, RRCReconfiguration, SIB1 or SystemInformation and may be included in RRC IEs of type ServingCellConfig, ServingCellConfigCommon, or ServingCellConfigSIB1 suitably modified to include SCI. For example, such RRC configuration parameter associated with SCI may be of various types, e.g., enumerated, listed, sequence type, encoded as a bit string, etc.

As can be seen by someone skilled in the art, a suitable range and resolution for the parameter ulTimingOffset provided by higher layers and associated with the receive timing adjustment $N_{delta}$ for a UE provided to the SR by SCI can be chosen without departing from the scope of the present disclosure. The range can comprise both positive and negative receive timing adjustment values, including the value 0, for the purpose of delaying or advancing the UL reception timing which the SR may assume. The resolution or the range does not need to be uniform such as was described for the example case where the receive timing adjustment $N_{Delta}$ is provided in a new information field "UL timing offset" of size M bits in a DCI carrying SCI. The range of the parameter ulTimingOffset provided by higher layers can be larger than a symbol interval. Furthermore, the parameter ulTimingOffset or the receive timing adjustment provided by higher layers in the example can be expressed in any suitable time unit, e.g., as a multiple of $T_c$ or $T_s$ defined in REF1 or as fractions of an OFDM symbol duration at numerology μ.

Figure 30:
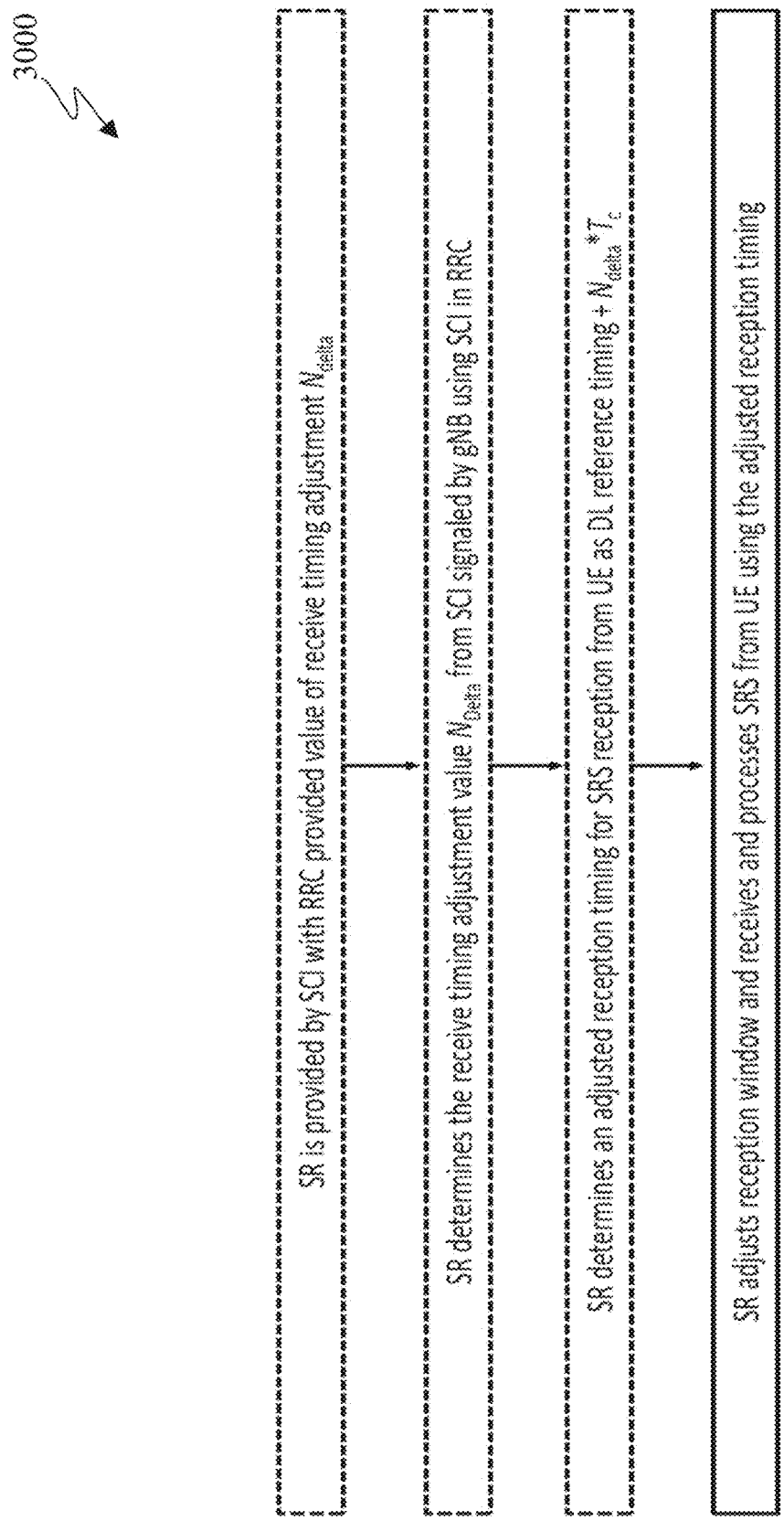
FIG. 30 illustrates an example SR timing processing chain using a receive timing adjustment value signaled by the gNB using RRC carrying SCI according to embodiments of the present disclosure.

FIG. 30 illustrates an example SR timing processing chain using a receive timing adjustment value signaled by the gNB using RRC carrying SCI 3000 according to embodiments of the present disclosure. The embodiment of the SR timing processing chain using a receive timing adjustment value signaled by the gNB using RRC carrying SCI 3000 illustrated in FIG. 30 is for illustration only. FIG. 30 does not limit the scope of this disclosure to any particular implementation of the SR timing processing chain using a receive timing adjustment value signaled by the gNB using RRC carrying SCI 3000.

As illustrated in FIG. 30, the SR determines the reception timing for an UL transmission of SRS from the UE in slot i. The SR has previously determined and maintains the DL reference timing of the serving cell. The SR is provided by the gNB through RRC with a receive timing adjustment value for a UE. The SR receives the SCI from the gNB using RRC signaling. The SR determines the value of the receive timing adjustment for the UE from the RRC signaling carrying SCI. The UE determines a reception timing of a first OFDM symbol carrying the SRS transmission of the UE in the slot using the provided value of the receive timing adjustment for the UE. The SR determines an adjusted SRS reception timing as DL reference timing+$N_{Delta}$*m*$T_c$ where m is a suitably chosen parameter, e.g., such as m=16*64/2$^μ$. The SR adjusts its receiver processing to the reception timing determined in the previous step. The SR receives the SRS transmission of the UE in the symbols allocated to SRS transmission from the UE in the slot using the adjusted reception timing.

Figure 31:
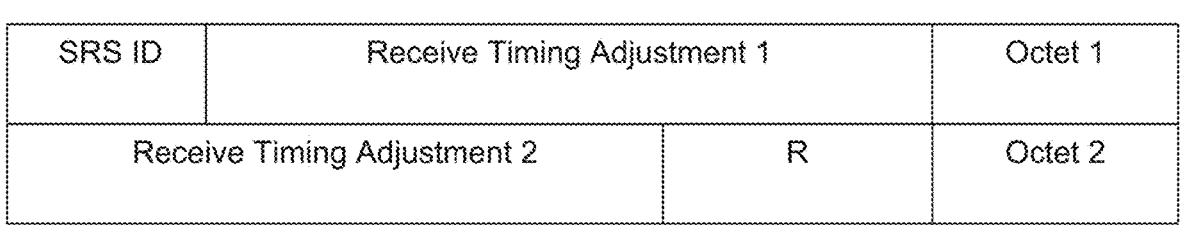
FIG. 31 illustrates an example UL Rx Timing Command MAC CE carrying SCI according to embodiments of the present disclosure.

FIG. 31 illustrates an example UL Rx Timing Command MAC CE carrying SCI 3100 according to embodiments of the present disclosure. The embodiment of the UL Rx Timing Command MAC CE carrying SCI 3100 illustrated in FIG. 31 is for illustration only. FIG. 31 does not limit the scope of this disclosure to any particular implementation of the UL Rx Timing Command MAC CE carrying SCI 3100.

In one embodiment, a value associated with the receive timing adjustment $N_{delta}$ to determine the UL reception timing of an UL signal or channel from the UE in a slot may be provided to the SR by MAC CE.

A value for the receive timing adjustment $N_{Delta}$ for an UL signal or channel of a UE may be provided to the SR by an UL Rx Timing Command MAC CE. The MAC CE may directly provide a receive timing adjustment value or may select or (de-)activate a set of RRC configured or tabulated in system specifications receive timing adjustment values.

In one example shown in FIG. 31, a receive timing adjustment value $N_{Delta}$ for an UL signal or channel of a UE is provided to the SR through signaled index values for $N_{Delta}$ in the new UL Rx Timing Command MAC CE. The MAC CE may have length N=2 octets, or N for any required number of octets or bits. The gNB transmits and the SR receives the MAC CE carrying the SCI and which is associated with the receive timing adjustment value $N_{Delta}$ as part of an DL transmission to the SR, e.g., in PDSCH. FIG. 31 shows the example of a length N=2 octets MAC CE format where the receive timing adjustment values $N_{Delta,1}$ and $N_{Delta,2}$ for a reception window or range are provided to the SR using the MAC CE to deliver SCI. The MAC CE may be identified by either a selected LCID or a selected eLCID value or a combination of LCID and eLCID values. The MAC CE has fixed size and consists of two octets. It contains an SRS reference ID (SRS ID) indicating an SRS configuration of a UE provided by the gNB to the SR in SCI, e.g., using RRC signaling. The length of the field is 2 bits. The MAC CE then contains two receive timing adjustment fields. The first receive timing adjustment field indicates the index value $N_{Delta,1}$ (0, 1, 2 . . . 63) used to control the start for adjustment of the reception timing window which the SR may assume for reception of the referenced SRS, e.g., the UE signal to be measured. The length of the field is 6 bits. The second receive timing adjustment field indicates the index value $N_{Delta,2}$ (0, 1, 2 . . . 63) used to control the length or duration of the reception window which the UE may assume for reception counting from the first index value $N_{Delta,1}$. The length of the field is 6 bits. The 2 reserved bits "R" are set to "0".

When the SR receives an UL Rx Timing Command MAC CE, it determines the adjusted reception timing in a reception window as DL reference timing advanced by a range [$N_{delta,1}$*$m_1$*$T_c$ to $N_{delta,2}$*$m_2$*$T_c$] for the SRS transmitted by the UE in a slot where $m_1$ and $m_2$ are suitably chosen parameters which can be the same or different, e.g., such as $m_1$=$m_2$=16*64/2$^μ$. A motivation for the use of a MAC CE by the gNB as SCI to provide the reception timing which the SR may assume is easier gNB implementation. A recent aggregated or accumulative value of the UE timing advance is already known by the gNB in its MAC protocol layer because the UE TA commands are transmitted from the gNB to the UE by MAC.

As can be seen by someone skilled in the art, a suitable range and resolution for a receive timing adjustment value provided to the SR by MAC CE can be chosen without departing from the scope of the present disclosure. The range can comprise both positive and negative receive timing adjustment values including the value 0 for the purpose of delaying or advancing the reception timing of an UL signal or channel of the UE which the SR may assume. The resolution or the range does not need to be uniform such as was described for the example case where the receive timing adjustment value $N_{Delta}$ is provided in a new information field "UL timing offset" of size M bits in a DCI carrying SCI. The range of the receive timing adjustment provided by MAC CE can be larger than a symbol interval. Furthermore, the receive timing adjustment provided by MAC CE in the example can be expressed in any suitable time unit, e.g., as a multiple of $T_c$ or $T_s$ defined in REF1 or other. A receive timing adjustment provided by MAC CE carrying SCI may be associated with a set of time-domain resources, e.g., a slot or set of slots or other suitable time-domain allocation unit for which the provided receive timing adjustment value applies (or not). A receive timing adjustment provided by MAC CE carrying SCI may provide receive timings adjustments for multiple UEs to the SR.

In another example shown in TABLE 6, an UL Rx Timing Command MAC CE signals which set of tabulated or configured timing adjustment values $N_{Delta}$ for an UL signal or channel of a UE the SR may use to determine the adjusted UL reception timing. When the SR is signaled through the MAC CE that Set 1 may be used to determine the UL reception timing of an UL signal or channel for a UE, the SR determines a value for the receive timing adjustment $N_{Delta}$ from the $2^{nd}$ column in TABLE 6. When the MAC CE signals that Set 2 is activated, the SR determines the UL reception timing from the $3^{rd}$ column. The index value in the first column may be provided by DCI signaling and/or by RRC configuration carrying SCI as described by other embodiments in the present disclosure.

TABLE 6

Example of UL Rx Timing Command MAC CE carrying SCI

| Value | UL Rx timing offset: Set 1 | UL Rx timing offset: Set 2 |
|---|---|---|
| 00 | None | ½ symbol duration |
| 01 | ¼ symbol duration | symbol duration |
| 10 | ½ symbol duration | 1.5 symbol duration |
| 11 | ¾ symbol duration | 2 symbol durations |

As can be understood by someone skilled in the art, the naming or labeling of the new UL Rx Timing Command MAC CE format or the included IEs for purpose of transmitting receive timing indication as SCI is not important for as long as it is distinct from currently named IEs and parameterization provided by REF5. The new UL Rx Timing Command MAC CE may include additional fields not shown in the examples provided by FIG. 31. For example, a length indicator L or indicator of the number of SRS IDs for which receive timing adjustment values are provided in the MAC CE may be included such that a variable instead of a fixed number of receive timing adjustment values can be signaled through the MAC CE. Other suitable identifiers may be included or substituted in the MAC CE, e.g., UE identifiers. The field length(s) to signal the receive timing adjustment values may be chosen differently as a function of the required step or window size(s) and maximum value(s). When the SR is provided with a configurable receive timing adjustment $N_{delta}$ allowing to adjust the UL reception timing of a UE in a slot with respect to the reference timing of the serving cell, a receive timing adjustment value $N_{delta}$ may be associated with a DL reference signal or channel of type PBCH, PDCCH, PDSCH and/or PSS, SSS, DMRS, CSI-RS, PTRS. A value of the receive timing adjustment $N_{delta}$ may be provided for a slot or a same $N_{delta}$ value may be configured for multiple slots. A value of the receive timing adjustment $N_{delta}$ may be associated with a transmission duration or validity period during which the receive timing adjustment $N_{delta}$ may be assumed the same by the SR. Different signal(s)/channel(s) may have a different associated transmission durations or validity periods, or a same transmission duration or validity period may be assumed by the SR. A same receive timing adjustment value $N_{delta}$ may be provided by the gNB to the SR for multiple UEs in the SCI to determine their UL reception timings, or different $N_{delta}$ values may be provided for different UEs. The determination of a second receive timing adjustment value $N_{delta,2}$ by the SR may depend on and be a function of a first provided receive timing adjustment value $N_{delta,1}$, e.g., the SR determines $N_{delta,2}$ as relative value compared to or as an offset to $N_{delta,1}$.

As can be seen by someone skilled-in-the-art, solutions, embodiments, methods, and examples described in the present disclosure can apply beyond Smart repeaters, e.g., NETCON devices to other nodes with a relay-like functionality in a wireless network, such as reconfigurable intelligent surfaces (RIS) and so on.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for a network-controlled repeater (NCR), the method comprising:
   receiving, by an NCR mobile termination (NCR-MT) entity on an NCR control link, information for a timing value for an NCR forwarding (NCR-Fwd) entity;
   determining, by the NCR, a timing adjustment for an NCR access link based on the timing value and a reference signal (RS); and
   receiving, by the NCR-Fwd entity on the NCR access link, a radio frequency (RF) signal based on the timing adjustment.

2. The method of claim 1, wherein the timing value is a timing offset value or a timing window.

3. The method of claim 1, wherein:
   determining the timing adjustment further comprises determining, by the NCR, an aggregated timing adjustment value based on the timing value and a previous timing value, and receiving the RF signal further comprises receiving, by the NCR-Fwd entity on the NCR access link, the RF signal based on the aggregated timing adjustment value.

4. The method of claim 1, further comprising:
receiving, by the NCR on the NCR control link, information for a configuration for the RS;
receiving, by the NCR on the NCR control link or on an NCR forward link, the RS based on the configuration; and
determining, based on the RS, a start of a frame for receptions by the NCR-MT entity.

5. The method of claim 1, wherein:
receiving the information for the timing value further comprises receiving, by the NCR-MT entity on the NCR control link, information from a base station for a set of timing values; and
the method further comprises determining, by the NCR, the timing value from the set of timing values.

6. The method of claim 1, further comprising:
transmitting, by the NCR-Fwd entity on the NCR access link, a timing advance command that provides the timing value to a user equipment (UE); and
receiving, by the NCR-Fwd entity on the NCR access link, a transmission from the UE based on the timing adjustment.

7. The method of claim 1, further comprising:
determining by the NCR:
measurement values based on a sounding reference signal (SRS) included in the RF signal; and
based on the measurement values, a spatial domain filter from a set of spatial domain filters that the NCR-Fwd entity supports on the NCR access link; and
receiving, by the NCR-Fwd entity on the NCR access link, a transmission from a user equipment (UE) based on the spatial domain filter.

8. A network-controlled repeater (NCR) comprising:
a transceiver of an NCR mobile termination (NCR-MT) entity configured to receive, on an NCR control link, information for a timing value for an NCR forwarding (NCR-Fwd) entity;
a processor of the NCR operably coupled to the transceiver of the NCR-MT entity, the processor of the NCR configured to determine a timing adjustment for an NCR access link based on the timing value and a reference signal (RS); and
a transceiver of the NCR-Fwd entity operably coupled to the processor of the NCR, the transceiver of the NCR-Fwd entity configured to receive, on the NCR access link, a radio frequency (RF) signal based on the timing adjustment.

9. The NCR of claim 8, wherein:
the transceiver of the NCR-MT entity is further configured to receive the timing value as a timing offset value or a timing window; and
the processor is further configured to determine the timing value as the timing offset value or the timing window.

10. The NCR of claim 8, wherein:
the processor is further configured to determine an aggregated timing adjustment value based on the timing value and a previous timing value, and
the transceiver of the NCR-Fwd entity is further configured to receive the RF signal based on the aggregated timing adjustment value.

11. The NCR of claim 8, wherein:
the transceiver of the NCR-MT entity is further configured to receive:
information for a configuration for the RS, and
the RS based on the configuration; and
the processor is further configured to determine, based on the RS, a start of a frame for receptions by the NCR-MT entity.

12. The NCR of claim 8, wherein:
the transceiver of the NCR-MT entity is further configured to receive information from a base station for a set of timing values; and
the processor is further configured to determine the timing value from the set of timing values.

13. The NCR of claim 8, wherein the transceiver of the NCR-Fwd entity is further configured to:
transmit a timing advance command that provides the timing value to a user equipment (UE); and
receive a transmission from the UE based on the timing adjustment.

14. The NCR of claim 8, wherein:
the processor is further configured to determine:
measurement values based on a sounding reference signal (SRS) included in the RF signal; and
based on the measurement values, a spatial domain filter from a set of spatial domain filters that the NCR-Fwd entity supports on the NCR access link; and
the transceiver of the NCR-Fwd entity is further configured to receive a transmission from a user equipment (UE) based on the spatial domain filter.

15. A base station comprising:
a processor configured to determine a timing value for a user equipment (UE) based on a timing adjustment for the UE in a cell; and
a transceiver operably coupled to the processor, the transceiver configured to transmit, to a network-controlled repeater mobile termination (NCR-MT) entity on a network-controlled repeater (NCR) control link, information indicating the timing value for the UE.

16. The base station of claim 15, wherein the timing value is a timing offset value or a timing window.

17. The base station of claim 15, wherein:
the processor is further configured to determine, based on a last timing value and a previous timing value, the timing value as an aggregated timing adjustment value, and
the transceiver is further configured to transmit, to the NCR-MT entity, the information indicating the timing value as the aggregated timing adjustment value.

18. The base station of claim 15, wherein the transceiver is further configured to transmit to the NCR-MT entity:
information for a configuration of reference signal (RS) associated with a downlink (DL) reference transmit timing, and
the RS based on the configuration.

19. The base station of claim 15, wherein:
the processor is further configured to determine a set of timing values; and
the transceiver is further configured to transmit, to the NCR-MT entity, the information indicating the set of timing values.

20. The base station of claim 15, wherein the transceiver is further configured to transmit, to the NCR-MT entity, information for a configuration of a sounding reference signal (SRS).

* * * * *